(12) United States Patent
Kondo et al.

(10) Patent No.: US 8,427,390 B2
(45) Date of Patent: Apr. 23, 2013

(54) SPACE-DIVIDING DISPLAY APPARATUS

(75) Inventors: Tetsujiro Kondo, Tokyo (JP); Yasushi Tatehira, Kanagawa (JP); Tsuyoshi Tanaka, Tokyo (JP); Kazutaka Uchida, Tokyo (JP); Naohide Yamada, Tokyo (JP); Yoshinori Watanabe, Kanagawa (JP); Shinsuke Araya, Kanagawa (JP)

(73) Assignee: Sony Corporation, Tokyo (JP)

( * ) Notice: Subject to any disclaimer, the term of this patent is extended or adjusted under 35 U.S.C. 154(b) by 736 days.

(21) Appl. No.: 11/579,627

(22) PCT Filed: Apr. 28, 2005

(86) PCT No.: PCT/JP2005/008196
§ 371 (c)(1),
(2), (4) Date: Nov. 6, 2006

(87) PCT Pub. No.: WO2005/108699
PCT Pub. Date: Nov. 17, 2005

(65) Prior Publication Data
US 2008/0291123 A1    Nov. 27, 2008

(30) Foreign Application Priority Data

May 7, 2004   (JP) ................................ 2004-139140
May 14, 2004  (JP) ................................ 2004-145035

(51) Int. Cl.
  *G09G 5/00*   (2006.01)
  *A47F 11/06*  (2006.01)
  *H02B 1/00*   (2006.01)
(52) U.S. Cl.
  USPC ............................... 345/1.1; 40/427; 361/600

(58) Field of Classification Search .................... 345/1.1, 345/1.3; 40/427; 361/600
See application file for complete search history.

(56) References Cited

U.S. PATENT DOCUMENTS

| | | | | |
|---|---|---|---|---|
| 5,253,051 A | * | 10/1993 | McManigal | 348/121 |
| 5,754,225 A | | 5/1998 | Naganuma | |
| 5,979,861 A | * | 11/1999 | Weaver | 248/642 |
| 7,129,981 B2 | * | 10/2006 | Berstis | 348/333.12 |
| 7,696,953 B2 | * | 4/2010 | Matthews et al. | 345/1.1 |
| 2003/0071832 A1 | * | 4/2003 | Branson | 345/698 |
| 2004/0212957 A1 | * | 10/2004 | Schedivy | 361/683 |

FOREIGN PATENT DOCUMENTS

| | | |
|---|---|---|
| JP | 58 81009 | 5/1983 |
| JP | 1 137674 | 9/1989 |
| JP | 09 102948 | 4/1997 |

(Continued)

*Primary Examiner* — Amr Awad
*Assistant Examiner* — Randal Willis
(74) *Attorney, Agent, or Firm* — Frommer Lawrence & Haug LLP; William S. Frommer

(57) ABSTRACT

A space-dividing apparatus for a single-leaf section, a divider etc. A division plate section constitutes a single-leaf screen device and divides a space. On a front surface of the division plate section, nine TV receiving sets are arranged in a matrix shape and an attachable/detachable manner. On a back surface of the division plate section, nine image pickup elements are mounted to, for example, positions that correspond to the TV receiving sets respectively, when each are detached. An imaging direction of each of the image pickup elements can be automatically aligned with a line of sight of the user based on a position of the user (position of a remote controller). An image due to a video signal obtained by each of the image pickup elements can be displayed on the TV receiving sets, thereby permitting the user to observe the other side of the division plate section easily.

7 Claims, 42 Drawing Sheets

FOREIGN PATENT DOCUMENTS

| | | |
|---|---|---|
| JP | 2002 4468 | 1/2002 |
| JP | 2002-209207 | 7/2002 |
| JP | 2002 260093 | 9/2002 |
| JP | 2003 111069 | 4/2003 |
| JP | 3416294 | 4/2003 |
| JP | 2003 178370 | 6/2003 |
| JP | 2003 199092 | 7/2003 |
| JP | 2004-40176 | 2/2004 |
| JP | 2004 118766 | 4/2004 |

* cited by examiner

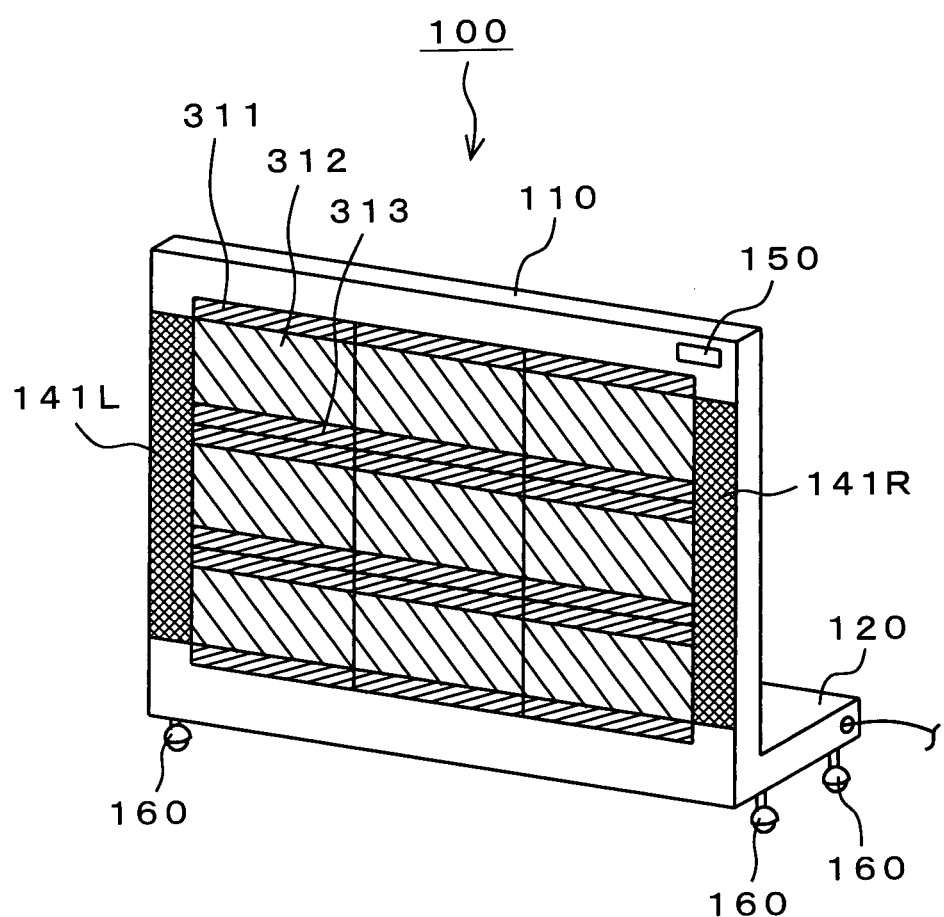

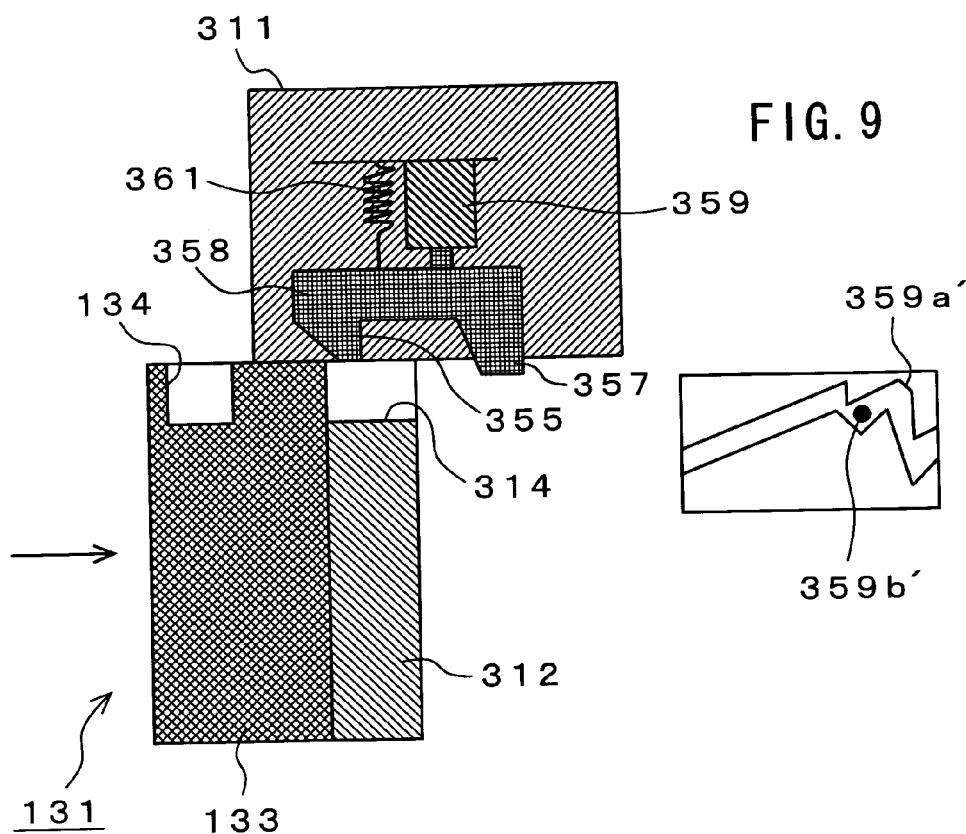
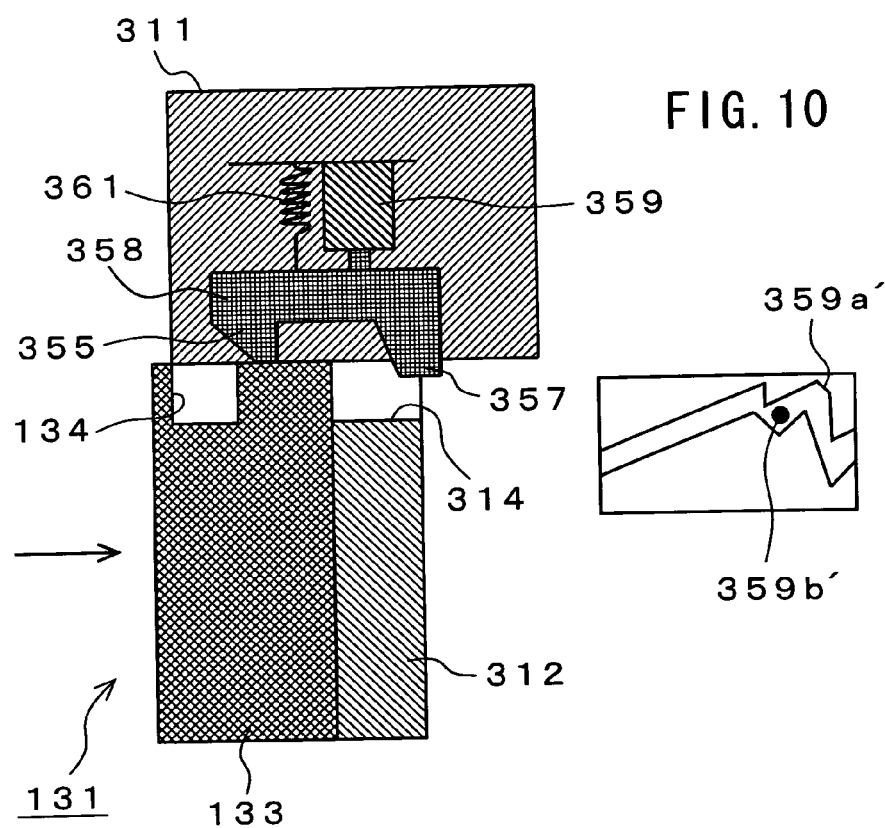

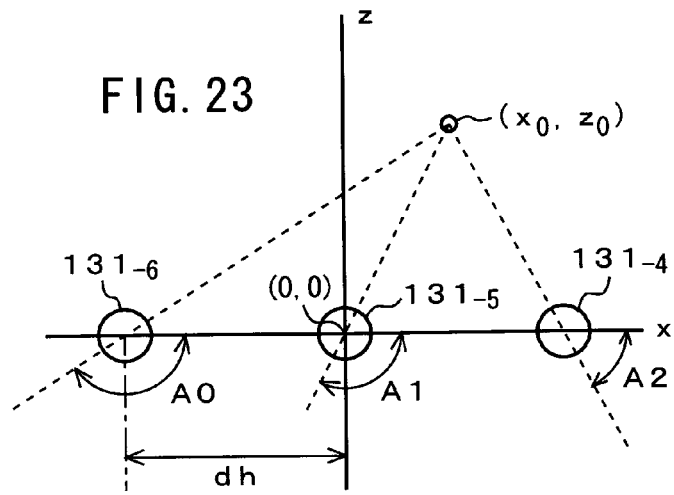
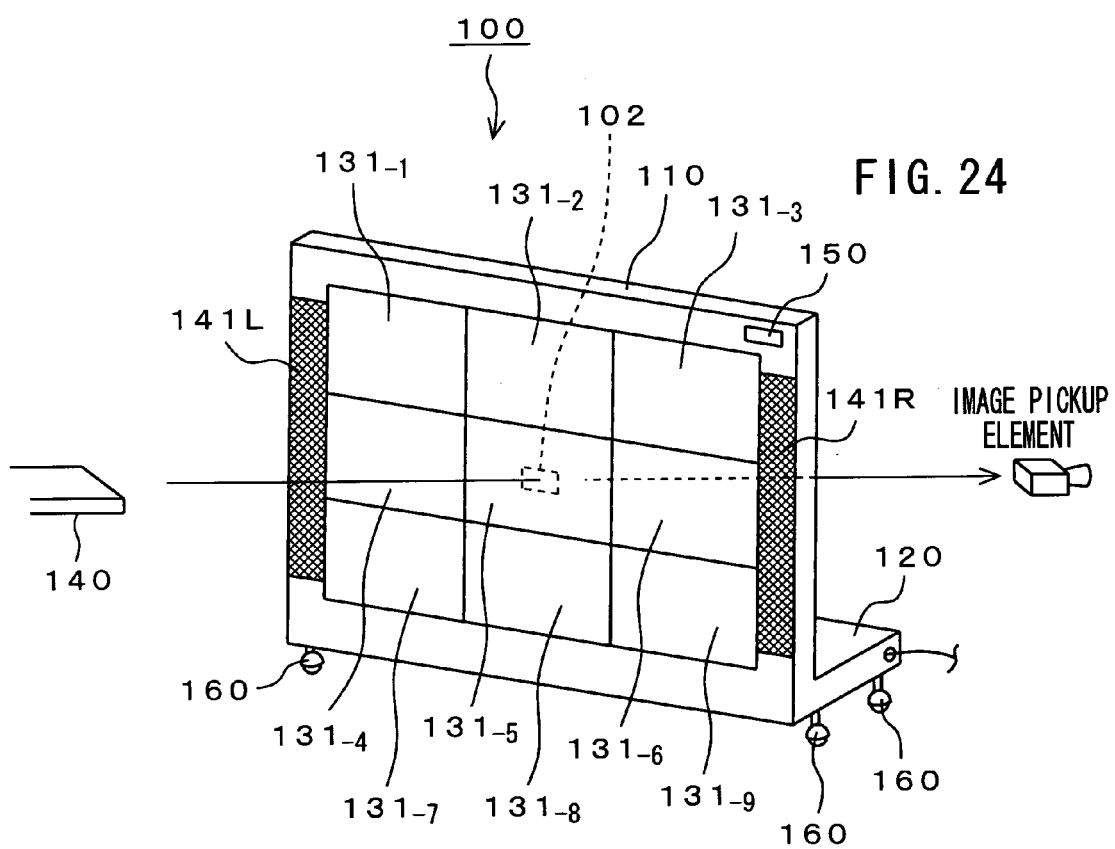

SPACE-DIVIDING DISPLAY APPARATUS

TECHNICAL FIELD

The present invention relates to a space-dividing apparatus that could well be applied to, for example, a single-leaf screen, a divider, etc. More specifically, the present invention relates to a space-dividing apparatus in which image display elements are arranged on a division plate section, at a front surface side thereof, that divides a space and image pickup elements are mounted on this division plate section at a back surface side thereof so as to enable to be displayed on the image display elements an image due to a video signal obtained by the image pickup elements, so that a user can easily observe the back surface side of the division plate section.

Further, the present invention relates to a storage arrangement that could well be applied to, for example, a furniture piece such as a kitchen cabinet and a bookshelf, a dress case, etc. More specifically, the present invention relates to a storage arrangement in which an image display element that displays an image by using a video signal is arranged on an outer side surface of a flat plate section to cover a storage opening of a body of a storage section, so as to greatly upgrade functions of the storage arrangement.

BACKGROUND ART

Conventionally, in Japanese Patent No. 3416294, for example, a partition provided with an information display device has been disclosed.

This partition provided with the information display device simply displays information etc. that is sent over a communication cable. Accordingly, for example, if a user would like to look at the other side of the partition, for example, out of a window, as in the case of a partition not provided with an information display device, this partition provided with the information display device requires the user himself to move to a position where the partition will not block his or her view, thus being greatly troublesome for the user.

Further, in this partition provided with the information display device, its information display device is mounted to a mounting panel in such a manner that this mounting panel can be attached to and detached from a body of the partition, to enable easily this mounting panel to be attached to an arbitrary position on the body of the partition. In this case, to use the information display device in condition where it is separated from the partition, the mounting panel to which the information display device is mounted is detached, in which case the information display device would be carried around in condition where it is mounted to the mounting panel, thus inconveniencing the user greatly.

Also, conventionally, it has been proposed to provide a furniture piece with a display section. In a display section described in, for example, Japanese Utility-Model Application Publication No. Hei 6-38691, a window section is arranged in such a manner that a viewer can see it and part of a translucent film that represents display target information is arranged to this window section and, further, this film is illuminated by a lighting system, thereby enabling the viewer to watch the display target information.

This display section in the display-attached furniture piece does not display an image by using a video signal and also has a low degree of freedom in changing an image to be displayed. Further, in this display-attached furniture piece, the display section is added to such a portion of a furniture piece as not to obstruct original use thereof, for example, a back side thereof, so that functions of the furniture piece are not greatly upgraded.

DISCLOSURE OF THE INVENTION

It is an object of the present invention to provide a space-dividing apparatus that enables a user to easily observe, for example, the other side of a single-leaf screen. It is another object of the present invention to provide a space-dividing apparatus that enables to be separately used with ease any image display elements mounted to, for example, a single-leaf screen.

The space-dividing apparatus relative to the invention has a division plate section for dividing a space, an image display element arranged on the division plate section at a front surface side thereof, and an image pickup element mounted on the division plate section at a back surface side thereof, wherein at least an image due to a video signal obtained through imaging by the image pickup element can be displayed on the image display element.

In the present invention, the space is divided by the division plate section. In this case, the division plate section constitutes a single-leaf screen, a divider (a partition), a wall, etc. On the front surface side of this division plate section, the image display element is arranged. This image display element may be not only a display such as a liquid crystal display (LCD) or a plasma display panel (PDP) but also a TV receiving set including a video signal processing circuit such as a tuner, for example.

Also, the image pickup element (video camera) is mounted on the division plate section at the back surface side thereof. With this, at least by supplying the image display element with a video signal obtained by the image pickup element, an image due to the video signal can be displayed.

When a user would like to look at the other side of the division plate section, as described above, it may enter such condition as to enable an image due to a video signal obtained by the image pickup element to be displayed on the image display element arranged on the division plate section at the front surface side thereof. Accordingly, the user can easily observe the other side of this division plate section without moving to a position where the division plate section does not block his or her view.

It is to be noted that a direction to pick up an image with the image pickup element can be changed on the basis of position information of the user. A position of the user can be detected as a position of a remote controller, for example. In this case, the image pickup direction by the image pickup element can be aligned with a line of sight of the user, thereby enabling an image suited for the user's position to be displayed on the image display element.

For example, the image display element(s) arranged on the division plate section at the front surface side thereof is (are) one or plural elements. The plural image display elements are arranged in a matrix shape. This allows an image to be zoomed and displayed by using the plural image display elements. Further, the image pickup element (s) arranged on the division plate section at the back surface side thereof is (are) one or plural elements. For example, as described above, if plural image display elements are arranged on the division plate section at the front surface side thereof, plural image pickup elements are mounted at positions that correspond to the plural image display elements, respectively. In this case, for example, it is possible to display images due to the video signals obtained with the plural image pickup elements on the respectively corresponding image display elements.

Alternatively, a space-dividing apparatus relative to the invention has a division plate section for dividing a space, and an image display element arranged on the division plate section at a front surface side thereof in an attachable/detachable manner.

In the present invention, the image display element can be used in condition where it is mounted to the front surface side of the division plate section and also in condition where it is detached from the front surface side of this division plate section.

For example, a decorative sheet movement mechanism for moving a decorative sheet and arranging it to a position where, when the image display element is detached, the image display element has been arranged on the division plate section may be provided corresponding to the arranged position of the image display element on the division plate section. With this, when the image display element is detached from the front surface of the division plate section, the decorative sheet is arranged on a position where the image display element has been arranged, thereby improving visual effects.

According to the present invention, by arranging an image display element on a division plate section, at a front surface side thereof, that divides a space and also mounting an image pickup element on this division plate section at a back surface side thereof, it is possible to display on the image display element an image due to a video signal obtained with the image pickup element so that a user can easily observe the back surface side of the division plate section. Also, according to the present invention, the image display element is arranged on the division plate section, at the front surface side thereof, that divides the space in an attachable/detachable manner, thereby enabling the image display element to be easily separated therefrom and used.

It is a further object of the present invention to greatly upgrade functions of a storage arrangement such as a furniture piece.

A storage arrangement related to the present invention has a storage section body and a flat plate section that covers a storage opening of this storage section body wherein an image display element for displaying an image by using a video signal is arranged on an outer side surface of the flat plate section.

In the present invention, the storage opening of the storage section body is covered with the flat plate section. On the outer side surface of this flat plate section, the image display element that displays an image by using the video signal is arranged. As this image display element, for example, a flat panel display such as a liquid crystal display (LCD) or a plasma display panel (PDP) may be used. For example, if the storage section body is a kitchen cabinet body, the flat plate section is a kitchen cabinet flapper or a door. Also, for example, if the storage section body is a dress case body, the flat plate section is a case cover.

In such a manner, the image display element is arranged on the flat plate section that covers the storage opening of the storage section body at such a position where a user can easily watch and the image display element displays an image by using a video signal in this configuration, so that an image displayed on this image display element has a high degree of freedom, thereby enabling to be greatly improved any functions of the storage arrangement such as a furniture piece.

For example, if the storage section bodies are provided more than one and arranged in a matrix shape, one image can be zoomed in and displayed on them by using all of image display elements arranged on the corresponding flat plate sections of the plurality of storage section bodies. In this case, on each flat plate section, zoom conversion processing, interlace-progressive (IP) conversion processing and the like are performed for displaying the corresponding image on its own image display element.

For example, the flat plate section is equipped with a recording section such as a semiconductor memory or a hard disk drive for recording the video signal. Also, for example, on an inner side surface of the flat plate section, an image pickup element is mounted. Furthermore, for example, a lighting system for illuminating an interior of the storage section body is mounted on the inner side surface of the flat plate section. For example, each time the user stores an object in the storage section body or takes it out of this body, a video signal obtained by imaging an interior of this storage section body can be recorded in the recording section, so that the user can periodically confirm what is stored in this storage section body and easily manage the stored articles without directly looking into the storage section body.

For example, the image pickup element may be mounted to the outer side surface of the flat plate section and the flat plate section itself may be equipped with the recording section such as a semiconductor memory or a disk recording device for recording a video signal. It is thus possible to display an image due to a video signal obtained by imaging the user with the image pickup element on the image display element arranged on the flat plate section, thereby obtaining mirror display effects. Further, in this case, by recording the video signal in the recording section beforehand, it is possible to display not only a present image of the user but also his or her past image side-by-side, thereby enabling his physical condition etc. to be easily judged. Further, in such a case, by recording a video signal related to user's own clothes (jackets, pants, skirts, etc.) in the recording section beforehand, it is possible to display on the image display element an image in which user's current face and the clothes are combined, thereby coordinating the clothes easily.

For example, if a lock mode is set, locked condition is entered in which the storage opening of the storage section body is covered by flat plate section. For example, this locked condition is released by performing authentication processing. In this case, the authentication processing is performed on the basis of a video signal obtained through imaging with the image pickup element and an authentication video signal recorded in the recording section beforehand.

For example, on the outer side surface of the storage section body, a connection terminal may be arranged for electrical connection with any other storage section body. It is thus possible to arrange the plurality of storage section bodies in, for example, a matrix shape and electrically connecting them to each other, thereby providing big-screen display etc. by use of all of the image display elements arranged on the respectively corresponding flat plate sections of the plurality of storage section bodies.

According to the present invention, an image display element for displaying an image by using a video signal is arranged on an outer side surface of a flat plate section that covers a storage opening formed in a storage section body, thereby enabling to be greatly improved any functions of a storage arrangement.

BRIEF DESCRIPTION OF THE DRAWINGS

FIG. 3 is a perspective view for showing a condition where TV receiving sets are detached;

FIG. 9 is an explanatory view of movement when the TV receiving set is attached;

FIG. 10 is an explanatory view of movement when the TV receiving set is attached;

FIG. 23 is an explanatory diagram of how to obtain an imaging direction;

FIG. 24 is a drawing for showing a variant of the imaging direction;

BEST MODE FOR CARRYING OUT THE INVENTION

Figure 1:
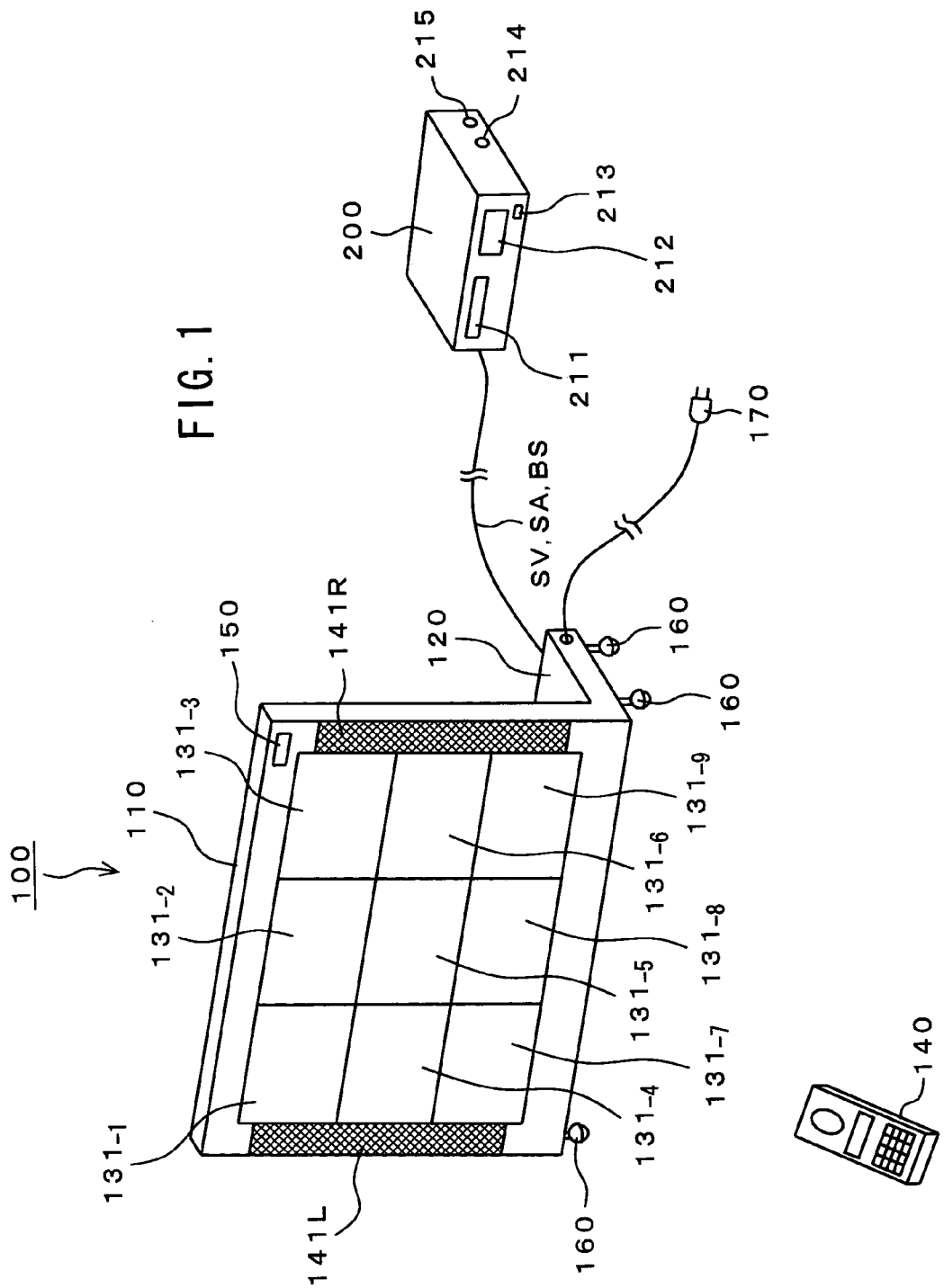
FIG. 1 is a perspective view for showing a configuration of a single-leaf screen device according to a first embodiment.

Embodiments of the present invention will be described below. FIG. 1 shows a configuration of a single-leaf screen device 100 according to the embodiment.

This single-leaf screen device 100 has a rectangular division plate section 110 that divides a space. This division plate section 110 is connected to a rectangular base section 120 with it being erected upright at a longitudinal end of this base section 120.

At a midsection of this division plate section 110 on a front surface side thereof, nine TV receiving sets $131_{-1}$ through $131_{-9}$ are arranged in an attachable/detachable manner in a 3-by-3 matrix shape. These TV receiving sets $131_{-1}$ through $131_{-9}$ each constitute an image display element. These TV receiving sets $131_{-1}$ through $131_{-9}$ each have a flat panel display such as a liquid crystal display (LCD) and a plasma display panel (PDP).

Further, a left-side speaker 141L is arranged at a left end of this division plate section 110 on the front surface side thereof and a right-side speaker 141R is arranged at a right end thereof. Also, at a right top of this division plate section 110, a remote-control photoreceptor section 150 is arranged for receiving a remote-control signal (infrared signal) from a remote controller 140 which a user operates.

Figure 2:
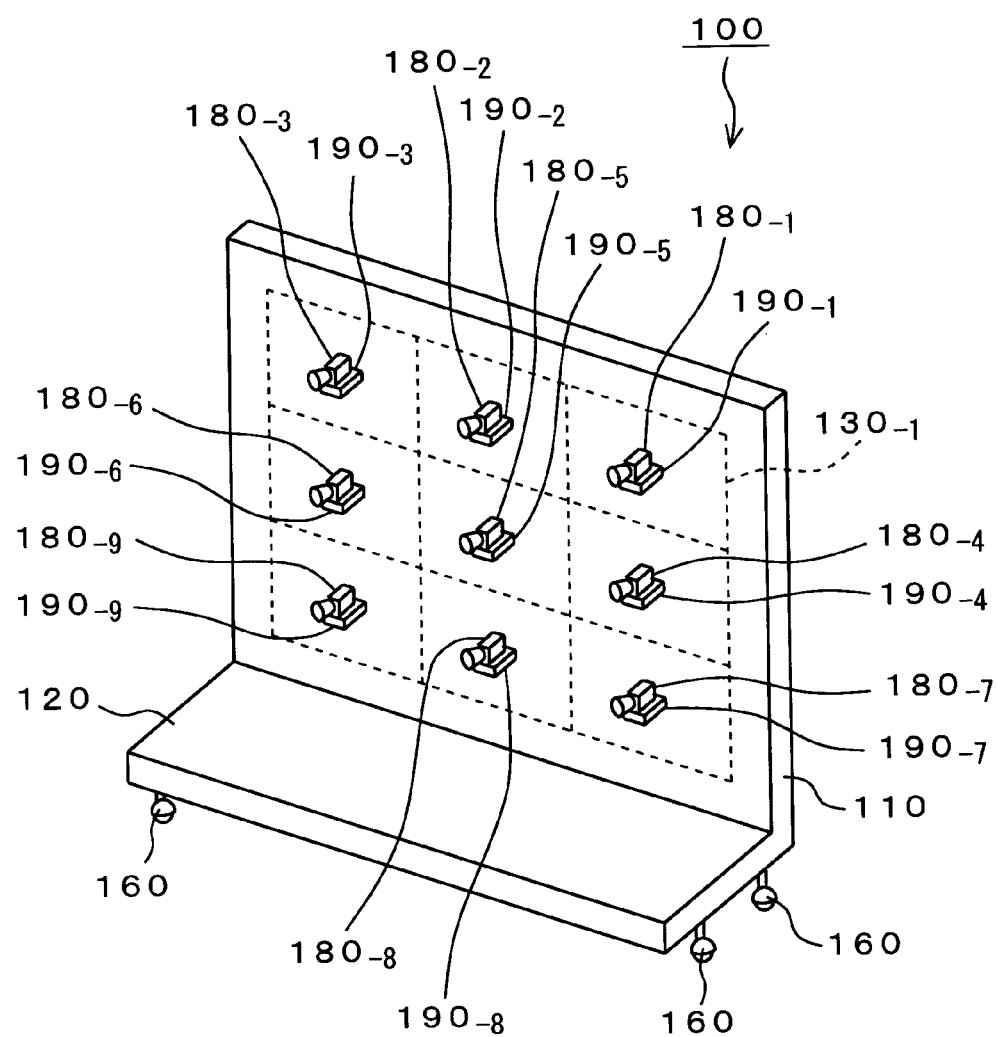
FIG. 2 is a perspective view for showing a back surface of the single-leaf screen device.

Further, on a back surface side of this division plate section 110, as shown in FIG. 2, nine image pickup elements (video cameras) $180_{-1}$ through $180_{-9}$ are attached in condition where they are mounted on automatic camera platforms $190_{-1}$ through $190_{-9}$ respectively. These image pickup elements $180_{-1}$ through $180_{-9}$ are attached to positions that respectively correspond to the nine TV receiving sets $131_{-1}$ through $131_{-9}$ arranged on the above described division plate section 110 at the front surface side thereof. It is because an imaging direction of the image pickup elements $180_{-1}$ through $180_{-9}$ can be changed to a direction along a line of sight of a user based on the user position information, which will be described later, that the image pickup elements $180_{-1}$ through $180_{-9}$ are attached to the division plate section 110 via the automatic camera platforms $190_{-1}$ through $190_{-9}$, respectively.

Corresponding to four corners of a bottom of the base section 120, casters 160 are attached as movement assisting means. By thus attaching the caster 160, the single-leaf screen device 100 can move easily.

This single-leaf screen device 100 is supplied with power via a power supply plug 170 leading from its base section 120. Further, this single-leaf screen device 100 is supplied with a video signal SV and an audio signal SA and, further, a broadcast signal BS received through an antenna, not shown, from an AV center 200.

A cabinet of the AV center 200 includes a hard disk drive (HDD), a digital versatile disk (DVD) device, a tuner etc., which will be described later. Further, a disk insertion opening 211, a display element 212 for indicating an operating state, and a remote-control photoreceptor section 213 for receiving a remote-control signal (infrared signal) from the remote controller 140 are arranged on a front surface of the cabinet of this AV center 200.

Further, an antenna terminal 214 for allowing the broadcast signal BS received by the antenna to be input and an external input terminal 215 for allowing a video signal and an audio signal to be input from an outside are arranged on a side surface of the cabinet of this AV center 200.

The video signal SV and the audio signal SA to be transmitted from this AV center 200 to the single-leaf screen device 100 may be, for example, the video signal and the audio signal input through the external input terminal 215, the video signal and the audio signal obtained with the tuner, the video signal and the audio signal reproduced by the HDD, or the video signal and the audio signal reproduced by the DVD. Which of these video signal and the audio signal are to be transmitted from this AV center 200 to the single-leaf screen device 100 can be commanded by the user's operation of the remote controller 140.

Screens of the TV receiving sets $131_{-1}$ through $131_{-9}$ arranged on the division plate section 110 at the front surface side thereof display any one of an image due to the video signal SV supplied from the AV center 200, an image due to the video signal SV obtained through imaging with the image pickup elements $180_{-1}$ through $180_{-9}$, and an image due to the video signal SV obtained with the tuners in these TV receiving sets $131_{-1}$ through $131_{-9}$ based on the broadcast signal BS supplied from the AV center 200. Which one of these images is to be displayed on the screens of these TV receiving sets $131_{-1}$ through $131_{-9}$ can be commanded by the user's operation of the remote controller 140. In this case, the screens of the TV receiving sets $131_{-1}$ through $131_{-9}$ can each display one image or one image can be displayed using all of the screens of these TV receiving sets $131_{-1}$ through $131_{-9}$.

As described above, the TV receiving sets $131_{-1}$ through $131_{-9}$ are arranged detachably on the division plate section 110 at the front surface side thereof. FIG. 3 shows condition where the TV receiving sets $131_{-1}$ through $131_{-9}$ are all detached from the division plate section 110. In this case, to positions where the TV receiving sets $131_{-1}$ through $131_{-9}$ have been arranged, decorative sheets 311-313 are moved and arranged. If the TV receiving sets $131_{-1}$ through $131_{-9}$ are detached from the front surface side of the division plate section 110, the decorative sheets 311-313 are arranged on positions which these TV receiving sets $131_{-1}$ through $131_{-9}$ have been arranged, thereby improving visual effects.

Figure 4A:
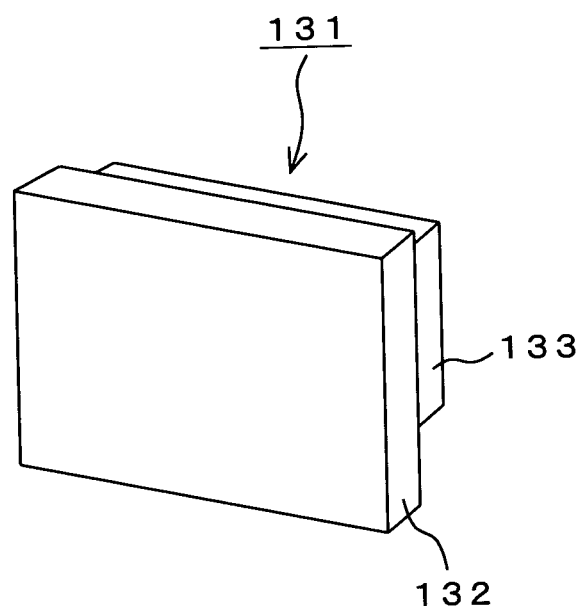
FIG. 4A is a perspective view for showing a structure of the TV receiving set.
Figure 4B:
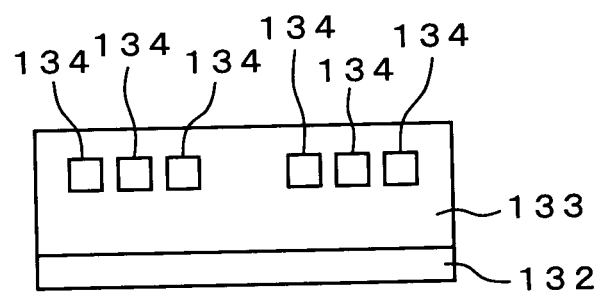
FIG. 4B is a top view for showing the structure of the TV receiving set.
Figure 4C:
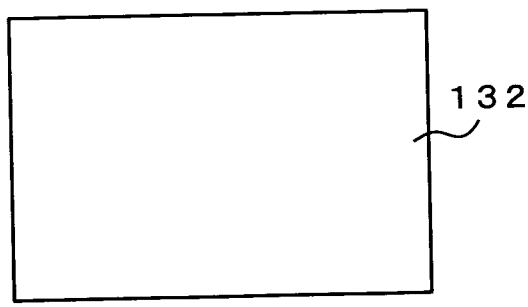
FIG. 4C is a front view for showing the structure of the TV receiving set.
Figure 4D:
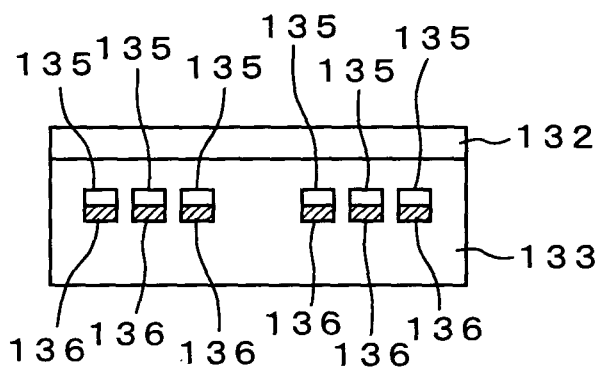
FIG. 4D is a bottom view for showing the structure of the TV receiving set.
Figure 4E:
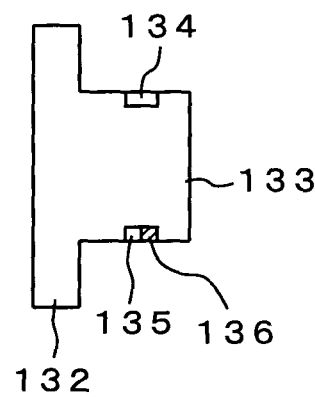
FIG. 4E is a vertical cross-sectional view for showing the structure of the TV receiving set.

Next, the TV receiving set 131 will be described which has been used as any of the above-described TV receiving sets $131_{-1}$ through $131_{-9}$. FIG. 4A shows a perspective view of the TV receiving set 131. This TV receiving set 131 has a screen section 132 on which a display is arranged and a fixing section 133 which is connected to a rear part of this screen section 132 and used for fixture to the above-described division plate section 110. Processing circuits such as a tuner for obtaining a video signal of a desired channel from the broadcast signal BS and a signal switchover circuit for selecting an externally input video signal or a video signal obtained with the tuner and supplying it to the display are built in, for example, the fixing section 133.

FIGS. 4B, 4C, 4D, and 4E respectively show a top view, a front view, a bottom view, and a schematic vertical cross-sectional view of the TV receiving set 131. In a top surface of the fixing section 133 of this TV receiving set 131, six locking holes 134 are formed through which locking claws 355 each extending from the division plate section 110 are inserted when attaching it to the division plate section 110 and fixing it. Further, in a bottom surface of the fixing section 133 of this TV receiving set 131, six locking holes 135 are formed through which later-described locking claws 385 each extending from the division plate section 110 are inserted when attaching it to the division plate section 110 and fixing it. At this locking hole 135, a connection electrode 136 is provided. Through this connection electrode 136, the TV receiving set 131 is supplied with the video signal, the broadcast signal from the antenna, the power, the command signal (remote-control signal), etc.

Figure 5A:
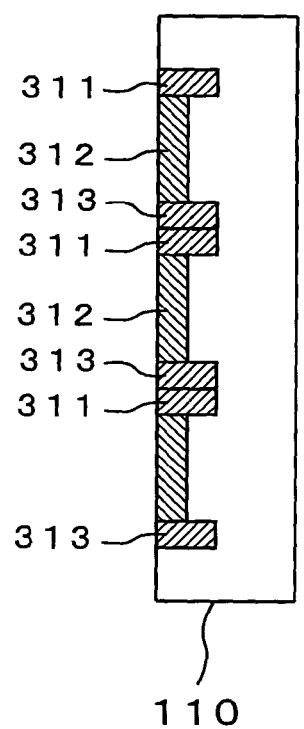
FIG. 5A is a drawing for showing positions of decorative sheets in condition where the TV receiving sets are detached.
Figure 5B:
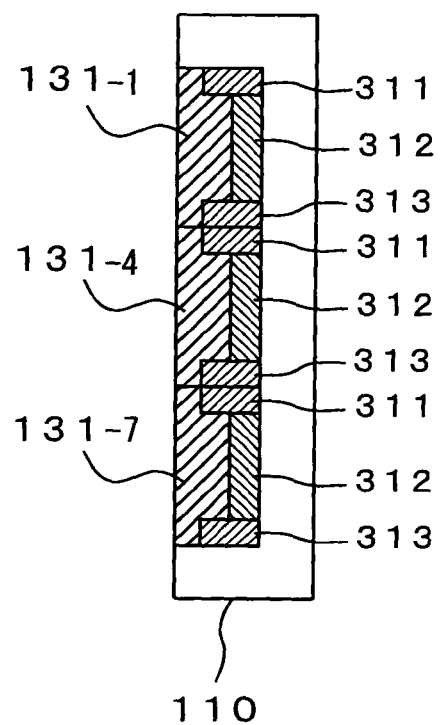
FIG. 5B is a drawing for showing positions of the decorative sheets in condition where the TV receiving sets are attached.

FIG. 5A shows positions of the decorative sheets 311-313 in condition where the TV receiving sets $131_{-1}$ through $131_{-9}$ are detached. FIG. 5B shows positions of the decorative sheets 311-313 in condition where the TV receiving sets $131_{-1}$ through $131_{-9}$ are attached to the division plate section 110. These FIGS. 5A and 5B schematically show, for example, the TV receiving sets 131₋₁, 131₋₄, and 131₋₇. If the TV receiving sets 131₋₁ through 131₋₉ are detached from the front surface side of the division plate section 110, the decorative sheets 311-313 are moved to positions where these sets have been arranged. In this case, the decorative sheets 311-313 are flat surfaced with each other on the front surface side of the division plate section 110.

Figure 6A:
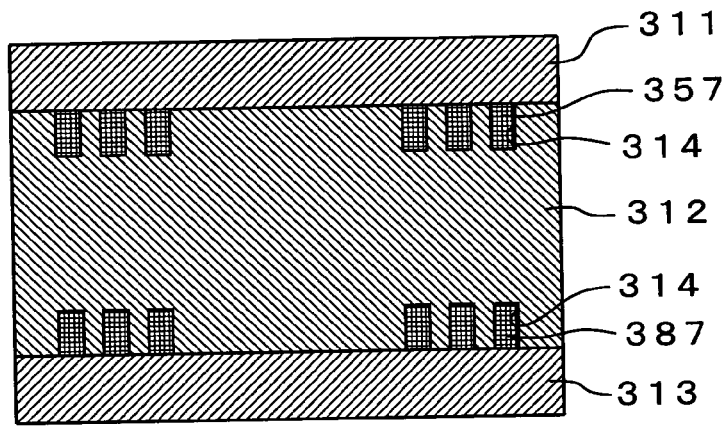
FIG. 6A is a drawing for showing a condition where the TV receiving sets are detached from a front surface of a division plate section.
Figure 6B:
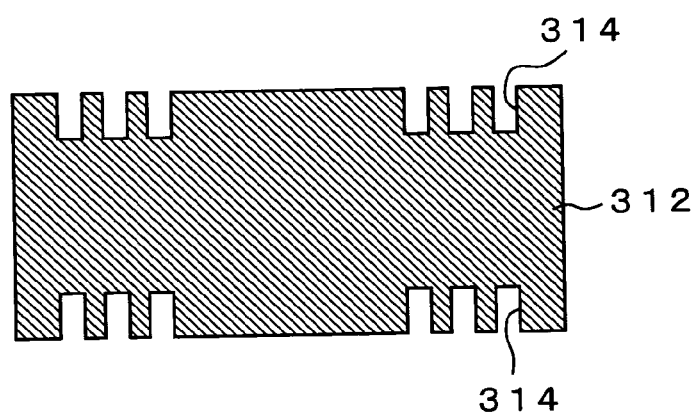
FIG. 6B is a drawing for showing a shape of the decorative sheet.

FIG. 6A shows the decorative sheets 311-313 wherein the TV receiving sets 131₋₁ through 131₋₉ are detached from the front surface side of the division plate section 110. FIG. 6B shows only the decorative sheet 312 wherein it is taken out. In each of an upper part and a lower part of the decorative sheet 312, six rectangular notches 314 are formed through which working strips 357 and 387 of later-described lock sections 358 and 388 are permitted to pass. In FIG. 6A, through the notch 314 in the decorative sheet 312, the working strips 357 and 387 of the lock sections 358 and 388 can be seen.

Figure 7:
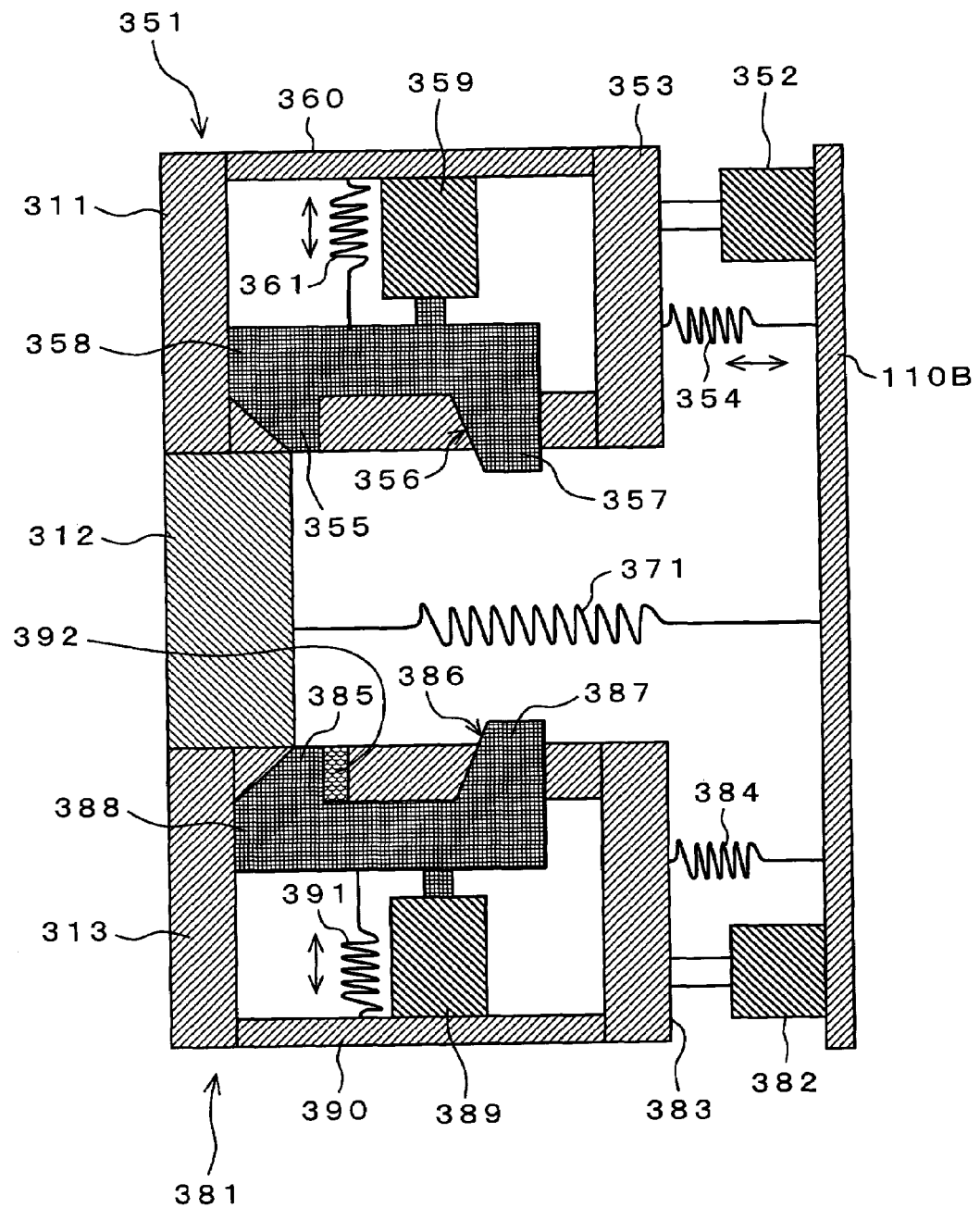
FIG. 7 is a drawing for showing a decorative sheet moving mechanism and a lock mechanism for the TV receiving set.

Next, a decorative sheet moving mechanism and a TV lock mechanism on the division plate section 110 will be described with reference to FIG. 7. FIG. 7 shows a portion that corresponds to a position where an arbitrary one of the TV receiving sets 131 is arranged. This FIG. 7 shows a condition where the TV receiving set 131 is detached.

The decorative sheet 311 is constituted of a front plate of a box-shaped member 351 whose bottom is open. This box-shaped member 351 is fixed to a rear site 110B of the division plate section 110 via a toggle lock mechanism 352. A coil spring 354 is arranged between a rear plate 353 of the box-shaped member 351 and the rear site 110B. This coil spring 354 always urges the box-shaped member 351 toward a front direction thereof. The toggle lock mechanism 352 enters a first lock condition in which the box-shaped member 351 is placed at an illustrated position and a second lock condition in which the TV receiving set 131 is attached and this box-shaped member 351 is moved in a rear direction by as much as a thickness of the screen section 132 of the TV receiving set 131.

Further, the lock section 358 that integrally has a locking claw 355 and a working strip 357 having an oblique section 356 is fixed to a top plate 360 of the box-shaped member 351 via a toggle lock mechanism 359. Between the top plate 360 of this box-shape member 351 and the lock section 358, a coil spring 361 is arranged. This coil spring 361 always urges the lock section 358 downward. The toggle lock mechanism 359 enters a first lock condition in which the lock section 358 is placed at an illustrated position and a second lock condition in which the TV receiving set 131 is attached and the locking claws 355 are inserted into the locking holes 134 in the fixing section 133 of the TV receiving set 131.

Figure 8A:
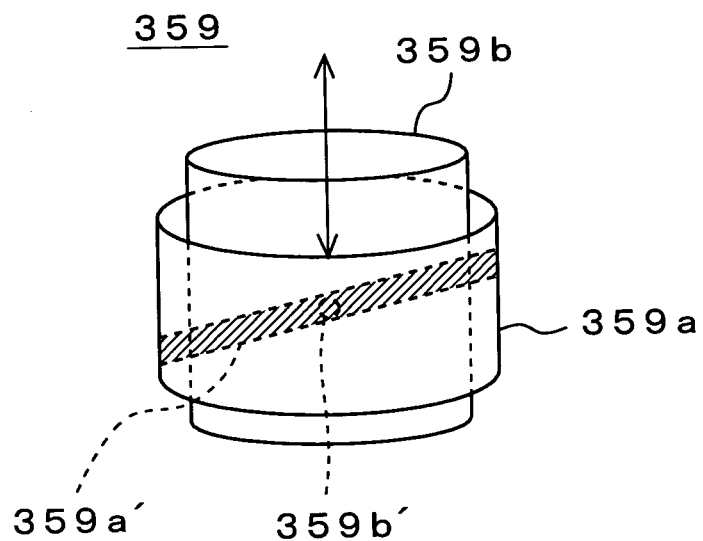
FIG. 8A is a drawing for showing an outlined configuration of a toggle lock mechanism.
Figure 8B:
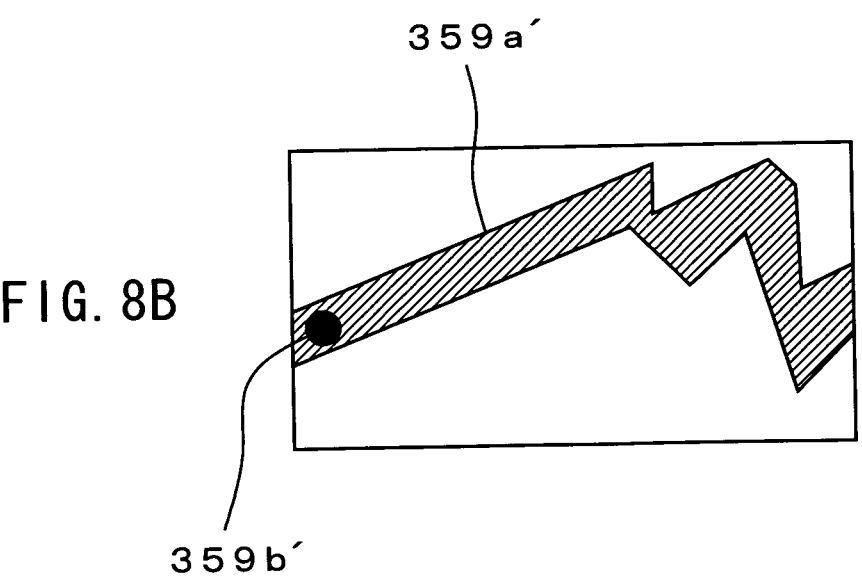
FIG. 8B is a developed view of an inner surface of a cylindrical section that constitutes the toggle lock mechanism.

FIGS. 8A and 8B show an outlined configuration (rotation type) of the toggle lock mechanism 359. As shown in FIG. 8A, this toggle lock mechanism is constituted of a cylindrical section 359a and a columnar section 359b which is inserted into this cylindrical section 359a in such a manner that it can move vertically therein. In an inner surface of the cylindrical section 359a, a groove 359a' is formed. FIG. 8B is a developed view of the inner surface of the cylindrical section 359a. Further, on an outer side surface of the columnar section 359b, a protrusion 359b' which is free-fit into the above-described groove 359a' is erected upright.

The columnar section 359b moves vertically as the lock section 358 (see FIG. 7) does so. As the columnar section 359b moves vertically, this columnar section 359b rotates due to effects of the groove 359a' in the cylindrical section 359a. This rotation allows a position of the protrusion 359b' of the columnar section 359b to alter. By catching the protrusion 359b' of the columnar section 359b into the groove 359a' in the cylindrical section 359a, the coil spring 361 is switched between active condition and inactive condition and the toggle lock mechanism 359 enters the first or second lock condition as described above.

Although not described, the toggle lock mechanism 352 is also configured similar to the above-described toggle lock mechanism 359 and so enters the first or second lock condition as described above.

Referring now back to FIG. 7, a coil spring 371 is arranged between the decorative sheet 312 and the rear site 110B of the division plate section 110. This decorative sheet 312 comes stable at an illustrated position, and at a position away from the illustrated position toward the back direction, it is always urged by this coil spring 371 toward a front direction.

Further, components of the decorative sheet 313 are basically configured in the same way as those of the above-described decorative sheet 311. That is, the decorative sheet 313 is constituted of a front plate of a box-shaped member 381 whose top is open. This box-shaped member 381 is fixed to the rear site 110B of the division plate section 110 via a toggle lock mechanism 382. A coil spring 384 is arranged between a rear plate 383 of the box-shaped member 381 and the rear site 110B. This coil spring 384 always urges the box-shaped member 381 toward the front direction. The toggle lock mechanism 382 enters a first lock condition in which the box-shaped member 381 is placed at the illustrated position and a second lock condition in which the TV receiving set 131 is attached and, therefore, this box-shaped member 381 is moved toward a rear direction by as much as the thickness of the screen section 132 of the TV receiving set 131.

Further, the lock section 388 that integrally has a locking claw 385 and a working strip 387 having an oblique section 386 is fixed to a bottom plate 390 of the box-shaped member 381 via a toggle lock mechanism 389. Between the bottom plate 390 of this box-shape member 381 and the lock section 388, a coil spring 391 is arranged. This coil spring 391 always urges the lock section 388 upward. The toggle lock mechanism 389 enters a first lock condition in which the lock section 388 is placed at an illustrated position and a second lock condition in which the TV receiving set 131 is attached and the locking claws 385 are inserted into the locking holes 135 in the fixing section 133 of the TV receiving set 131.

It is to be noted that each of the locking claws 385 of the lock section 388 is equipped with a connection electrode 392. In condition where the TV receiving set 131 is attached and each of the locking claws 385 are inserted into each of the locking holes 135 in the fixing section 133 of the TV receiving set 131, this connection electrode 392 is electrically connected to the connection electrode 136 (see FIG. 7) arranged in each of the locking holes 135. That is, the TV receiving set 131 is supplied with the video signal SV, the broadcast signal BS from the antenna, the power, and the command signal via the connection electrode 392 provided on each of these locking claws 385 and the connection electrode 136 provided in each of these locking holes 135.

Further, although not described more in detail, the toggle lock mechanisms 382 and 389 are also configured in the same way as the above-described toggle lock mechanism 359 (see FIGS. 8A and 8B).

Next, operations will be described for attaching and detaching the TV receiving set 131 on the decorative sheet moving mechanism and the TV lock mechanism shown in FIG. 7.

The attaching operations will be described below. Starting from the condition shown in FIG. 7, the fixing section 133 of this TV receiving set 131 is aligned with the decorative sheet 312 and the TV receiving set 131 is then pushed toward the back direction. FIG. 9 shows a condition where the TV receiving set 131 is pushed in a little. It is to be noted that this FIG. 9 shows only components of the decorative sheet 311 and omits those of the decorative sheet 313 because they move in the same way as those of the decorative sheet 311. This holds true also with the following figures. FIG. 10 shows a condition where the TV receiving set 131 is further pushed than the condition shown in FIG. 9.

Figure 11:
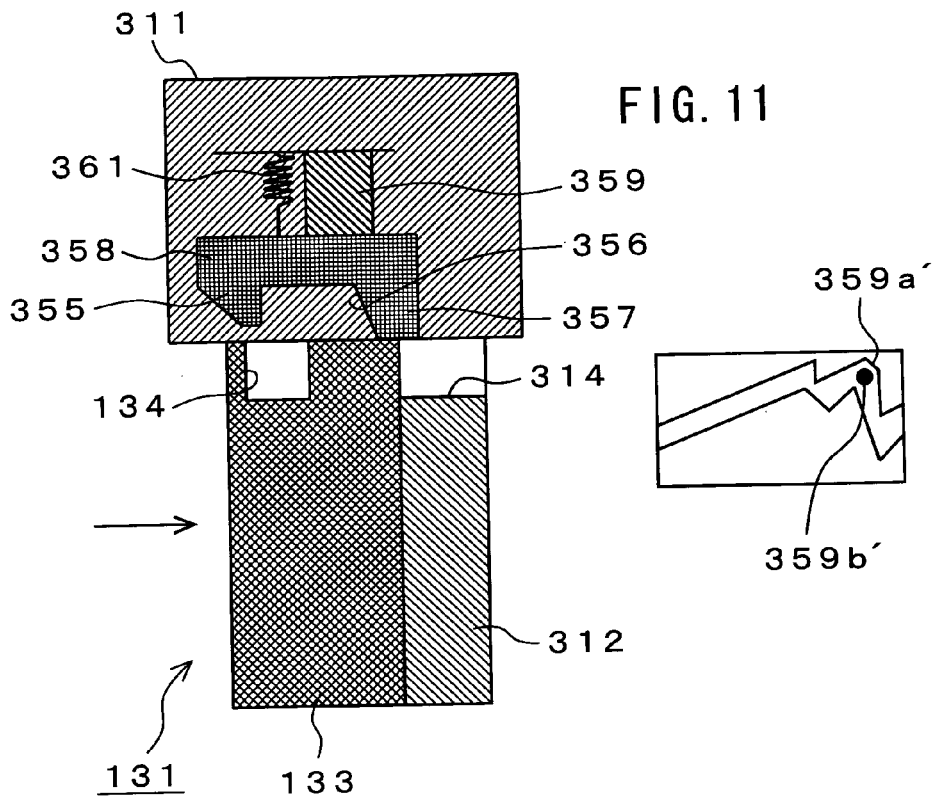
FIG. 11 is an explanatory view of movement when the TV receiving set is attached.

FIG. 11 shows a condition where the TV receiving set 131 is still further pushed than the condition shown in FIG. 10. Up to this condition, the fixing section 133 of the TV receiving set 131 has continued to abut against the oblique section 356 of the working strip 357 so that the lock section 358 has moved upward to the illustrated position against urging force of the coil spring 361.

Figure 12:
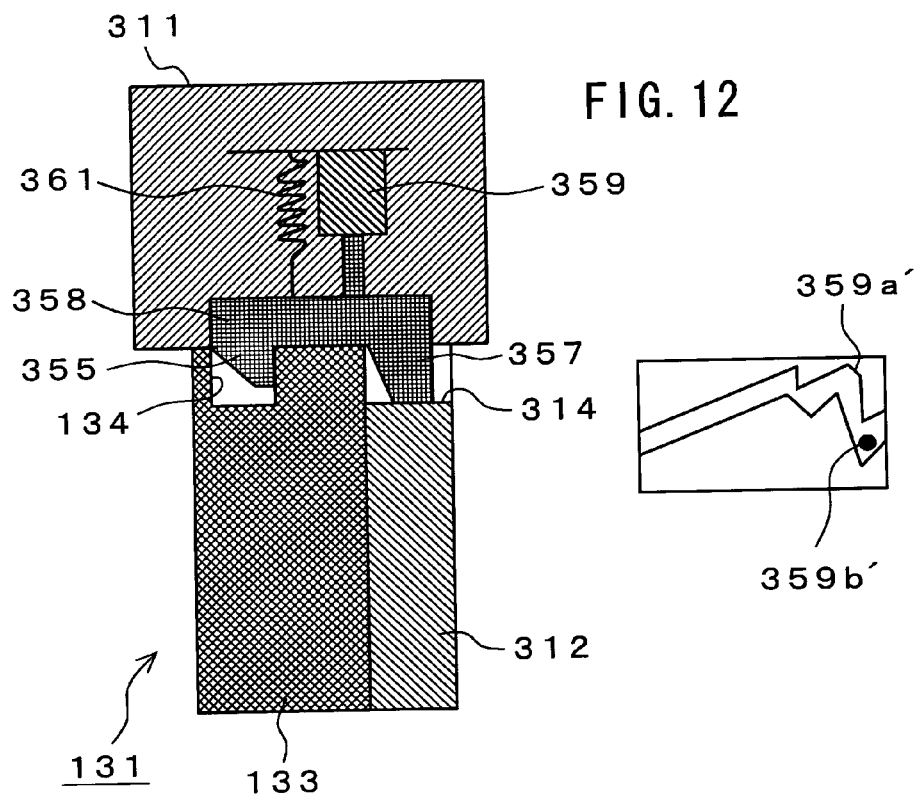
FIG. 12 is an explanatory view of movement when the TV receiving set is attached.

If the user stops pushing the TV receiving set 131 in this condition of FIG. 11, the coil spring 371 (see FIG. 7) connected to the decorative sheet 312 presses back this decorative sheet 312 hence the TV receiving set 131 toward the front direction, so that the locking holes 134 in the fixing section 133 of the TV receiving set 131 come to a position that faces the locking claws 355 of the lock section 358. Further, in the condition of FIG. 11, the toggle lock mechanism 359 is released from the first lock condition, and moreover, since the lock section 358 is urged downward by the coil spring 361, the locking claws 355 moves into the locking holes 134 to provide such condition as shown in FIG. 12. In this case, the working strip 357 of the lock section 358 moves into the rectangular notch 314 in the decorative sheet 312, so that this decorative sheet 312 will not block the locking claws 355 from moving into the locking holes 134.

It is to be noted that in the condition shown in FIG. 12, for example, the screen section 132 of the TV receiving set 131 comes to abut against the decorative sheet 311. Although not shown, by pushing the TV receiving set 131 further away from this condition of FIG. 12, the toggle lock mechanism 352 (see FIG. 7) enters the second lock condition. This completes attachment of the TV receiving set 131.

Detaching operations will be described below. Starting from the second lock condition of the toggle lock mechanism 352, as the TV receiving set 131 is further pushed, this toggle lock mechanism 352 is released from the second lock condition. Then, due to urging forces of the coil springs 354, 371, etc. toward the front direction, the decorative sheets 311 and 312, the TV receiving set 131, etc. moves toward the front direction, which causes the toggle lock mechanism 352 to enter the first lock condition.

Figure 13:
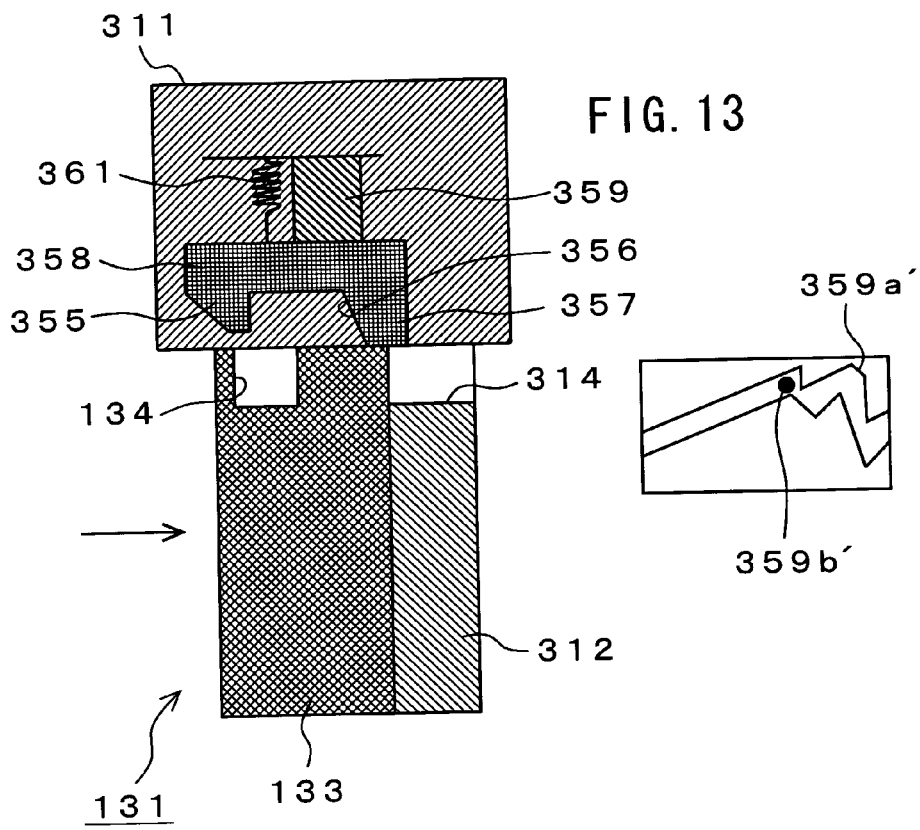
FIG. 13 is an explanatory view of movement when the TV receiving set is detached.

Further, as described above, as the TV receiving set 131 is pushed, the toggle lock mechanism 359 enters such condition as shown in FIG. 13. Up to this condition, the fixing section 133 of the TV receiving set 131 has continuously abutted against the oblique section 356 of the working strip 357, so that the lock section 358 has moved upward against urging force of the coil spring 361 to an illustrated position. Accordingly, the toggle lock mechanism 359 is released from the second lock condition.

Figure 14:
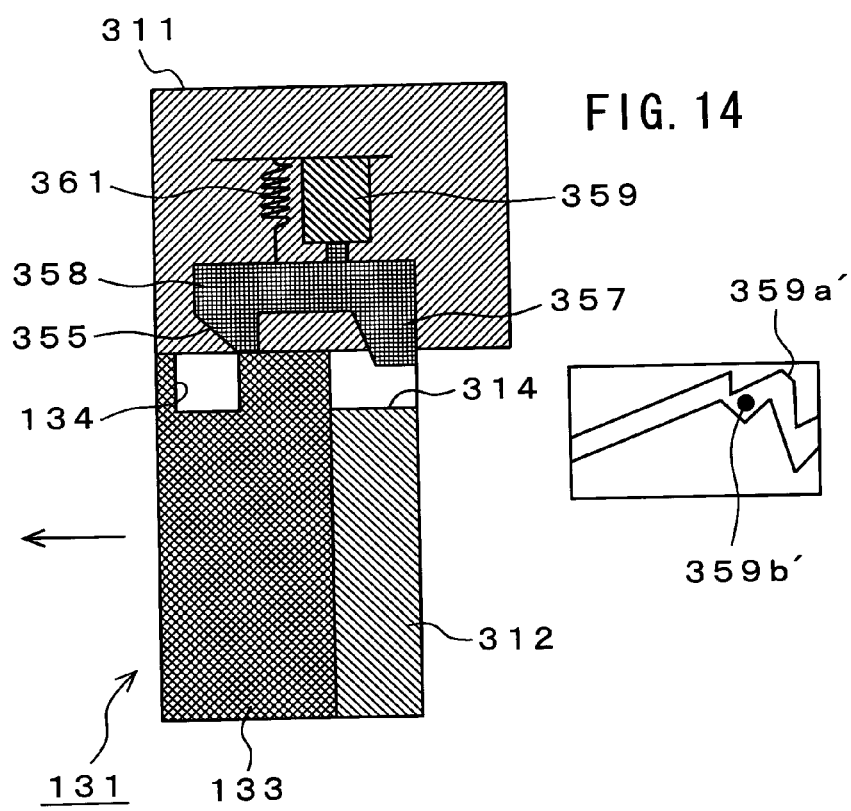
FIG. 14 is an explanatory view of movement when the TV receiving set is detached.

If the user stops pushing the TV receiving set 131 in this condition of FIG. 13, the coil spring 371 (see FIG. 7) connected to the decorative sheet 312 presses back this decorative sheet 312 hence the TV receiving set 131 toward the front direction, so that the rectangular notch 314 in the decorative sheet 312 comes to position that faces the working strip 357 of the lock section 358. Further, as described above, the toggle lock mechanism 359 has already been released from the second lock condition, and moreover, since the lock section 358 is urged downward by the coil spring 361, the lock section 358 moves downward to some extent to provide such condition as shown in FIG. 14. In this condition shown in FIG. 14, the toggle lock mechanism 359 enters the first lock condition.

In this condition of FIG. 14, the locking claws 355 of the lock section 358 do not move to a position where the fixing section 133 of the TV receiving set 131 exists. Therefore, due to urging force of the coil spring 371 etc. connected to the decorative sheet 312 toward the front direction, the TV receiving set 131 is pressed back toward the front direction, so that the front surface side of the TV receiving set 131 protrudes from the division plate section 110. This allows the user to detach the TV receiving set 131 easily.

Figure 15A:
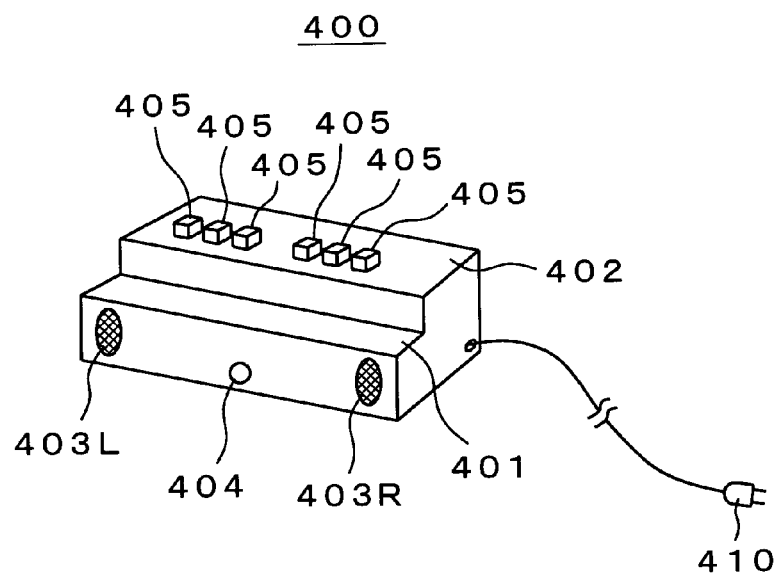
FIG. 15A is a perspective view for showing a configuration of a pedestal.
Figure 15B:
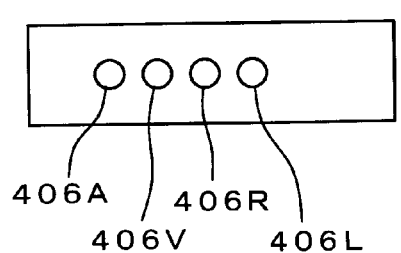
FIG. 15B is a rear view for showing the configuration of the pedestal.

FIGS. 15A and 15B show a configuration of a pedestal 400 on which the TV receiving set 131 detached from the division plate section 110 is mounted to be used. FIG. 15A shows a perspective view of the pedestal 400 and FIG. 15B shows a rear view of the pedestal 400.

The pedestal 400 has a step-wise configuration including a mounting section 401 on which the screen section 132 is mounted and a mounting section 402 higher than the mounting section 401 in level on which the fixing section 133 is mounted, which correspond to a step between the screen section 132 and the fixing section 133 of the TV receiving set 131 (see FIG. 4A). On a right side of a front surface of this pedestal 400, a right-side speaker 403R is arranged, while on a left side of this front surface, a left-side speaker 403L is arranged. Further, at a midsection of the front surface of this pedestal 400, a remote-control photoreceptor section 404 is arranged for receiving a remote-control signal (infrared signal) from the remote controller 140.

This pedestal 400 is supplied with power via a power supply plug 410 derived from this pedestal 400. Further, this pedestal 400 is provided with six connection electrodes 405 that are inserted into the respective six locking holes 135 formed in the bottom surface of the fixing section 133 of the TV receiving set 131 for connection to their connection electrode 136 (see FIG. 4D). Also, as shown in FIG. 15B, this pedestal 400 is provided with an external input terminal 406V for a video signal, right and left external sound input terminals 406R and 406L, and an antenna terminal 406A for receiving a broadcast signal from the antenna on a back surface side thereof.

Figure 16:
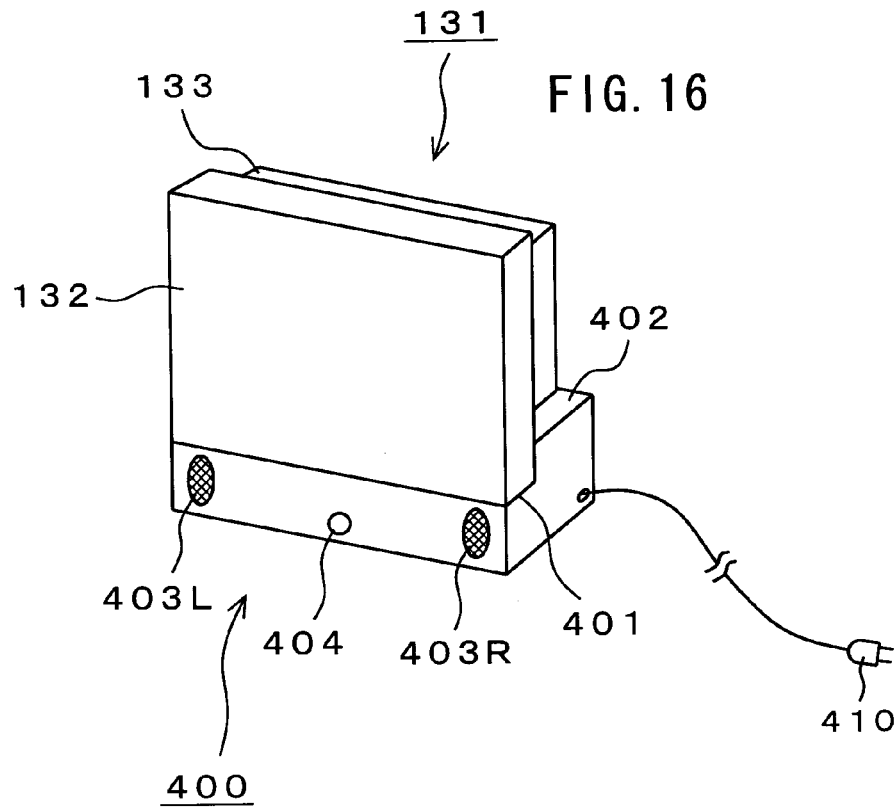
FIG. 16 is a drawing for showing a condition where the TV receiving set is mounted on the pedestal.

FIG. 16 shows a condition where the TV receiving set 131 is mounted on the pedestal 400. In this condition, the screen of the TV receiving set 131 can display thereon either an image due to a video signal input to the external input terminal 406V or an image due to a video signal obtained with the tuner in this TV receiving set 131 based on a broadcast signal input to the antenna input terminal 406A. Further, the speakers 403R and 403L of the pedestal 400 can produce either sound due to audio signals input to the external input terminals 406R and 406L or sound due to an audio signal obtained with the tuner in the TV receiving set 131 based on a broadcast signal input to the antenna input terminal 406A.

Figure 17:
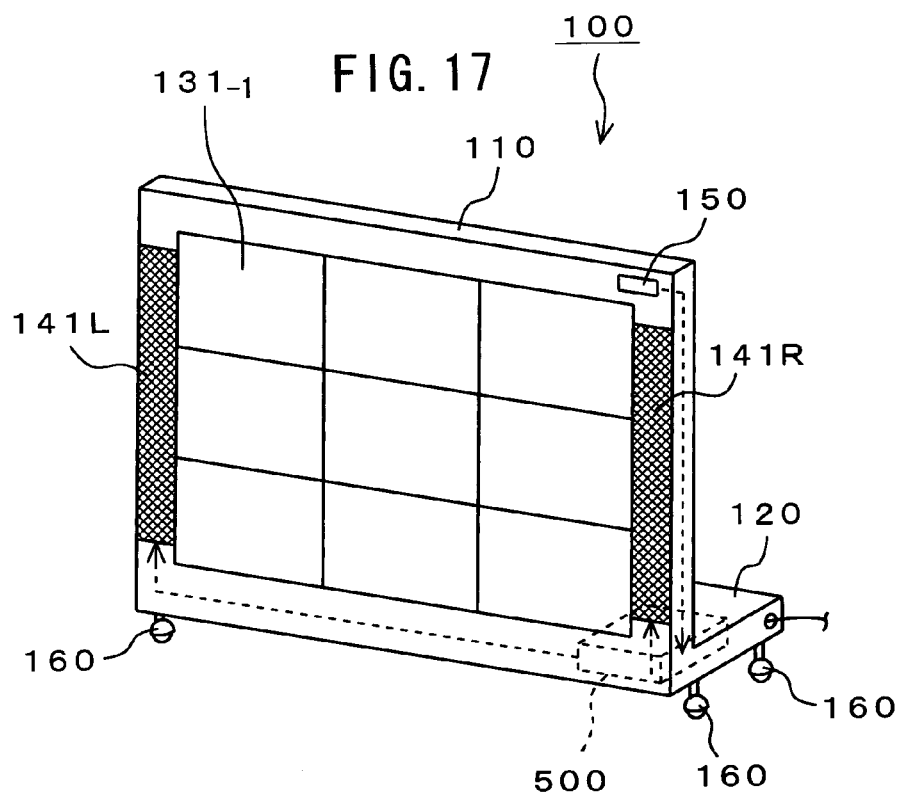
FIG. 17 is an explanatory view of wiring on a speaker and a remote-control photoreceptor section.

Next, a signal processing system of the single-leaf screen device 100 will be described below. As indicated by, for example, a broken line in FIG. 17, a signal processing section 500 of the single-leaf screen device 100 is built in the base section 120. A remote-control signal received by the remote-control photoreceptor section 150 is supplied to the signal processing section 500 through a signal line wired in the division plate section 110. Further, an audio signal related to output sound from the signal processing section 500 is supplied to the speakers 141R and 141L through the signal lines wired in the division plate section 110.

Figure 18:
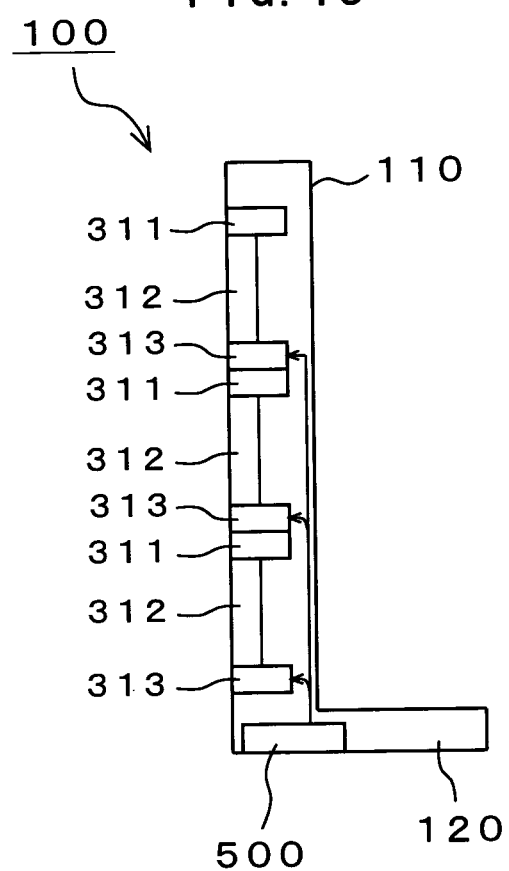
FIG. 18 is an explanatory view of wiring on the TV receiving set.

Further, to supply each of the TV receiving sets $131_{-1}$ through $131_{-9}$ arranged on the front surface side of the division plate section 110 with a video signal, a broadcast signal from the antenna, power, a command signal, etc., as shown in FIG. 18, these video signal, broadcast signal from the antenna, power, command signal, etc. are supplied from the signal processing section 500 to the connection electrode 392 (see FIG. 7) provided to a component of the decorative sheet 313, that is, the locking claws 385 of the lock section 388 through the signal lines wired in the division plate section 110.

Figure 19:
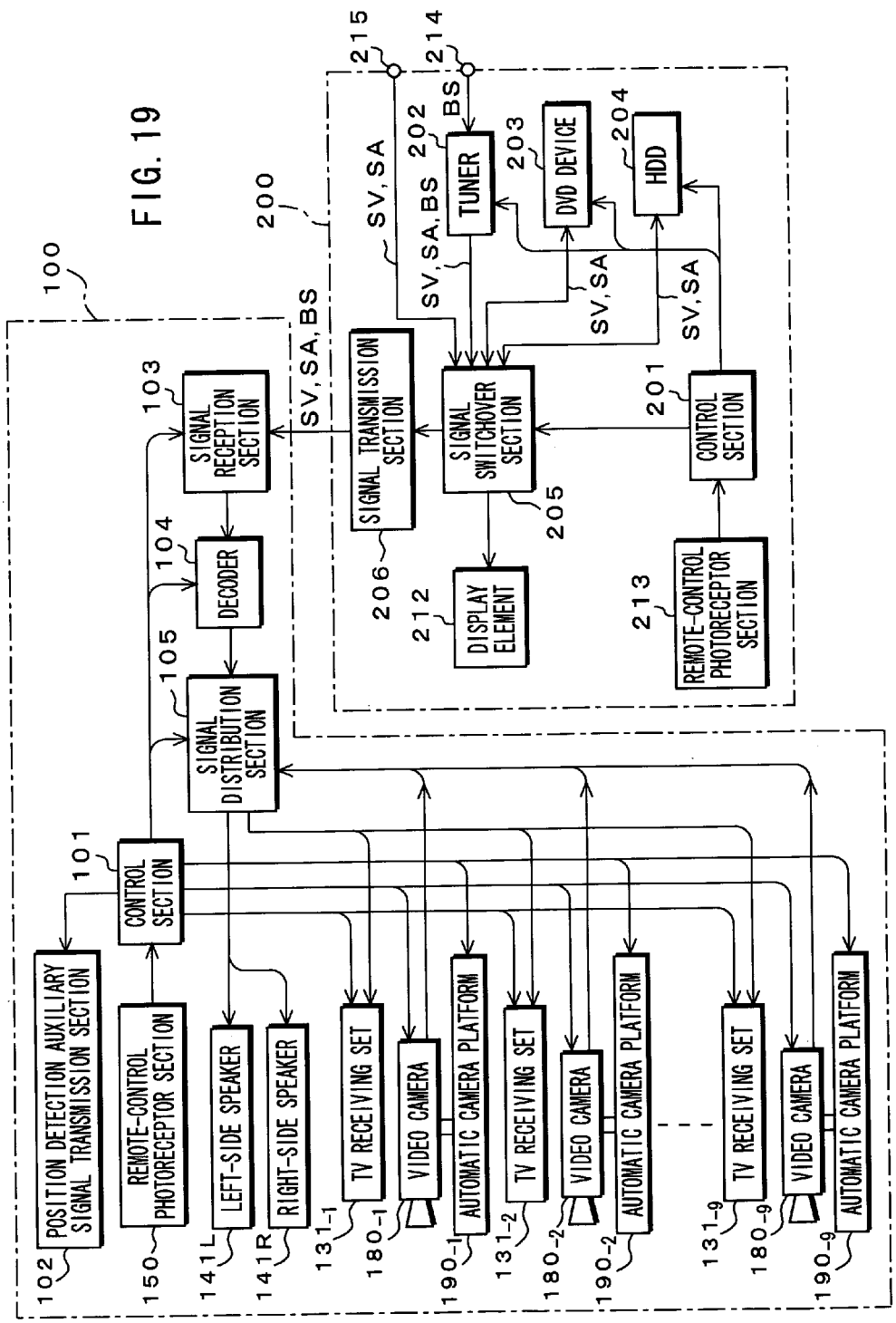
FIG. 19 is a block diagram for showing a circuit configuration of the single-leaf screen device and an AV center.

Next, a circuit configuration of the single-leaf screen device 100 and the AV center 200 will be described below with reference to FIG. 19.

The AV center 200 will be described as follows. This AV center 200 has a control section 201 for controlling overall operations. This control section 201 is constituted of a central processing unit (CPU), a read only memory (ROM) in which a control program etc. for this CPU is stored, a random access memory (RAM) that provides a work area for the CPU, etc.

To this control section 201, the display element 212 and the remote-control photoreceptor section 213 are connected. On the display element 212, an operating state and the like of the AV center 200 are displayed. A remote-control signal received by the remote-control photoreceptor section 213 is supplied to the control section 201.

Further, the AV center 200 has a tuner 202, a DVD device 203, and a hard disk drive (HDD) 204. The tuner 202 is supplied with the broadcast signal BS from the antenna, not shown, which has received by an input terminal 214. Based on the broadcast signal BS, the tuner 202 acquires the video signal SV and the audio signal SA of a predetermined channel.

The DVD device 203 records on a DVD (not shown) the video signal SV and the audio signal SA obtained with the tuner 202 or the video signal SV and the audio signal SA reproduced with the HDD 204 while reproduces the video signal SV and the audio signal SA of a movie, a TV program, etc. from the DVD disk. The HDD 204 records the video signal SV and the audio signal SA obtained with the tuner 202 and the video signal SV and the audio signal SA reproduced with the DVD device 203 while reproduces the video signal SV and the audio signal SA of the recorded movie, TV program, etc.

Further, the AV center 200 has a signal switchover section 205. To this signal switchover section 205, the external input terminal 215, the tuner 202, the DVD device 203, and the HDD 204 are connected. This signal switchover section 205 is supplied with the video signal SV and the audio signal SA input to the external input terminal 215. Further, this signal switchover section 205 is supplied from the tuner 202 with the video signal SV and the audio signal SA obtained with this tuner 202 and also with the broadcast signal BS itself input to the antenna terminal 214.

Further, the signal switchover section 205 is supplied from the DVD device 203 with the video signal SV and the audio signal SA reproduced by this DVD device 203. Also, this signal switchover section 205 supplies the DVD device 203 with the video signal SV and the audio signal SA obtained with the tuner 202 to be recorded by this DVD device 203 on a DVD disk or the video signal SV and the audio signal SA reproduced by the HDD 204.

Further, the signal switchover section 205 is supplied from the HDD 204 with the video signal SV and the audio signal SA reproduced by this HDD 204. Also, this signal switchover section 205 supplies the HDD 204 with the video signal SV and the audio signal SA obtained with the tuner 202 to be recorded by this DVD device 204 or the video signal SV and the audio signal SA reproduced by the DVD device 203.

The signal switchover section 205 switches the signal paths in such a manner that the video signal SV and the audio signal SA may be supplied to the DVD device 203 and the HDD 204 to be recorded therein. Further, the signal switchover section 205 switches the signal paths in such a manner that predetermined video signal SV and audio signal SA may be supplied to the single-leaf screen device 100. It is possible to supply the single-leaf screen device 100 selectively with the video signal SV and the audio signal SA obtained with the tuner 202, the video signal SV and the audio signal SA reproduced by the DVD device 203, or the video signal SV and the audio signal SA reproduced by the HDD 204.

It is to be noted that the broadcast signal BS which is supplied from the tuner 203 to the signal switchover section 205 is always selected as a signal to be transmitted to the single-leaf screen device 100. Accordingly, a signal to be output from the signal switchover section 205 and transmitted to the single-leaf screen device 100 is constituted of the video signal SV, the audio signal SA, and the broadcast signal BS.

Further, the AV center 200 has a signal transmission section 206. This signal transmission section 206 transmits appropriate signals (the video signal SV, the audio signal SA, and the broadcast signal BS) to be transmitted to the single-leaf screen device 100, which are output from the signal switchover section 205, to the single-leaf screen device 100 in a wired or wireless manner.

This AV center 200 operates based on the remote-control signal sent from the remote controller 140 (see FIG. 1) and received by the remote-control photoreceptor section 213.

Figure 20:
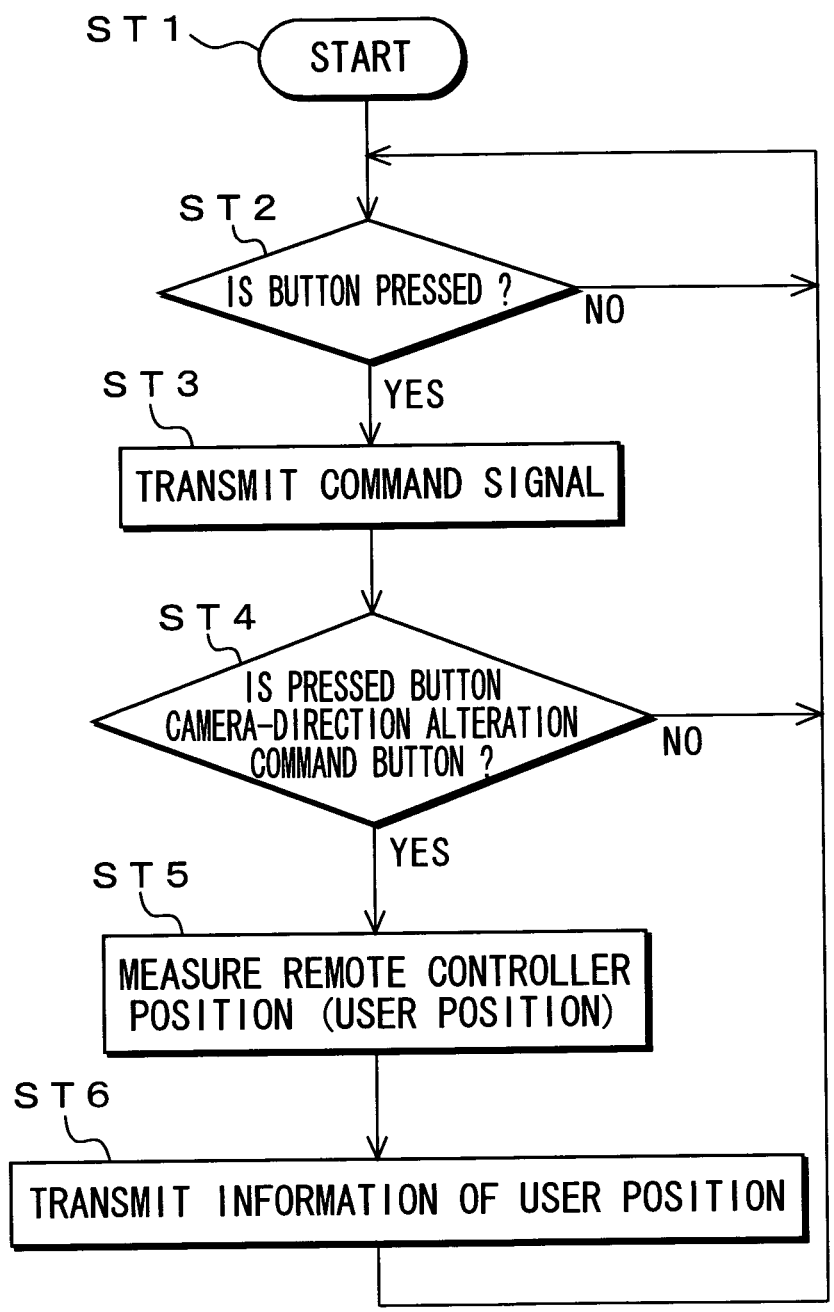
FIG. 20 is a flowchart for showing operations of a remote controller.

The following will describe operations of the remote controller 140 with reference to the flowchart of FIG. 20. First, at step ST1, the operation starts upon, for example, power application, and at step ST2, it is determined whether a button arranged on an operating panel is pressed. If the button is pressed, at step ST3, a command signal that corresponds to the button is transmitted as a remote-control signal.

Next, at step ST4, it is determined whether the pressed button is a camera-direction alteration command button. If it is not the camera-direction alteration command button, the operation goes back to the step ST2 where it enters a standby state of waiting for a button to be next pressed.

On the other hand, if the pressed button is the camera-direction alteration command button, at step ST5, as described later, an auxiliary signal transmitted from a position detection auxiliary signal transmission section 102 in the single-leaf screen device 100 is used to measure a position of the remote controller, therefore, a position of the user. At step ST6, the information of the user position is transmitted as the remote-control signal and the operation goes back to the step ST2 to enter the standby state of waiting for a button to be next pressed.

It is to be noted that according to the flowchart of FIG. 20, when the camera-direction alteration command button is pressed, the corresponding command signal is transmitted to then measure a user position and transmit the information of the user position. Instead, when the camera-direction alteration command button is pressed, information of the measured user position may be transmitted together with the corresponding command signal.

Figure 21:
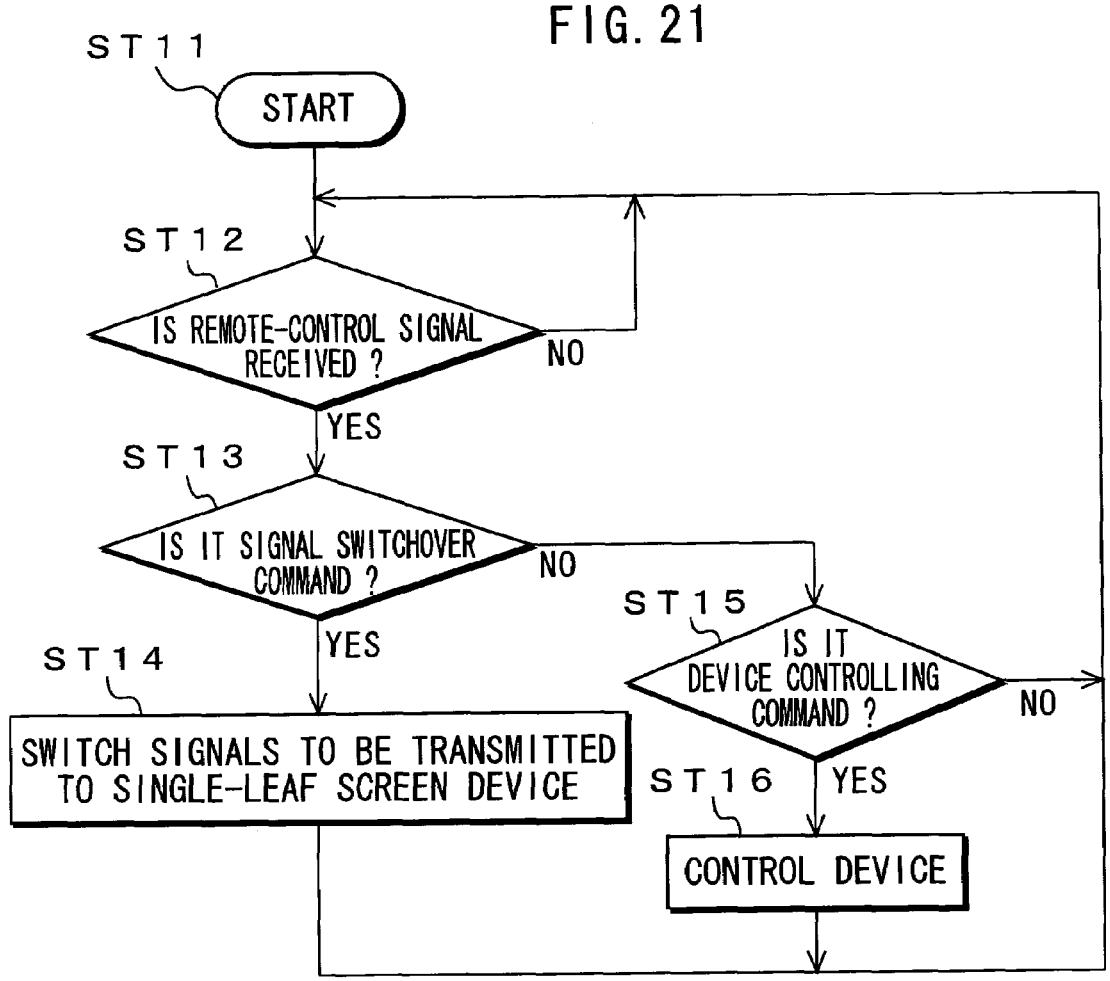
FIG. 21 is a flowchart for showing operations of a control section in the AV center.

The following will describe operations of a control section in the AV center 200 with reference to the flowchart of FIG. 21. First, at step ST11, the operation starts upon, for example, power application, and at step ST12, it is determined whether a remote-control signal is received. If the remote-control signal is received, the operation goes to step ST13.

At this step ST13, it is determined whether that remote-control signal is a command signal to command switchover of the video signal SV and the audio signal SA to be transmitted to the single-leaf screen device 100. If it commands switchover of the signals, at step ST14, the signal switchover section 205 change signal paths so that the signal to be transmitted to the single-leaf screen device 100 may be switched and then the operation goes back to the step ST12.

On the other hand, if it is decided at step ST13 not to be a command signal to command signal switchover, the operation goes to step ST15. At this step ST15, it is determined whether the signal is a command signal to command controlling such a device as the tuner 202, the DVD device 203, or the HDD 204. If it is command signal to command control of the device, at step ST16, the operation controls the corresponding device and returns to the step ST12. In this case, if it commands recording to the DVD device 203 or the HDD 204, the operation changes also the signal paths in the signal switchover section 205 so that the video signal SV and the audio signal SA to be recorded may be supplied to this DVD device 203 or HDD 204.

If it is decided at the above-described step ST15 that the signal is not a command signal to command any device control, the operation immediately goes back to the step ST12 where it enters the standby state of waiting for reception of the next remote-control signal.

Referring back to FIG. 19, the single-leaf screen device 100 will be described below. This single-leaf screen device 100 has a control section 101 for controlling overall operations. This control section 101 is constituted of a central processing unit (CPU), a read only memory (ROM) in which a control program etc. for this CPU is stored, a random access memory (RAM) that provides a work area for the CPU, etc.

To this control section 101, the remote-control photoreceptor section 150 is connected. The remote-control signal received by the remote-control photoreceptor section 150 is supplied to the control section 101. To this control section 101, the position detection auxiliary signal transmission section 102 is also connected. In the present embodiment, a position detection system of a magnetic sensor type is used to detect a position of the remote controller (position of the user) so that a magnetic signal may be transmitted from the auxiliary signal transmission section 102. It is to be noted that as a position detection system of this magnetic sensor type, for example, "FAST RAK" which is sold by POLHEMUS Co., Ltd. can be used. This auxiliary signal transmission section 102 is arranged to a center of the division plate section 110 of the single-leaf screen device 100, for example, near a position where the image pickup element $180\_{\_5}$ is attached (see FIG. 2).

Further, the single-leaf screen device 100 has a signal reception section 103, a decoder 104, and a signal distribution section 105. The signal reception section 103 receives the video signal SV, the audio signal SA, and the broadcast signal BS sent from the AV center 200 in the wired or wireless manner. The decoder 104 decodes the video signal SV or the audio signal SA or both of them received by the signal reception section 103 if they have been compressed and encoded.

The signal distribution section 105 outputs the video signal SV to be supplied to each of the TV receiving sets $131\_{\_1}$ through $131\_{\_9}$ and provides an audio signal to be supplied to the speakers 141R and 141L. This signal distribution section 105 is supplied with the video signal SV, the audio signal SA, and the broadcast signal BS sent from the AV center 200. Further, this signal distribution section 105 is supplied with the video signal SV obtained through imaging with each of the image pickup elements $180\_{\_1}$ through $180\_{\_9}$.

The signal distribution section 105 distributes the broadcast signal BS sent from the AV center 200, to each of the TV receiving sets $131\_{\_1}$ through $131\_{\_9}$. This enables each of the TV receiving sets $131\_{\_1}$ through $131\_{\_9}$ to obtain the video signal SV of a predetermined program by using the built-in tuner based on the broadcast signal BS and display an image due to this video signal SV. In this case, for example, it is possible to display the images of different channels on the different TV receiving sets $131\_{\_1}$ through $131\_{\_9}$.

Further, the signal distribution section 105 can supply the video signal SV sent from the AV center 200, to each of the TV receiving sets $131\_{\_1}$ through $131\_{\_9}$. In this case, the TV receiving sets $131\_{\_1}$ through $131\_{\_9}$ can concurrently display an image due to that video signal SV. In such a case, the signal distribution section 105 supplies the speakers 141R and 141L with the audio signal SA sent from the AV center 200. With this, the speakers 141R and 141L produce sound that matches the image displayed on the TV receiving sets $131\_{\_1}$ through $131\_{\_9}$.

Further, the signal distribution section 105 can supply the video signal SV sent from the AV center 200, to any one of the TV receiving sets $131\_{\_1}$ through $131\_{\_9}$, for example, the TV receiving sets $131\_{\_5}$ placed at the midsection. In this case, the TV receiving set supplied with that video signal SV can display an image due to that video signal SV. In such a case, the signal distribution section 105 supplies the speakers 141R and 141L with the audio signal SA sent from the AV center 200. With this, the speakers 141R and 141L produce sound that matches the image displayed on any one of the TV receiving sets.

Further, the signal distribution section 105 can supply the respective TV receiving sets $131\_{\_1}$ through $131\_{\_9}$ with video signals $SV\_{\_1}$ through $SV\_{\_9}$ that correspond to divided regions generated on the basis of the video signal SV sent from the AV center 200.

Figure 22:
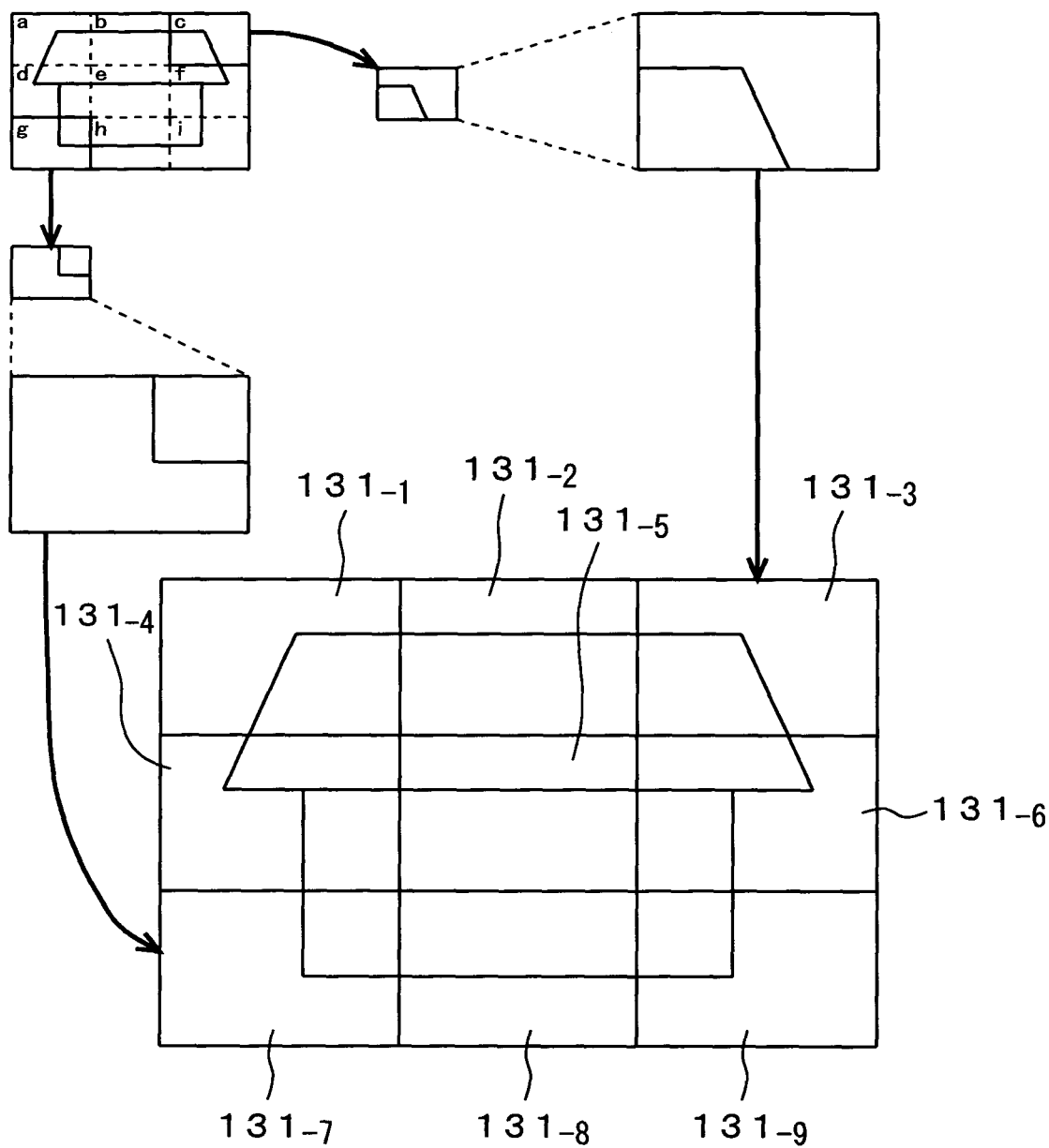
FIG. 22 is a diagram for showing a concept of zoom-in display by use of plural TV receiving sets.

In this case, as shown in FIG. 22, an original image due to the video signal SV is divided by three both horizontally and vertically, so that the thus divided regions a-i are magnified three-fold both horizontally and vertically and displayed on the TV receiving sets $131\_{\_1}$ through $131\_{\_9}$. In this case, one image is magnified and displayed using the TV receiving sets $131\_{\_1}$ through $131\_{\_9}$.

The video signal $SV\_{\_1}$ is generated by performing conversion processing (zoom processing) that increases plural items of pixel data that correspond to the divided region "a" three-fold both horizontally and vertically. As this conversion processing, digital reality creation (DRC) processing can be applied. DRC processing refers to processing for obtaining post-conversion pixel data of a target position based on an estimate equation by using plural items of pre-conversion pixel data positioned around this target position and coefficient data that corresponds to a phase of this target position and is generated through learning beforehand. It is to be noted that as this conversion processing, simple linear interpolation processing etc. can be applied. Similar to the above-described video signal $SV_1$, the video signals $SV\_{\_2}$ through $SV\_{\_9}$ are also generated using plural items of pixel data that correspond to the divided regions b-i.

In this case, the signal distribution section 105 supplies the speakers 141R and 141L with the audio signal SA sent from the AV center 200. With this, the speakers 141R and 141L produce sound that corresponds to a magnified image displayed on the TV receiving sets $131\_{\_1}$ through $131\_{\_9}$.

Further, the signal distribution section 105 can supply the video signals SV obtained with the image pickup elements $180\_{\_1}$ through $180\_{\_9}$ to the TV receiving sets $131\_{\_1}$ through $131\_{\_9}$ respectively. In this case, the TV receiving sets $131\_{\_1}$ through 131₋₉ can display images due to the video signals SV obtained through imaging with the corresponding image pickup elements.

Further, the signal distribution section 105 can supply any one of the TV receiving sets 131₋₁ through 131₋₉, for example, the TV receiving sets 131₋₅ at the midsection with any one of the video signals SV obtained by the respective image pickup elements 180₋₁ through 180₋₉. In this case, the TV receiving set supplied with that video signal SV can display an image due to that video signal SV.

Also, the signal distribution section 105 can supply the respective TV receiving sets 131₋₁ through 131₋₉ with the video signals SV₋₁ through SV₋₉ that correspond to the divided regions and are generated on the basis of any one of the video signals SV obtained by the image pickup elements 180₋₁ through 180₋₉. In this case also, as shown in FIG. 22, an original image due to the video signal SV is divided by three both horizontally and vertically, so that the thus divided regions a-i are magnified three-fold both horizontally and vertically and displayed on the TV receiving sets 131₋₁ through 131₋₉. In this case, one image is magnified and displayed using the TV receiving sets 131₋₁ through 131₋₉.

The signal distribution section 105 can also supply the video signal SV sent from the AV center 200 to arbitrary one or multiple ones of the TV receiving sets 131₋₁ through 131₋₉ and supply the video signal SV obtained by the image pickup element to any other one or multiples ones of them.

The user can operates the remote controller 140 to specify the above-described distribution by the signal distribution section 105.

The following will describe how to control alteration of a pickup direction of the image pickup elements 180₋₁ through 180₋₉, that is, a direction of the camera. When the user has pressed a camera-direction alteration button on the remote controller 140, the control section 101 controls the auxiliary signal transmission section 102 so that a magnetic signal may be sent from this auxiliary signal transmission section 102. When information of user position is received by the remote-control photoreceptor section 150, the control section 101 supplies the automatic camera platforms 190₋₁ through 190₋₉ with control signals to control the automatic camera platforms 190₋₁ through 190₋₉ so that imaging directions of the respective image pickup elements 180₋₁ through 180₋₉ may turn toward a line of sight of the user.

In this case, if a position of the user (position of the remote controller) is ($x_0$, $z_0$) with respect to a position where the auxiliary signal transmission section 102, that is, a position (0, 0) of the image pickup element 180₋₅ as shown in FIG. 23, the control section 101 can obtain horizontal angles A2, A1, and A0 of the respective image pickup elements 180₋₄, 180₋₅, and 180₋₆ by using the following equations (1)-(3). In these equations, $x_0$ represents a horizontal position of the user and $z_0$ represents a depth-directional position of the user, that is, a distance from the user to the division plate section 110. Further, dh represents a horizontal distance of each of the image pickup elements.

$$A0 = 180° - a\tan(z_0/(dh+x_0)) \quad (1)$$

$$A1 = 180° - a\tan(z_0/x_0) \quad (2)$$

$$A2 = 180° - a\tan(z_0/(dh-x)) \quad (3)$$

In this case, since the image pickup elements 180₋₁ and 180₋₇ are of the same horizontal position as the image pickup element 180₋₄, their horizontal angle are supposed to be A2. Also, since the image pickup elements 180₋₂ and 180₋₈ are of the same horizontal position as the image pickup element 180₋₅, their horizontal angle are supposed to be A1. Further, since the image pickup elements 180₋₃ and 180₋₉ are of the same horizontal position as the image pickup element 180₋₆, their horizontal angle are supposed to be A0.

Although not described more in detail, vertical angles of the image pickup elements 180₋₁ through 180₋₉ can also be obtained in the same way as the above-described horizontal angles. In this case, a user position ($y_0$, $z_0$) is used. Here, $y_0$ represents a vertical position of the user.

Figure 25:
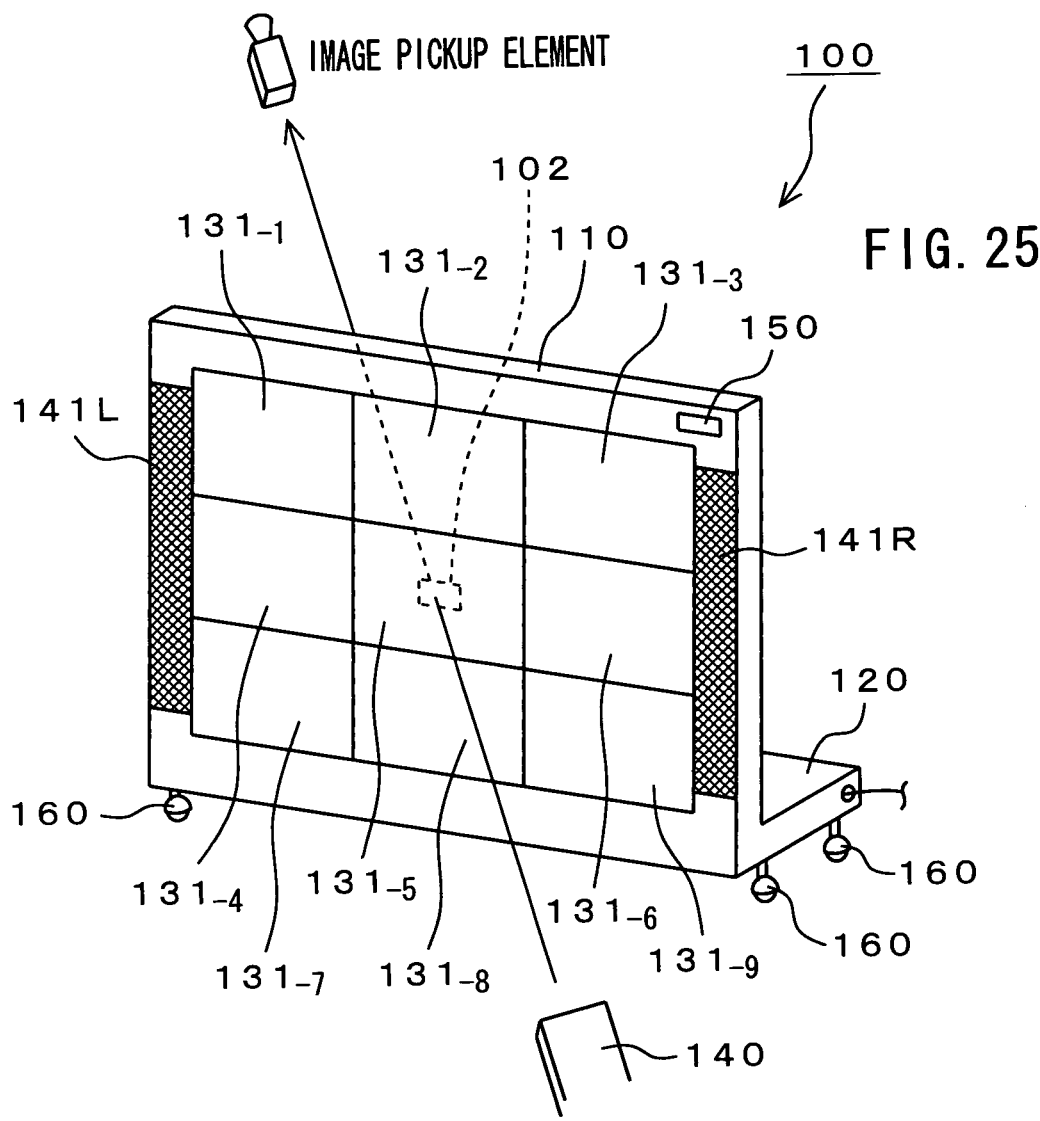
FIG. 25 is a drawing for showing a variant of the imaging direction.

Thus, when the user presses the camera-direction alteration button on the remote controller 140, the imaging directions of the image pickup elements 180₋₁ through 180₋₉ all turn toward the line of sight of the user. For example, if the position of the remote controller 140 (position of the user) is the diagonal left of the division plate section 110 on the front surface thereof, as shown in FIG. 24, the imaging directions of the image pickup elements 180₋₁ through 180₋₉ become identical to a direction of line of sight of the user when the user at this user position watches the screens of the TV receiving sets 131₋₁ through 131₋₉ respectively. Further, for example, if the position of the remote controller 140 (position of the user) is the diagonal right of the division plate section 110 on the front surface thereof, as shown in FIG. 25, the imaging directions of the image pickup elements 180₋₁ through 180₋₉ become identical to a direction of line of sight of the user when the user at this user position watches the screens of the TV receiving sets 131₋₁ through 131₋₉ respectively.

In such a manner, when the user has pressed the camera-direction alteration button on the remote controller 140, the imaging directions of the image pickup elements 180₋₁ through 180₋₉ can be aligned with the line of sight of the user, so that to display an image obtained by these image pickup elements 180₋₁ through 180₋₉ on the TV receiving sets 131₋₁ through 131₋₉, an appropriate image can be displayed from the user position.

Although the user can align the imaging directions of the image pickup elements 180₋₁ through 180₋₉ with the line of sight of the user by pressing the camera-direction alteration button on the remote controller 140 as described above, the imaging directions of the image pickup elements 180₋₁ through 180₋₉ may be further set individually by operating a button other than the camera-direction alteration button on the remote controller 140.

Figure 26:
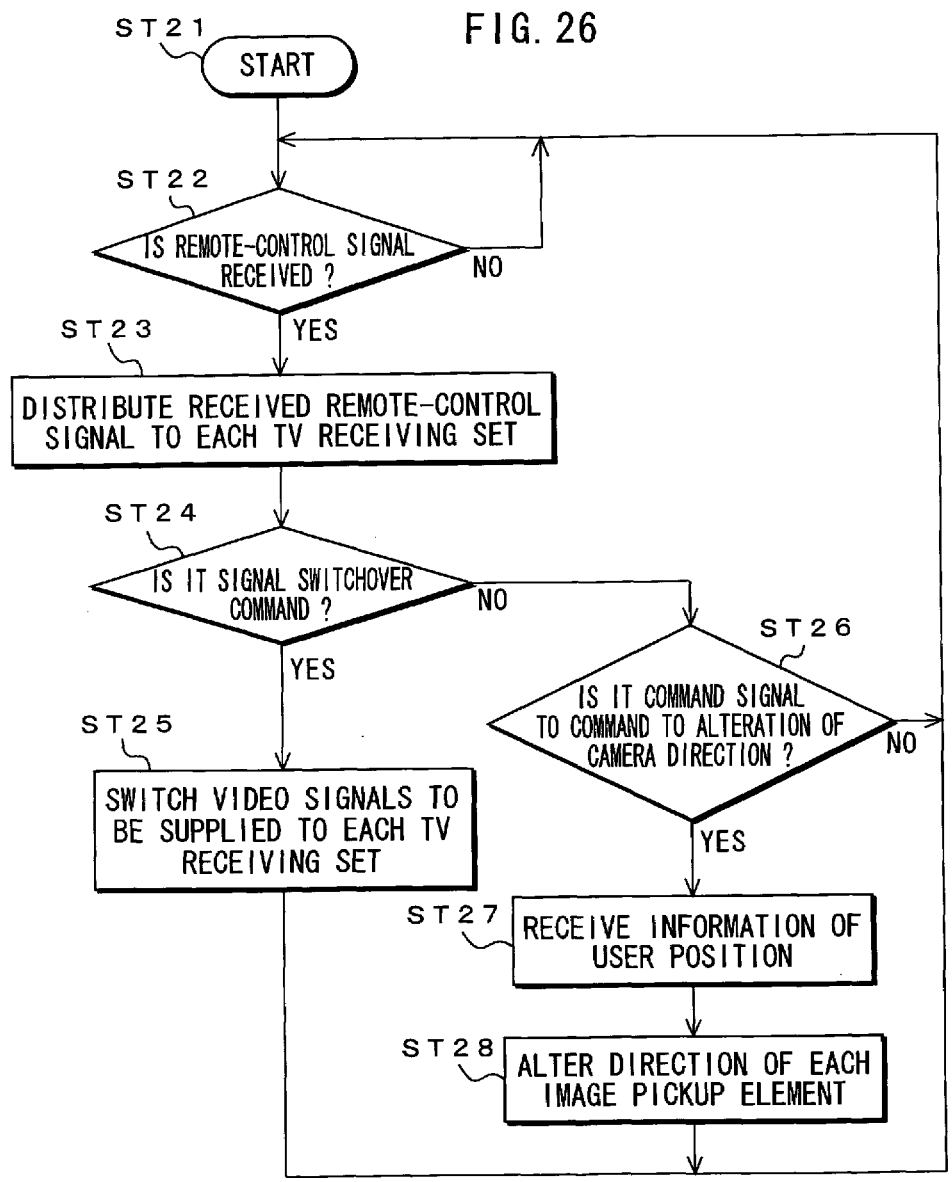
FIG. 26 is a flowchart for showing operations of a control section in the single-leaf screen device.

The following will describe operations of the control section 101 in the single-leaf screen device 100 with reference to a flowchart of FIG. 26. First, at step ST21, the operation starts upon, for example, power application, and at step ST22, it is determined whether remote-control signal is received. If the remote-control signal is received, the operation goes to step ST23.

At this step ST23, the received remote-control signal is distributed to the TV receiving sets 131₋₁ through 131₋₉. With this, the user can operate the remote controller 140 to control operations of the respective TV receiving sets 131₋₁ through 131₋₉, for example, those of reception channels of the built-in tuner, selection on whether to use an output video signal from the built-in tuner or an externally input video signal as the video signal to display an image, a luminance, etc.

Next, at step ST24, it is determined whether that remote-control signal is a command signal to command switchover of the video signal SV to be supplied to the TV receiving sets 131₋₁ through 131₋₉. If it is the command signal to command switchover of signals, at step ST25, the video signal SV to be supplied to the TV receiving sets 131₋₁ through 131₋₉ is switched and then the operation goes back to the step ST22.

It is to be noted that when switching the video signal at the step ST25, supply of the audio signal SA to the speakers 141R and 141L is appropriately controlled.

On the other hand, if it is not the command signal to command switchover of signals at the step ST24, the operation goes to step ST26. At this step ST26, it is determined whether the received remote-control signal is a command signal to command alteration of a camera direction. If it is the command signal to command alteration of the camera direction, at step ST27, the information of user position which is sent over thereto after that command signal or together with it is received.

At step ST28, horizontal and vertical angles of the image pickup elements $180\_\_1$ through $180\_\_9$ are obtained based on the information of user position and, in accordance with this information, the automatic camera platforms $190\_\_1$ through $190\_\_9$ on which the image pickup elements $180\_\_1$ through $180\_\_9$ are mounted are controlled to change the imaging directions of the image pickup elements $180\_\_1$ through $180\_\_9$ in such a manner that these directions may be aligned with a line of sight of the user. Then, the operation goes back to step ST22.

If it is not a command signal to command alteration of a camera direction at the above-described step ST26, the operation immediately goes back to the step ST22 where it enters the standby state of waiting for receiving the next remote-control signal.

As described above, in the present embodiment, it is possible to display an image due to the video signal SV obtained through imaging with the image pickup elements $180\_\_1$ through $180\_\_9$ mounted on the division plate section 110 at the back side thereof on the TV receiving sets $131\_\_1$ through $131\_\_9$ arranged on the division plate section 110 at the front side thereof. Therefore, to look at the other side of the division plate section 110, the user may only operate the remote controller 140 to provide such condition as to display an image due to the video signal SV obtained through imaging with the image pickup elements $180\_\_1$ through $180\_\_9$ on the TV receiving sets $131\_\_1$ through $131\_\_9$ arranged on the division plate section 110 at the front side thereof as described, so that he or she can easily observe the other side of the division plate section 110 without moving to such a position that it may not block his view.

Further, in the present embodiment, the TV receiving sets $131\_\_1$ through $131\_\_9$ arranged on the division plate section 110 at the front side thereof can be easily detached and individually used only by pressing them with the user, thereby enabling the TV receiving sets $131\_\_1$ through $131\_\_9$ to be easily separated in use.

Further, in the present embodiment, if the TV receiving sets $131\_\_1$ through $131\_\_9$ are detached from the front side of the division plate section 110, the decorative sheets 311-313 are automatically moved and arranged to positions where these TV receiving sets $131\_\_1$ through $131\_\_9$ have been arranged, thereby keeping good visual effects even if the TV receiving sets $131\_\_1$ through $131\_\_9$ are detached.

Figure 27:
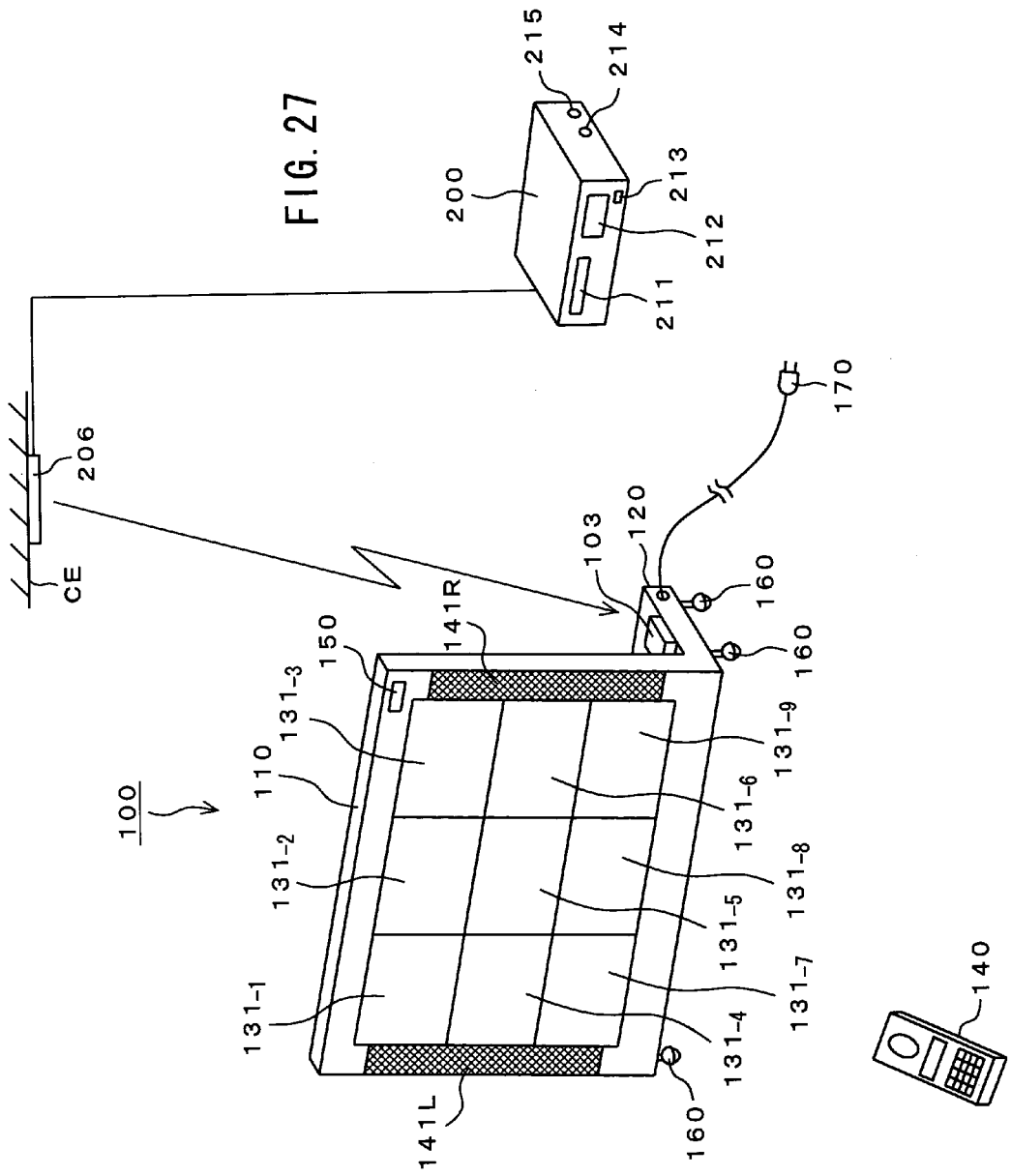
FIG. 27 is a perspective view for showing another configuration example of the single-leaf screen device.

Although in the single-leaf screen device 100 shown in the above-described FIG. 1, the video signal SV, the audio signal SA, and the broadcast signal BS from the AV center 200 have been transmitted to the single-leaf screen device 100 in the wired manner, they may be transmitted wirelessly. In this case, for example, as shown in FIG. 27, the signal transmission section 206 in the AV center 200 is arranged on a ceiling CE so that from this signal transmission section 206, a signal may be transmitted to the signal reception section 103 arranged on the base section 120 in the single-leaf screen device 100, for example. In this case, by arranging the signal transmission section 206 in the AV center 200 on the ceiling CE, it is possible to well transmit the video signal SV, the audio signal SA, and the broadcast signal BS from the AV center 200 to the signal reception section 103 in the single-leaf screen device 100 even if the single-leaf screen device 100 moves inside a room optionally.

It is to be noted that although in the above embodiment, the TV receiving sets $131\_\_1$ through $131\_\_9$ having the built-in tuner etc. have been arranged on the division plate section 110 at the front side thereof, a display having no tuner etc. may possibly be arranged.

Further, although in the above embodiment, the nine TV receiving sets $131\_\_1$ through $131\_\_9$ have been arranged on the division plate section 110 at the front side thereof, the number of the TV receiving sets which are arranged on the division plate section 110 at the front side thereof is not limited to it. For example, such a configuration may be possible that one TV receiving set would be arranged.

Further, although in the above embodiment, the nine image pickup elements $180\_\_1$ through $180\_\_9$ have been mounted on the division plate section 110 at the back side thereof corresponding to the TV receiving sets $131\_\_1$ through $131\_\_9$ arranged on the front side thereof, the number of the image pickup elements mounted on the division plate section 110 at the back side thereof is not limited to it. For example, such a configuration may be possible that one image pickup element would be arranged.

Further, although in the above embodiment, the image pickup elements $180\_\_1$ through $180\_\_9$ have been mounted on the division plate section 110 at the back side thereof, an image pickup element may be mounted further on this division plate section 110 at the front side thereof so that an image due to a video signal obtained through imaging with this image pickup element may be displayed on the TV receiving sets $131\_\_1$ through $131\_\_9$.

Further, although in the above embodiment, the single-leaf screen device 100 and the AV center 200 have been configured separately from each other, for example, such a configuration may be though that the components of the AV center 200 would be built in the base section 120 of the single-leaf screen device 100.

Further, although the above embodiment, the present invention has been applied to a single-leaf screen, the present invention can be similarly applied to any other that has a function to divide a space, for example, a divider, a wall, etc.

According to the present invention, an image display element is arranged on the division plate section at the front side thereof that divides a space and an image pickup element is mounted on this division plate section at the back side thereof so that an image due to a video signal obtained through imaging with the image pickup element can be displayed on the image display element, thereby enabling the user to observe the back side of the division plate section easily. Further, according to the present invention, the image display element is arranged on the division plate section on the front side thereof in attachable/detachable manner, thereby enabling the image display element to be easily separated in use.

Figure 28:
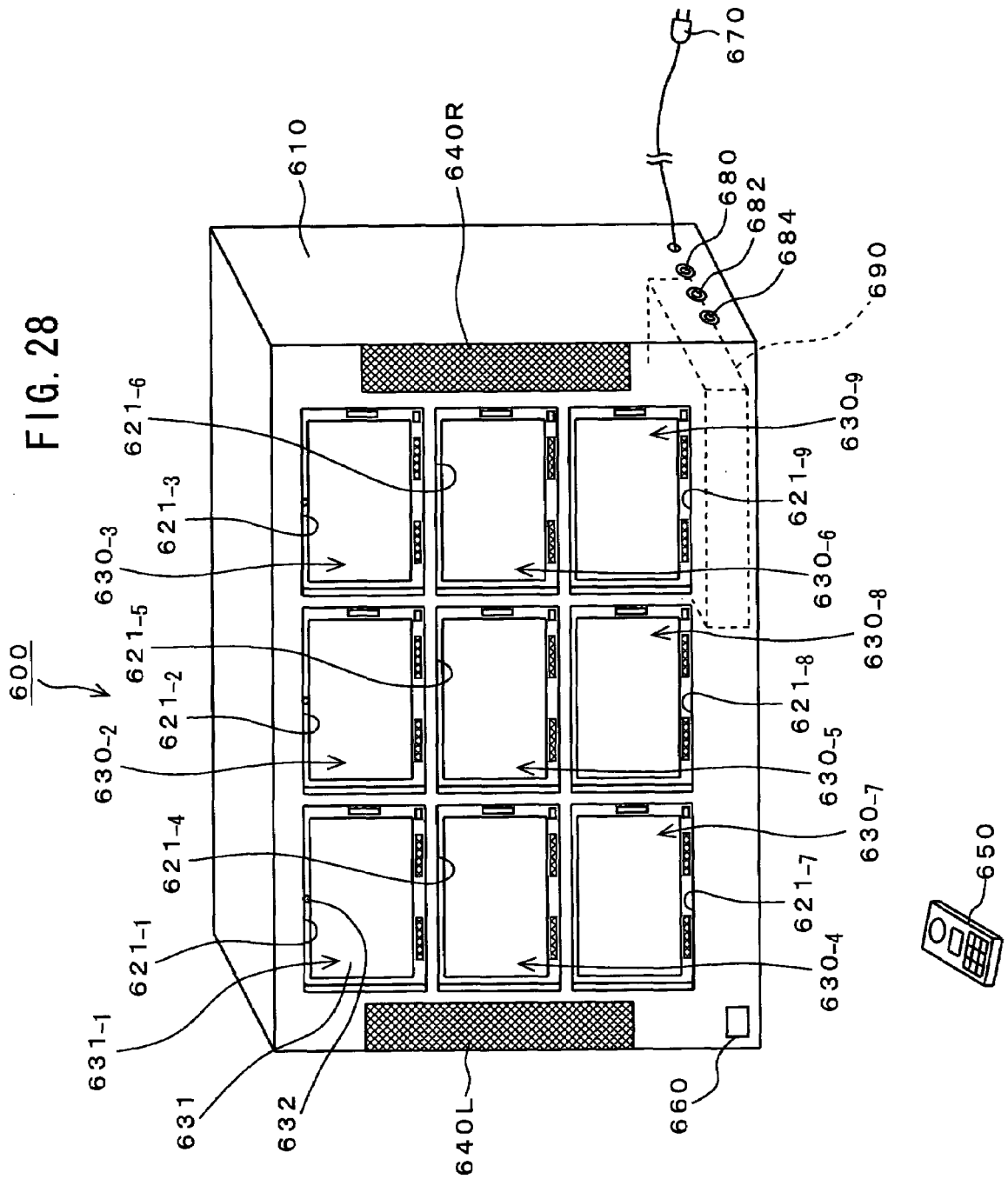
FIG. 28 is a perspective view for showing a configuration (condition where a flat plate section is attached) of a storage arrangement according to another embodiment.
Figure 29:
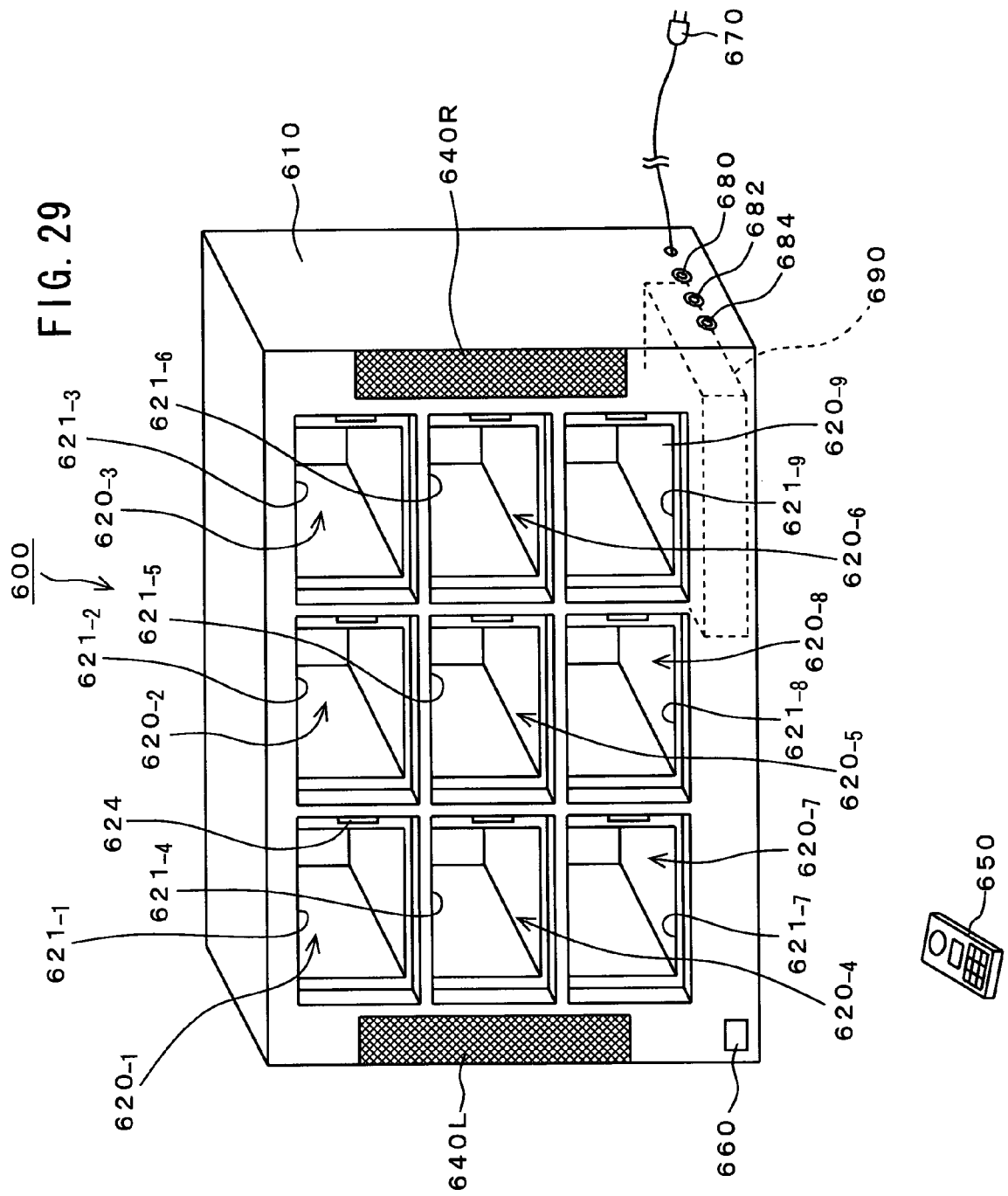
FIG. 29 is a perspective view showing a configuration (condition where the flat plate section is detached) of the storage arrangement according to the embodiment.

Next, another embodiment of the present invention will be described. FIGS. 28 and 29 show a configuration of a storage arrangement 600 according to the embodiment.

This storage arrangement 600 has a cuboid-shaped cabinet body section 610. As shown in FIG. 29, in a front side of this cabinet section 610, nine square tube-shaped storage section bodies $620\_\_1$ through $620\_\_9$ having storage openings $621\_\_1$ through $621\_\_9$ respectively are formed. These storage section bodies $620\_\_1$ through $620\_\_9$ are arranged in a matrix shape. Further, on the cabinet body section 610, flat plate sections 630$_{-1}$ through 630$_{-9}$ that cover the storage openings 621$_{-1}$ through 621$_{-9}$ are mounted detachably correspondingly to the storage section bodies 620$_{-1}$ through 620$_{-9}$ respectively as shown in FIG. 28. It is to be noted that FIG. 28 shows a condition where the flat plate sections 630$_{-1}$ through 630$_{-9}$ are attached and FIG. 29 shows condition where the flat plate sections 630$_{-1}$ through 630$_{-9}$ are detached.

Further, at a left edge of the cabinet body section 610, a left-side speaker 640L is arranged on the front side thereof, and at a right edge thereof, a right-side speaker 640R is arranged. Further, at a left bottom of this cabinet body section 610, a remote-control photoreceptor section 660 is arranged for receiving a remote-control signal (infrared signal) from a remote controller 650 operated by a user.

Further, from a right side surface of the cabinet body section 610, a power supply plug 670 comes out. The cabinet body section 610 is supplied with power through this power supply plug 670. Further, an antenna terminal 680 for allowing a broadcast signal BS received by an antenna, not shown, to be input, an external image input terminal 682 for allowing a video signal SV from an outside to be input, and an external sound input terminal 684 for allowing an audio signal SA from the outside to be input are arranged on the right side surface of the cabinet body section 610.

Further, a base box section 690 is built in the cabinet body section 610 at a lower part thereof. This base box section 690 includes an antenna wire distributor, a switcher, a switcher control section, a remote-control signal distributor, and a power distributor. The antenna wire distributor distributes the broadcast signal BS input through the antenna terminal 680 to later-described TV box sections owned by the flat plate sections 630$_{-1}$ through 630$_{-9}$.

The switcher inputs thereto the video signals SV from the TV box sections of the flat plate sections 630$_{-1}$ through 630$_{-9}$ and the video signal SV input through the external image input terminal 682 and outputs the video signal SV to the TV box sections of the flat plate sections 630$_{-1}$ through 630$_{-9}$. Further, this switcher inputs thereto the audio signals SA from the TV box sections of the flat plate sections 630$_{-1}$ through 630$_{-9}$ and the audio signal SA input through the external sound input terminal 684 and outputs the audio signal SA to the speakers 640R and 640L. The switcher control section controls connection of the switcher based on the remote-control signal.

The remote-control signal distributor distributes the remote-control signal received by the remote-control photoreceptor section 660 to the above-described switcher control section and the TV box sections of the flat plate sections 630$_{-1}$ through 630$_{-9}$. The power distributor distributes the power supplied through the power supply plug 670 to this base box section 690 and the TV box sections of the flat plate sections 630$_{-1}$ through 630$_{-9}$. It is to be noted that, as described later, the TV box section is constituted of an image display element, a control section, a tuner, a recording device, an image pickup element, a signal processing section, an authentication processing section, a lock mechanism, etc.

Figure 30:
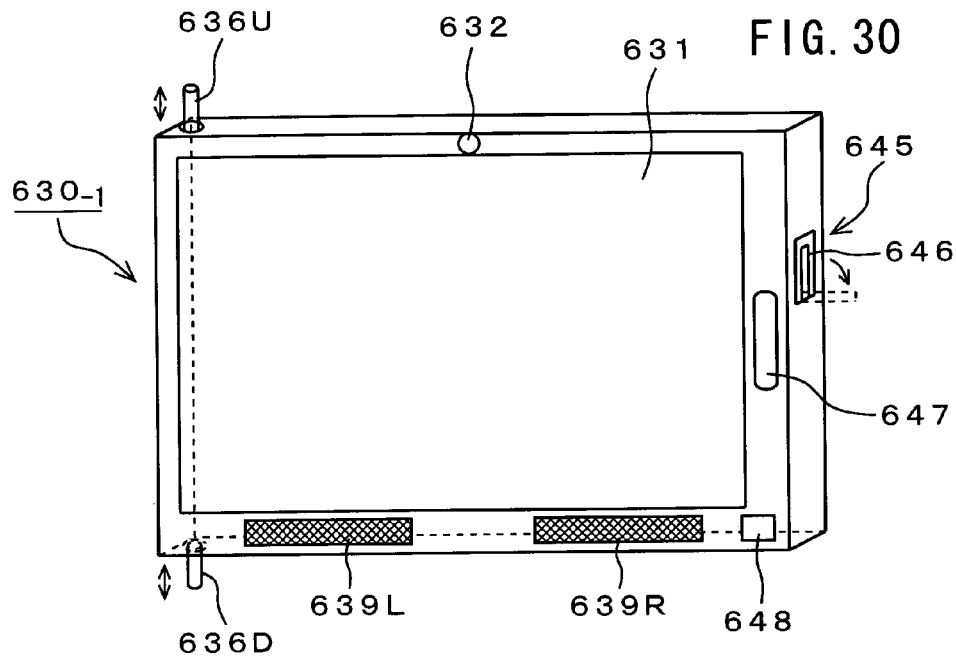
FIG. 30 is a perspective view for showing a configuration (outer side surface) of the flat plate section.
Figure 31:
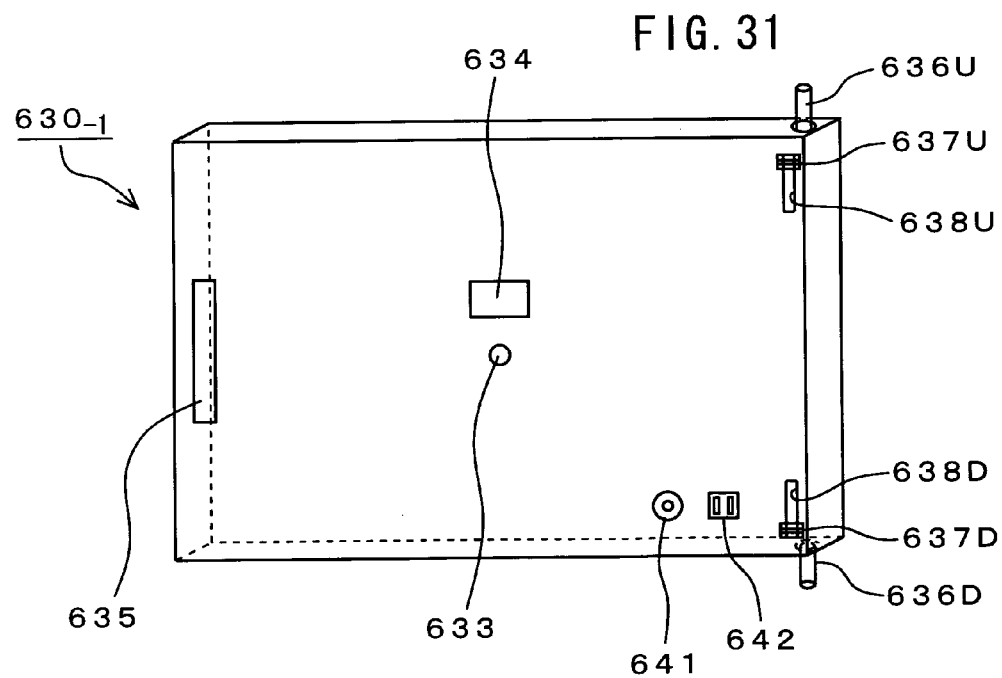
FIG. 31 is a perspective view for showing a configuration (inner side surface) of the flat plate section.

The following will describe the flat plate sections 630$_{-1}$ through 630$_{-9}$ further. Since the flat plate sections 630$_{-1}$ through 630$_{-9}$ are configured in the same way, the flat plate sections 630$_{-1}$ will be described as an example. FIG. 30 is a drawing for showing the flat plate sections 630$_{-1}$ as viewed from an outside thereof. FIG. 31 is a drawing for showing the flat plate sections 630$_{-1}$ as viewed from an inside thereof.

On an almost all external side surface of the flat plate section 630$_{-1}$, an image display element 631 that constitutes the TV box section is arranged. This image display element 631 is constituted of, for example, a flat panel display such as an LCD or a PDP. Although not shown, the control section, the tuner, the recording device, the signal processing section, the authentication processing section, which will be described later, and the like that constitute the TV box section are arranged in an inside of the flat plate section 630$_{-1}$.

Further, at a midsection of a top edge of the external side surface of the flat plate sections 630$_{-1}$, an image pickup element (video camera) 632 is mounted. This image pickup element 632 is used to image the outside of the storage section body 620$_{-1}$. Further, at a lower left end of the external side surface of the flat plate section 630$_{-1}$, a left-side speaker 639L is mounted, and at a lower right end thereof, a right-side speaker 639R is mounted, as well as on the right side of the right-side speaker 639R, a remote-control photoreceptor section 648 is mounted.

Further, at a midsection of an inner side surface of the flat plate section 630$_{-1}$, an image pickup element 633 and an illumination section 634 are mounted. This image pickup element is used to image an interior of the storage section body 620$_{-1}$. The illumination section 634 is used to illuminate the interior of the storage section body 620$_{-1}$ when imaging this interior by using the image pickup element 633. Further, at a lower right end of the inner side surface of the flat plate section 630$_{-1}$, an antenna wire connection terminal 641 and an AC power supply cable connection terminal 642 are mounted.

Further, at a midsection of a left edge of the inner side surface of the flat plate section 630$_{-1}$, a connection terminal 635 is arranged for performing electrical connection to the TV box section of this flat plate section 630$_{-1}$. In this case, from the outside, via the connection terminal 635, the TV box section is supplied with the broadcast signal BS from the antenna wire distributor, the video signal SV from the switcher, a remote-control signal RM from the remote-control signal distributor, power from the power distributor, etc. Further, from the TV box section to the outside, the video signal SV and the audio signal SA are output toward the switcher.

It is to be noted that at a right edge of each of the storage openings 621$_{-1}$ through 621$_{-9}$ of the above-described storage section bodies 620$_{-1}$ through 620$_{-9}$, a connection terminal 624 electrically connected to the base box section 690 is mounted, as shown in FIG. 29. In condition where the flat plate sections 630$_{-1}$ through 630$_{-9}$ cover the storage openings 621$_{-1}$ through 621$_{-9}$, that is, in covered condition, the connection terminal 635 arranged on the inner side surface of each of these sections 630$_{-1}$ through 630$_{-9}$ is electrically connected to this connection terminal 624. With this, the base box section 690 is electrically connected to the TV box section of each of the flat plate sections 630$_{-1}$ through 630$_{-9}$. It is to be noted that the base box section 690 and the connection terminal 624 provided to each of the storage openings 621$_{-1}$ through 621$_{-9}$ of the storage section bodies 620$_{-1}$ through 620$_{-9}$ are connected to each other with one cable, not shown, which is integrally comprised of a plurality of lines for transmitting various signals such as the video signal, the audio signal, the broadcast signal, and power, for example.

Further, at upper and lower parts of the left edge of the flat plate section 630$_{-1}$ in condition where its outer side surface is viewed (see FIG. 30), circular-sectional rod-shaped members 636U and 636D are respectively arranged which are urged by a spring member (not shown) in such a direction as to pop up. Corresponding to these rod-shaped members 636U and 636D, slide grips 637U and 637D, which are connected to side surfaces of the rod-shaped members 636U and 636D, respectively, are provided on the inner side surface of the flat plate section 630$_{-1}$.

The user can press the slide grip 637U down through a slit 638U so that the rod-shaped member 636U may get in the flat plate section 630$_{-1}$ against any urging force of the spring member. Similarly, the user can press the slide grip 637D up through a slit 638D so that the rod-shaped member 636D may get in the flat plate section 630$_{-1}$ against any urging force of the spring member.

By inserting these rod-shaped members 636U and 636D into bearing holes formed at the storage opening 621$_{-1}$ of the storage section body 620$_{-1}$, the flat plate section 630$_{-1}$ can be attached to a portion that corresponds to the storage opening 621$_{-1}$. In thus attached condition of the flat plate section 630$_{-1}$, this flat plate section 630$_{-1}$ can be rotated around the rod-shaped members 636U and 636D as a support axis thereof, thereby enabling it to enter into either uncovered condition in which the storage opening 621$_{-1}$ is open or covered condition in which the storage opening 621$_{-1}$ is covered by the flat plate section 630$_{-1}$. As described above, the user can operate the slide grips 637U and 637D so that the rod-shaped members 636U and 636D respectively may get in the flat plate section 630$_{-1}$, so that the flat plate section 630$_{-1}$ can be attached and detached easily.

Further, at the right edge of the flat plate section 630$_{-1}$ in condition where its external side surface is viewed (see FIG. 30), a lock mechanism 645 is formed. For locking, a claw section 646 of this lock mechanism 645 rotates as indicated by a broken line in FIG. 30 so that this mechanism may protrude to the outside. Further, at a midsection of the right edge on the external side surface of the flat plate section 630$_{-1}$, a handle 647 is formed which is a roughly rectangular concave hole.

Figure 32:
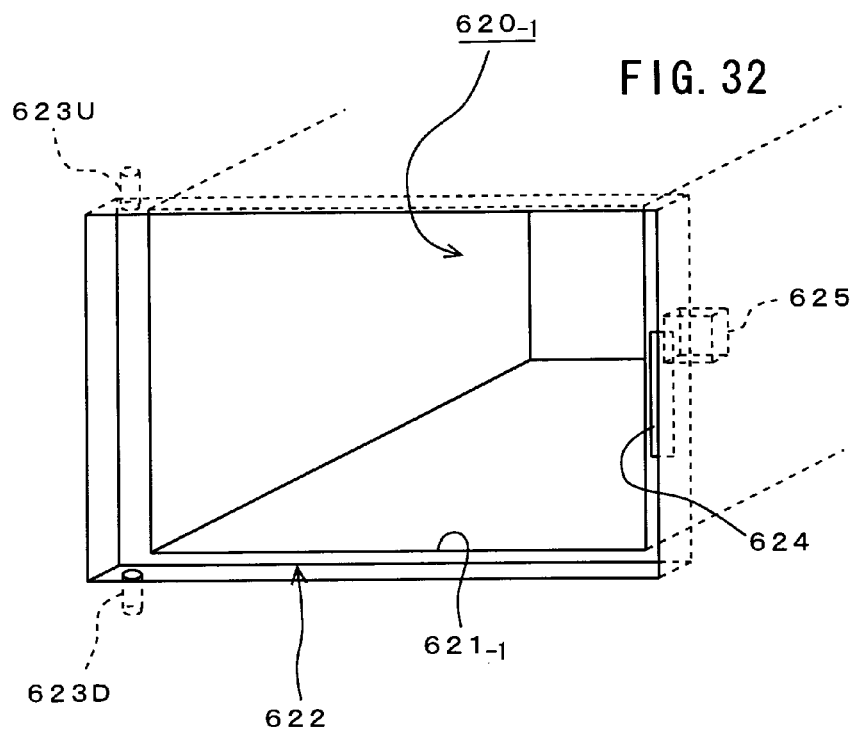
FIG. 32 is a perspective view for showing a configuration of a storage section body.

The storage section bodies 620$_{-1}$ through 620$_{-9}$ will be described further below. The storage section bodies 620$_{-1}$ through 620$_{-9}$ are each configured in the same way, so that the storage section body 620$_{-1}$ will be described as an example. FIG. 32 shows a configuration of the storage section body 620$_{-1}$.

Corresponding to the storage opening 621$_{-1}$ of this storage section body 620$_{-1}$, a square frame-shaped step section 622 is formed. To this step section 622, the flat plate section 630$_{-1}$ is fit with the flat plate section 630$_{-1}$ covering the storage opening 621$_{-1}$ so that it may be fixed to a constant position. At upper and lower parts of a left edge of this step section 622, bearing holes 623U and 623D are provided into which the above-described rod-shaped members 636U and 636D of the flat plate section 630$_{-1}$ are inserted respectively.

Further, at a midsection of a right edge of a front surface of this step section 622, a connection terminal 624 is arranged to which the above-described connection terminal 635 of the flat plate section 630$_{-1}$ is connected. Further, on a right side of this step section 622, a claw insertion hole 625 is formed into which the above-described claw section 646 that constitutes the lock mechanism 645 of the flat plate section 630$_{-1}$ is inserted.

Figure 33:
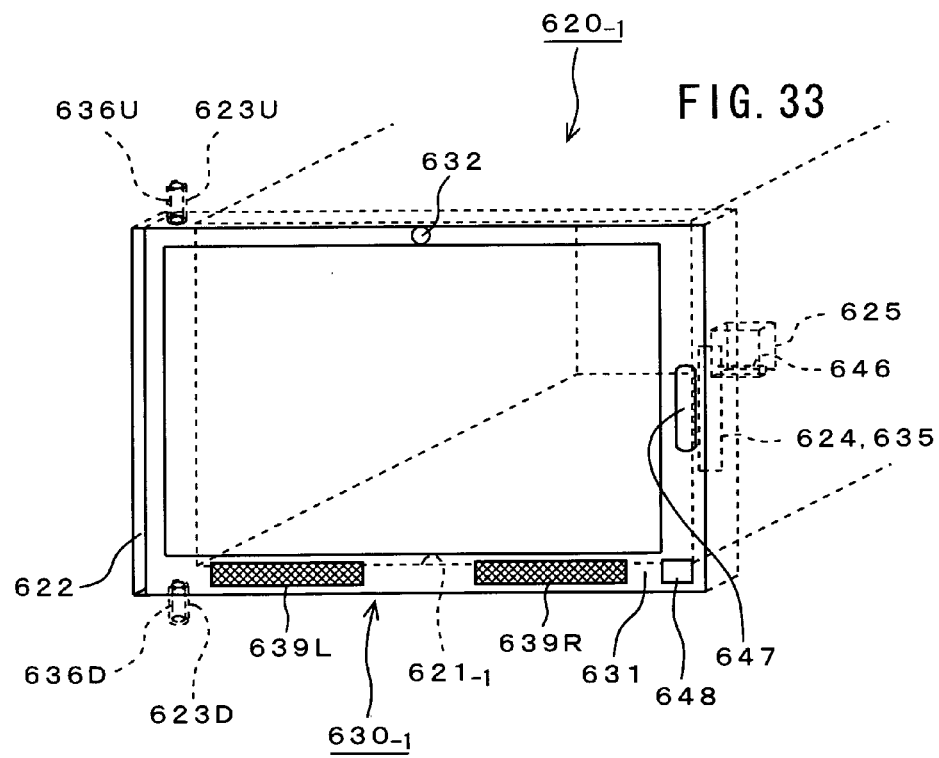
FIG. 33 is a perspective view for showing a relationship (condition where a cover is closed) between the storage section body and the flat plate section.
Figure 34:
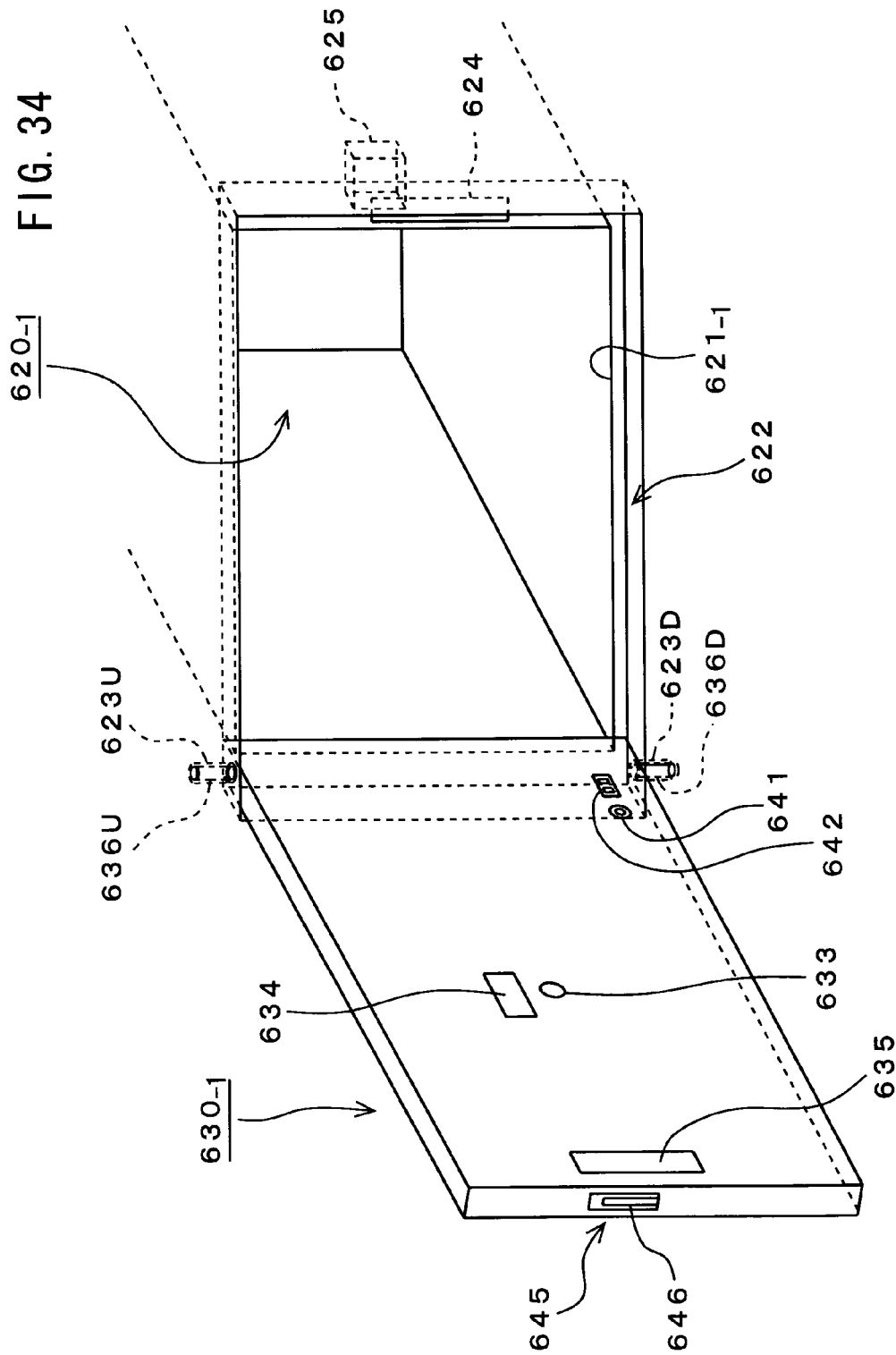
FIG. 34 is a perspective view for showing a relationship (condition where the cover is open) between the storage section body and the flat plate section.

The storage section body 620$_{-1}$ and the flat plate section 630$_{-1}$ are configured as described above, so that the flat plate section 630$_{-1}$ can be mounted detachably corresponding to the storage opening 621$_{-1}$ of the storage section body 620$_{-1}$. FIG. 33 shows the covered condition where the flat plate section 630$_{-1}$ covers the storage opening 621$_{-1}$. In this covered condition, if the user operates the remote controller 650 to provide a lock mode, the claw section 646 that constitutes the lock mechanism 645 of the flat plate section 630$_{-1}$ is inserted into the claw insertion hole 625 formed in the step section 622 of the storage opening 621$_{-1}$, thus providing the locked condition. FIG. 34 shows the uncovered condition where the storage opening 621$_{-1}$ is open.

It is to be noted that since the flat plate section 630$_{-1}$ can be easily detached from the storage opening 621$_{-1}$ of the storage section body 620$_{-1}$, the flat plate section 630$_{-1}$ can be easily separated in use. If the flat plate section 630$_{-1}$ is detached, it can be used as an ordinary TV receiving set. The above-described antenna wire connection terminal 641 and AC power supply cable connection terminal 642 are required when detaching the flat plate section 630$_{-1}$ as described above to use it as the ordinary TV receiving set.

Next, a circuit configuration (except for a power supply section) of the storage arrangement 600 will be described in condition where the flat plate sections 630$_{-1}$ through 630$_{-9}$ are connected, with reference to FIG. 35.

The storage arrangement 600 has a remote-control signal distributor 701, a switcher control section 702, a switcher 703, an antenna wire distributor 704, and TV box sections 705$_{-1}$ through 705$_{-9}$. Among these, the remote-control signal distributor 701, the switcher control section 702, the switcher 703, and the antenna wire distributor 704 constitute the above-described base box section 690 arranged in the lower part of the cabinet section 610. Further, the TV box sections 705$_{-1}$ through 705$_{-9}$ are respectively provided to the above-described flat plate sections 630$_{-1}$ through 630$_{-9}$.

The antenna wire distributor 704 distributes the broadcast signal BS input through the antenna terminal 680 to the TV box sections 705$_{-1}$ through 705$_{-9}$. The switcher 703 inputs thereto the video signals SV from the TV box sections 705$_{-1}$ through 705$_{-9}$ and the video signal SV input through the external image input terminal 682 and outputs the video signal SV to the TV box sections 705$_{-1}$ through 705$_{-9}$. Further, this switcher 703 inputs thereto the audio signals SA from the TV box sections 705$_{-1}$ through 705$_{-9}$ and the audio signal SA input through the external sound input terminal 684 and outputs the audio signal SA to the speakers 639R and 639L of the TV box sections 705$_{-1}$ through 705$_{-9}$ and the speakers 640R and 640L.

The switcher control section 702 controls connection of the switcher 703 based on the remote-control signal. This switcher control section 702 is constituted of a central processing unit (CPU), a random access memory (ROM) in which a control program etc. for this CPU is stored, a random access memory (RAM) that provides a work area for the CPU and the like. The remote-control signal distributor 701 distributes a remote-control signal RM received by the remote-control photoreceptor section 660 to the switcher control section 702 and the TV box sections 705$_{-1}$ through 705$_{-9}$.

Figure 36:
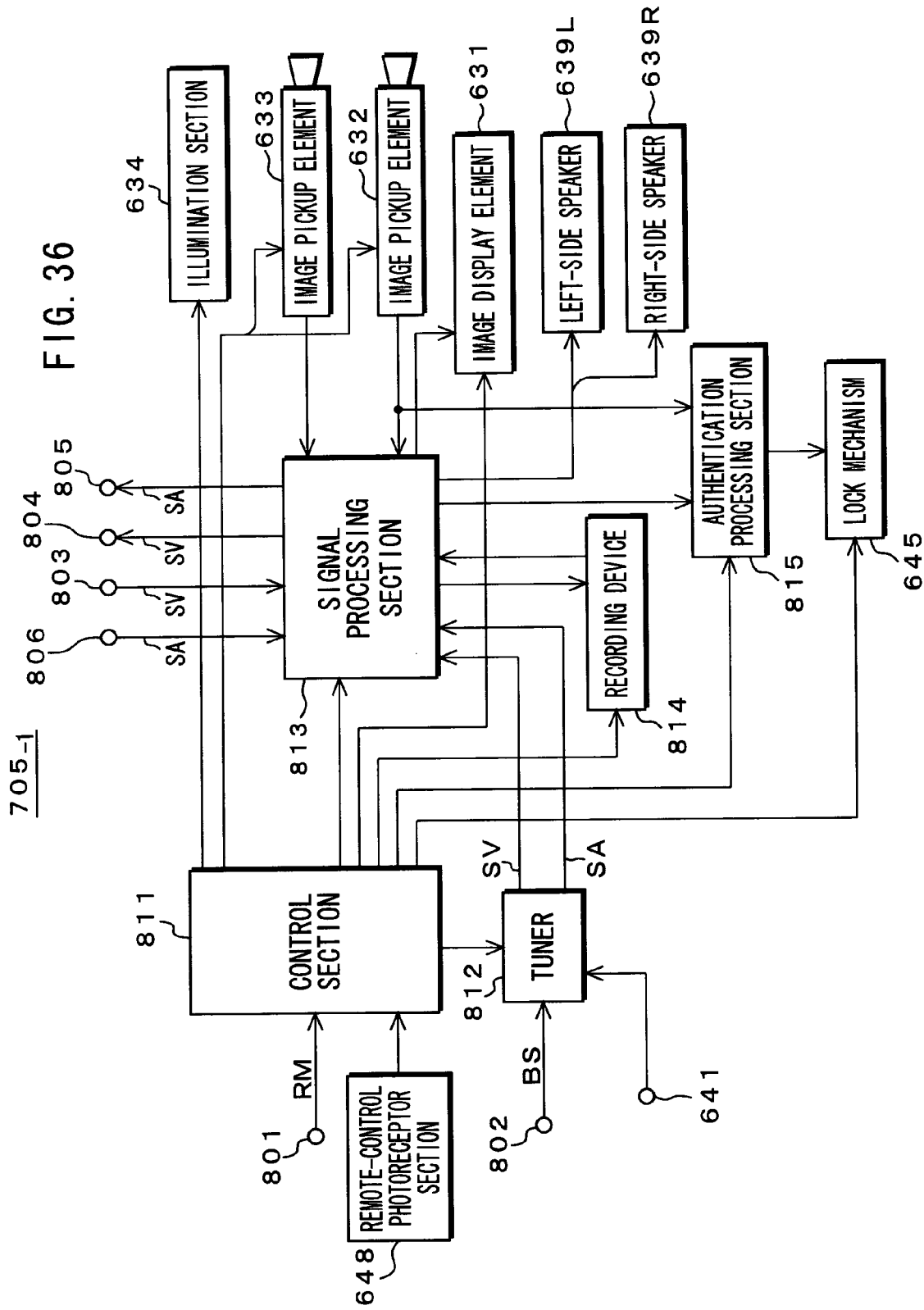
FIG. 36 is a block diagram for showing a circuit configuration of a TV box section.

Next, a circuit configuration (except for a power supply section) of the TV box sections 705$_{-1}$ through 705$_{-9}$ will be described below. The TV box sections 705$_{-1}$ through 705$_{-9}$ are each configured in the same way, so that the TV box sections 705$_{-1}$ will be described as an example below. FIG. 36 shows the circuit configuration of the TV box section 705$_{-1}$.

This TV box section 705$_{-1}$ has an input terminal 801 for the remote-controle signal RM, an input terminal 802 for the broadcast signal BS, an input terminal 803 for the video signal SV, an output terminal 804 for the video signal SV, an output terminal 805 for the audio signal SA, and an input terminal 806 for the audio signal SA. These terminals 801 806 constitute the above-described connection terminal 635 (see FIG. 31). Further, this TV box section 705$_{-1}$ has an antenna connection terminal 641. This connection terminal 641 is connected to a tuner 812.

Further, the TV box section 705$_{-1}$ has a control section 811 for controlling overall operations, the tuner 812, a signal processing section 813, a recording device 814, an authentication processing section 815, the lock mechanism 645, the image display element 631, the image pickup elements 632 and 633, the illumination section 634, the remote-control photoreceptor section 648, and the speakers 639R and 639L.

The control section 811 is constituted of a CPU, an ROM in which a control program etc. for this CPU is stored, an RAM that provides a work area for the CPU and the like. If the flat plate section 630$_{-1}$ is attached to the storage opening 621$_{-1}$ of the storage section body 620$_{-1}$, this control section 811 controls operations of components based on the remote-control signal RM input through the input terminal 801, and if the flat plate section 630$_{-1}$ is detached from the storage opening 621$_{-1}$ of the storage section body 620$_{-1}$, this control section 811 controls operations of the components based on the remote-control signal RM received by the remote-control photoreceptor section 648. It is to be noted that when the flat plate section 630$_{-1}$ is attached to the storage opening 621$_{-1}$ of the storage section body 620$_{-1}$, the remote-control photoreceptor section 648 is put in an off state. The tuner 812 acquires the video signal SV and the audio signal SA of a predetermined channel based on the broadcast signal BS input through the input terminal 802.

The recording device 814 is constituted of, for example, a semiconductor memory, a hard disk drive and the like. This recording device 814 records one frame or one field of the video signal SV obtained through imaging with the image pickup element 632 as an authentication video signal, a clothes display video signal, a past video signal, and the like. The authentication video signal is obtained by imaging, for example, the face of the user. Further, the clothes display video signal is obtained by imaging, for example, a jacket and trousers (or skirt) of the user in condition where the user have put them on. Further, the past video signal is obtained by imaging, for example, the upper body of the user. It is to be noted that the past video signal is combined with a display signal that gives an imaging date thereof at the signal processing section 813.

Further, the recording device 814 records one frame or one field of the video signal SV obtained through imaging with the image pickup element 633 as a storage management video signal. In this case, the storage management video signal is obtained by imaging the interior of the storage section body each time when, for example, the user stores an object in the storage section body or takes it out of this storage section body. It is to be noted that the storage management video signal is combined with a display signal that gives an imaging date thereof at the signal processing section 813.

Further, the authentication processing section 815 performs authentication processing based on the authentication video signal recorded in the recording device 814 and the video signal obtained through imaging with the image pickup element 632. If authentication is successful, this authentication processing section 815 sends a signal to indicate that authentication to the lock mechanism 645. When having received from the authentication processing section 815 the signal to indicate that the authentication has been successful, the lock mechanism 645 releases the locked condition.

The signal processing section 813 performs any processing to selectively output to the output terminal 804 the video signal SV obtained by the tuner 812, the imaging signals SV obtained through imaging with the image pickup elements 632 and 633, the imaging signal SV obtained through reproduction at the recording device 814, etc. Further, the signal processing device 813 performs any processing to output the audio signal SA obtained by the tuner 812 to the output terminal 805.

Further, the signal processing device 813 performs any processing to acquire the video signal SV to be supplied to the image display element 631 based on the video signal SV input through the input terminal 803. In this case, the signal processing section 813 performs zoom processing, IP conversion processing, still-picture processing, etc. as occasion demands. The zoom conversion processing refers to processing to increase items of pixel data in a divided region portion to be displayed on the image display element 631 when providing zoom-in display. The IP conversion processing refers to processing to convert the video signal SV from an interlace format into a progressive format in order to display an image on a flat panel display such as an LCD or as PDP as the image display element 631. The still-picture processing refers to processing to store one frame or one field of the video signal in a memory and read and output it repeatedly in order to display a still picture on the image display element 631.

As the above-described zoom conversion processing, for example, digital reality creation (DRC) processing is applied. The DRC processing refers to processing to obtain pixel data of a target position after zoom conversion processing based on an estimate equation by using plural items of pixel data positioned around this target position before zoom conversion processing and coefficient data generated through learning beforehand and corresponding to a phase of this target position. It is to be noted that as this zoom conversion processing, simple linear interpolation processing etc. can be applied also.

Further, the signal processing section 813 performs any processing to output to the recording device 814 the video signal SV obtained through imaging with the image pickup device 632 as the authentication video signal, the clothes display video signal, the past video signal, etc. In this case, the signal processing section 813 performs any processing also to combine, for example, the past video signal with a display signal that indicates an imaging date.

Further, the signal processing section 813 performs any processing to output to the recording device 814 the video signal SV obtained through imaging with the image pickup element 633 as the storage management video signal. In this case, the signal processing section 813 performs any processing also to combine the storage management video signal with a display signal that indicates an imaging date. Further, in authentication processing, the signal processing device 813 performs any processing to output to the authentication processing section 815 an authentication video signal reproduced by the recording device 814.

Figure 35:
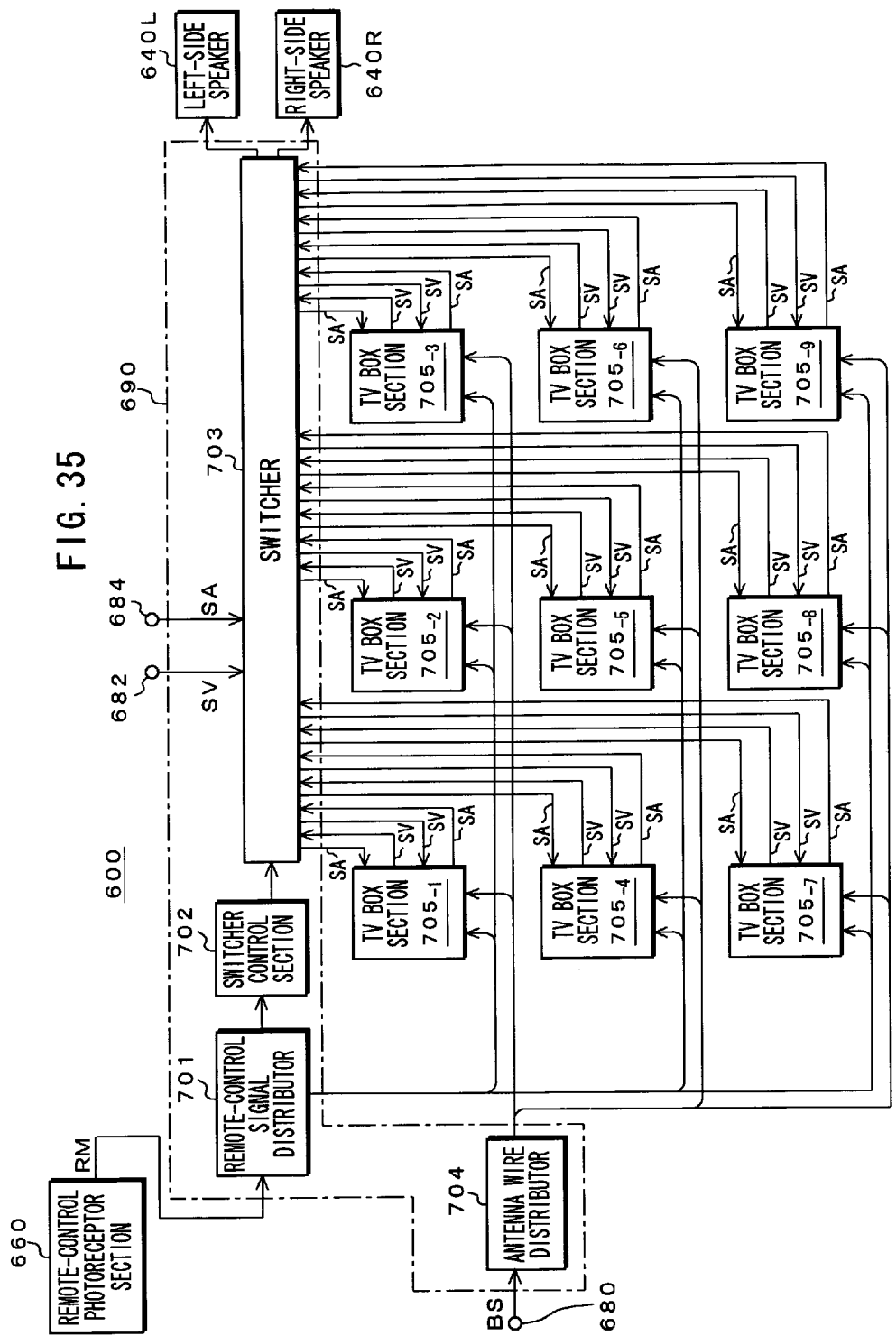
FIG. 35 is a block diagram for showing a circuit configuration of the storage arrangement.

Next, the following will describe operations of the base box section 690 and the TV box sections 705$_{-1}$ through 705$_{-9}$ shown in FIGS. 35 and 36 respectively.

(a) "When receiving the remote-control signal RM, which indicates that image due to video signal SV input through the external video input terminal 682 is displayed on a predetermined TV box section"

The switcher control section 702 in the base box section 690 controls the switcher 703 based on this remote-control signal RM, to output to a predetermined TV box section the video signal SV input through the external video input terminal 682. It is to be noted that one or more predetermined TV boxes are used.

In the predetermined TV box section(s), the control section 811 controls the signal processing section 813 based on this remote-control signal RM, to perform IP conversion processing on the video signal SV input through the input terminal

Figure 37:
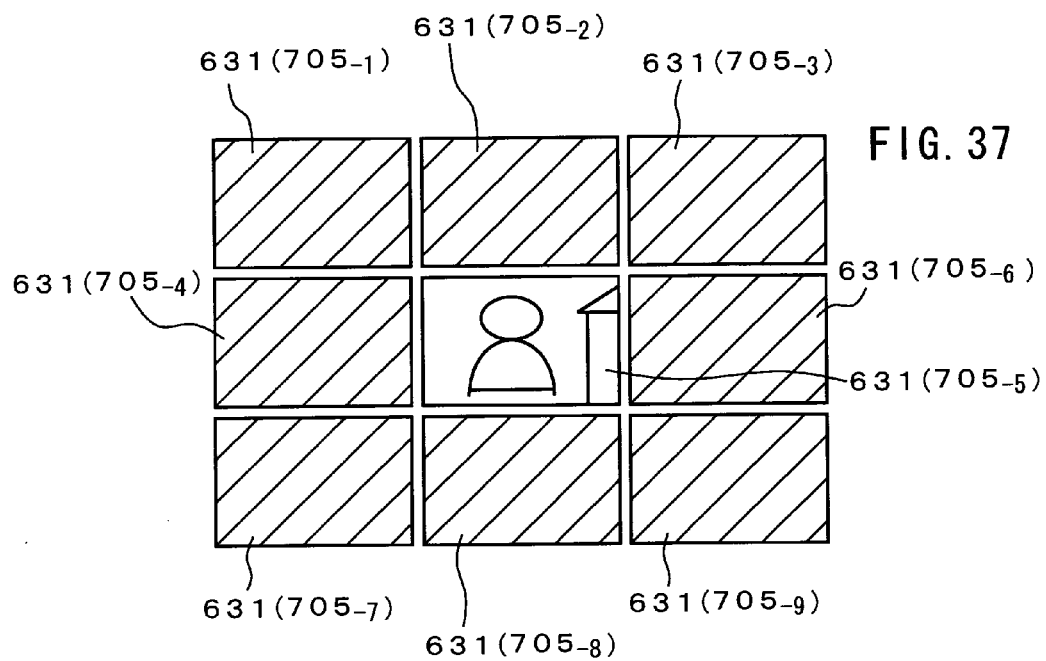
FIG. 37 is a drawing for showing an image display example.

803 and supply the processed video signal SV to the image display element 631. With this, on the image display element 631 in the predetermined TV box section, an image is displayed which is related to the video signal SV input through the external image video terminal 682. FIG. 37 shows an image display example in this case. In this image display example, only one TV box section 705$_{-1}$ is used as the predetermined TV box section.

It is to be noted that, in this case, the switcher control section 702 in the base box section 690 controls the switcher 703 based on this remote-control signal RM, to output to the speakers 640R and 640L the audio signal SA input through the external sound input terminal 684. With this, the speakers 640R and 640L produce sound due to the audio signal SA input through the external sound input terminal 684.

(b) "When receiving the remote-control signal RM, which indicates that image due to video signal SV input through the external video input terminal 682 is zoomed in"

The switcher control section 702 in the base box section 690 controls the switcher 703 based on this remote-control signal RM, to output the video signal SV input through the external video input terminal 682 to each of the TV box sections 705$_{-1}$ through 705$_{-9}$.

Figure 38:
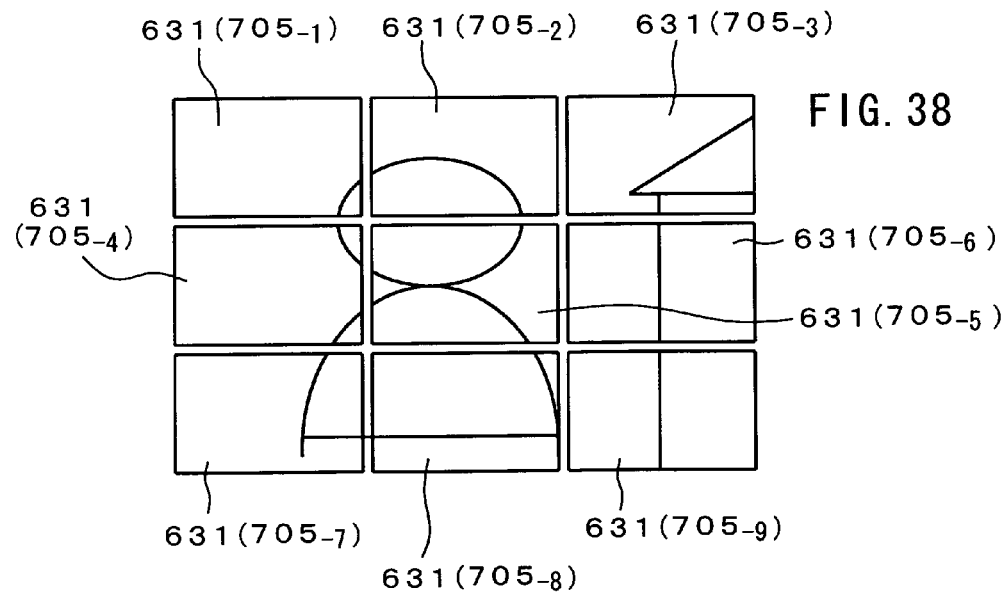
FIG. 38 is a drawing for showing an image display example.

In each of the TV box sections 705$_{-1}$ through 705$_{-9}$, the control section 811 controls the signal processing section 813 based on this remote-control signal RM, to perform the zoom conversion processing and the IP conversion processing on the video signal SV input through the input terminal 803 and supply the processed video signal to the image display element 631. With this, on all of the image display elements 631 in the TV box sections 705$_{-1}$ through 705$_{-9}$, an image is zoomed in and displayed which is related to the video signal SV input through the external video input terminal 682. FIG. 38 shows an image display example in this case.

Figure 39:
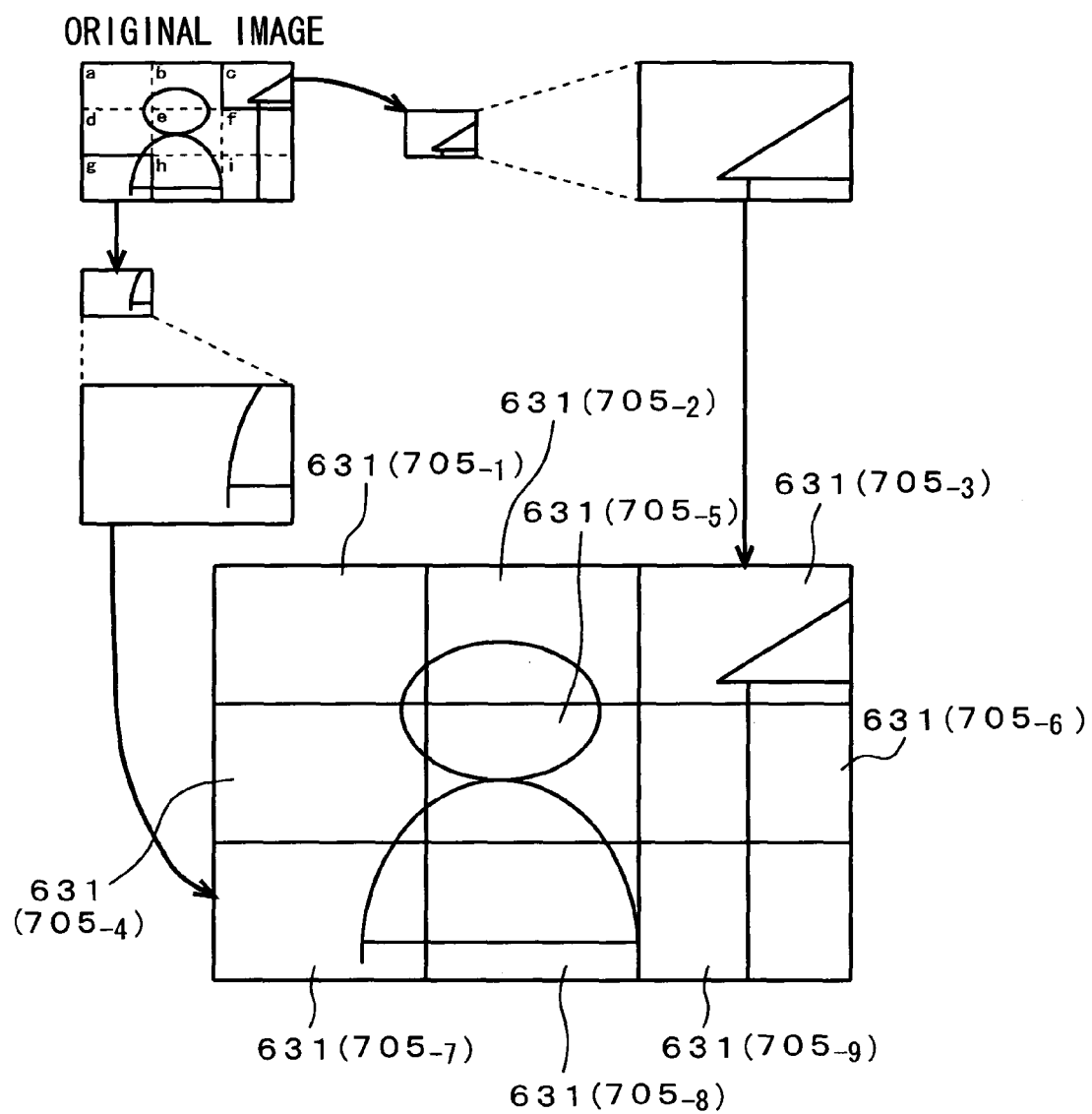
FIG. 39 is an explanatory view of a concept of zoom-in display.

FIG. 39 shows a concept of this zoom-in display. That is, an original image due to the video signal SV is horizontally and vertically divided by three into divided regions a-i, which are magnified three-fold horizontally and vertically and displayed on the image display elements 631 of the TV box sections 705$_{-1}$ through 705$_{-9}$ respectively.

The signal processing sections 813 in the TV box sections 705$_{-1}$ through 705$_{-9}$ generate the video signals SV$_{-1}$ SV$_{-9}$ that correspond to the divided regions a-i based on the video signal SV and supply them to the image display elements 631, respectively. These video signals SV$_{-1}$ SV$_{-9}$ are obtained by performing IP conversion processing after performing zoom conversion processing (zoom processing) to magnify plural items of pixel data that correspond to the divided regions a-i three-fold respectively.

It is to be noted that in this case, the switcher control section 702 in the base box section 690 controls the switcher 703 based on this remote-control signal RM, to output to the speakers 640R and 640L the audio signal SA input through the external sound input terminal 684. With this, the speakers 640R and 640L produce sound due to the audio signal SA input through the external sound input terminal 684.

(c) "When receiving the remote-control signal RM, which indicates that an image due to video signal SV obtained by the tuner 812 in the first TV box section is displayed at the second TV box section"

In the first TV box section, the control section 811 controls the signal processing section 813 based on this remote-control signal RM, to output to the output terminal 804 the video signal SV obtained by the tuner 812 and output the audio signal SA obtained by the tuner 812 to the output terminal 805. In this case, one of the first TV box sections is used.

The switcher control section 702 in the base box section 690 controls the switcher 703 based on this remote-control signal RM, to output the video signal SV from the first TV box section to the second TV box section. In this case, one or more of the second TV box sections are used, which may include the first TV box section.

In the second TV box section(s), the control section 811 controls the signal processing section 813 based on this remote-control signal RM, to perform the IP conversion processing on the video signal SV input through the input terminal 803 and supply the processed video signal SV to the image display element 631. With this, on the image display element(s) 631 in the second TV box section(s), an image is displayed which is related to the video signal SV obtained by the tuner 812 in the first TV box section.

In this case, the switcher control section 702 in the base box section 690 controls the switcher 703 based on this remote-control signal RM, to output to the speakers 640R and 640L the audio signal SA from the first TV box section. With this, the speakers 640R and 640L produce sound due to the audio signal SA from the first TV box section.

It is to be noted that by sequentially receiving the remote-control signals RM with differentiating the first and second TV box sections, a plurality of different images are simultaneously displayed on the image display elements 631 of the TV box sections 705$_{-1}$ through 705$_{-9}$. In this case, either output of sound is stopped or sound that corresponds to any one of the images is produced.

(d) "When receiving the remote-control signal RM, which indicates that image due to the video signal SV obtained by the tuner 812 in the predetermined TV box section is zoomed in and displayed"

In the predetermined TV box section, the control section 811 controls the signal processing section 813 based on this remote-control signal RM, to output to the output terminal 804 the video signal SV obtained by the tuner 812 and output the audio signal SA obtained by the tuner 812 to the output terminal 805. In this case, one TV box section is used as the predetermined TV box section.

The switcher control section 702 in the base box section 690 controls the switcher 703 based on this remote-control signal RM, to output the video signal SV from the predetermined TV box section to the TV box sections 705$_{-1}$ through 705$_{-9}$ respectively.

In each of the TV box sections 705$_{-1}$ through 705$_{-9}$, the control section 811 controls the signal processing section 813 based on this remote-control signal RM, to perform the zoom conversion processing and the IP conversion processing in the signal processing section 813 on the video signal SV input through the input terminal 803 and supply the processed video signal to the image display element 631. With this, on all of the image display elements 631 of the TV box sections 705$_{-1}$ through 705$_{-9}$, an image is displayed which is related to the video signal SV obtained by the tuner 812 in the predetermined TV box section.

In this case, the switcher control section 702 in the base box section 690 controls the switcher 703 based on this remote-control signal RM, to output to the speakers 640R and 640L the audio signal SA from the predetermined first TV box section. With this, the speakers 640R and 640L produce sound due to the audio signal SA from the predetermined TV box section.

(e) "When receiving the remote-control signal RM, which indicates that image due to video signal SV obtained through imaging by image pickup element 632 in first TV box section is displayed on second TV box section (mirror display)"

In the first TV box section, the control section 811 controls the signal processing section 813 based on this remote-control signal RM, to output to the output terminal 804 the video signal SV obtained through imaging by the image pickup element 632. In this case, one TV box section is used as the first TV box section.

The switcher control section 702 in the base box section 690 controls the switcher 703 based on this remote-control signal RM, to output the video signal SV from the first TV box section to the second TV box section. In this case, one or more of the second TV box sections are used, which may include the first TV box section.

In the second TV box section, the control section 811 controls the signal processing section 813 based on this remote-control signal RM, to perform the IP conversion processing on the video signal SV input through the input terminal 803 and supply the processed video signal SV to the image display element 631. With this, on the image display element(s) 631 in the second TV box section(s), an image is displayed which is obtained through imaging by the image pickup element 632 in the first TV box section.

It is to be noted that by sequentially receiving the remote-control signals RM with differentiating the first and second TV box sections, a plurality of different images are simultaneously displayed on the image display elements 631 of the TV box sections $705\_1$ through $705\_9$. Further, the remote-control signal RM in this case (e) is effective also in display condition due to the remote-control signal RM in the above-described case (c). Vice versa, the remote-control signal RM in the above-described case (c) is effective also in display condition due to the remote-control signal RM in this case (e). With this, such condition is entered in which an image due to the video signal SV obtained by the tuner 812 and an image due to the video signal SV obtained by the image pickup element 632 are displayed in a mixed manner on the image display elements 631 of the TV box sections $705\_1$ through $705\_9$.

(f) "When receiving the remote-control signal RM, which indicates that the video signal SV obtained through imaging by image pickup element 632 in the first TV box section is recorded as an authentication video signal, a clothe display video signal, a past video signal, etc. in display condition of (e)"

In the first TV box section, the control section 811 controls the signal processing section 813 based on this remote-control signal RM, to supply the video signal SV obtained through imaging by the image pickup element 632 to the recording device 814 as the authentication video signal, the clothes display video signal, the past video signal, etc. In this case, for example, the signal processing section 813 combines the past video signal with a display signal that indicates an imaging date. Further, the control section 811 controls the recording device 814, to record one frame or one field of the video signal SV supplied from the signal processing section 813 as the authentication video signal, the clothes display video signal, the past video signal, etc.

(g) "When receiving the remote-control signal RM, which indicates that the video signal SV obtained through imaging by image pickup element 633 in a predetermined TV box section is recorded as a storage management video signal"

In the predetermined TV box section, the control section 811 controls the illumination section 634 based on this remote-control signal RM, to illuminate the interior of the storage section body. Also, the control section 811 controls the image pickup element 633 to image the interior of the storage section body. Furthermore, the control section 811 controls the signal processing section 813, to supply the video signal SV obtained through imaging by the image pickup element 633 to the recording device 814 as the storage management video signal. In this case, the signal processing section 813 combines the storage management video signal with a display signal that indicates an imaging date. Further, the control section 811 controls the recording device 814, to record one frame or one field of the video signal SV supplied from the signal processing section 813 as the storage management video signal.

(h) "When receiving the remote-control signal RM, which indicates that an image due to the video signal SV obtained by the image pickup element 632 in a predetermined TV box section is zoomed in and displayed (mirror zoom-in display)"

In the predetermined TV box section, the control section 811 controls the signal processing section 813 based on this remote-control signal RM, to output to the output terminal 804 the video signal SV obtained by the image pickup element 632. In this case, one TV box section is used as the predetermined TV box section.

The switcher control section 702 in the base box section 690 controls the switcher 703 based on this remote-control signal RM, to output the video signal SV from the predetermined first TV box section to each of the TV box sections $705\_1$ through $705\_9$.

In each of the TV box sections $705\_1$ through $705\_9$, the control section 811 controls the signal processing section 813 based on this remote-control signal RM, to perform the zoom conversion processing and the IP conversion processing in the signal processing section 813 on the video signal SV input through the input terminal 803 and supply the processed video signal to the image display element 631. With this, on all of the image display elements 631 in the TV box sections $705\_1$ through $705\_9$, an image is zoomed in and displayed which is related to the video signal SV obtained through imaging by the image pickup element 632 in the predetermined TV box section.

(i) "When receiving the remote-control signal RM, which indicates that an image due to storage management video signal of from the newest one up to a predetermined ordered one recorded in the recording device 814 in a predetermined TV box section is displayed on the predetermined TV box section"

In the predetermined TV box section, the control section 811 controls the recording device 814 based on this remote-control signal RM, to reproduce a storage management video signal of a predetermined order from the recording device 814. Further, the control section 811 controls the signal processing section 813, to perform the IP conversion processing on the storage management video signal (one frame or one field of video signal) reproduced by the recording device 814 and then record it in a memory, and to perform the still-picture processing that reads it repeatedly and supply the processed video signal to the image display element 631.

It is thus possible to display an image due to the storage management video signal of a predetermined order recorded in the recording device 814 of the predetermined TV box section on the image display element 631 in this predetermined TV box section. The user can periodically confirm what is stored in this storage section body and easily manage any storage ones without directly looking into the storage section body that corresponds to the flat plate section having a predetermined TV box section.

(j) "When receiving the remote-control signal RM, which indicates that a current image is displayed on the TV box sections $705\_1$, $705\_4$, and $705\_7$, a most recent past image (past 1) is displayed on the TV box sections $705\_2$, $705\_5$, and 705_8, and further a second most recent past image (past 2) is displayed on the TV box sections 705_3, 705_6, and 705_9."

In the TV box section 705_5, the control section 811 controls the image pickup element 632 based on this remote-control signal RM to image the user. Further, this control section 811 controls the signal processing section 813 to output to the output terminal 804 the video signal SV obtained through imaging by the image pickup element 632.

The switcher control section 702 in the base box section 690 controls the switcher 703 based on this remote-control signal RM to output the video signal SV from the TV box section 705_5 to each of the TV box sections 705_1, 705_4, and 705_7.

In each of the TV box sections 705_1, 705_4, and 705_7, the control section 811 controls the signal processing section 813 based on this remote-control signal RM, to perform the zoom conversion processing and the IP conversion processing on the video signal SV input through the input terminal 803 and supply the processed video signal to the image display element 631. In this case, in the signal processing section 813 in each of the TV box sections 705_1, 705_4, and 705_7, the video signals are generated which respectively correspond to the divided regions b, e, and h positioned to a horizontal midsection among the divided regions a-i (see FIG. 39) obtained by dividing the original image due to the video signal SV by three horizontally and vertically.

Figure 40:
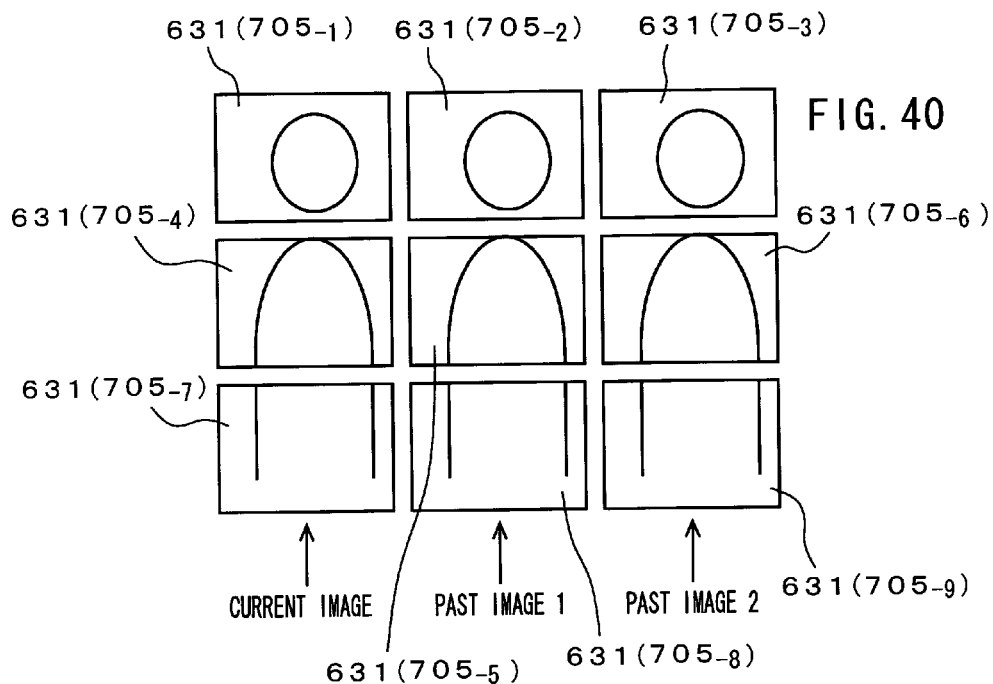
FIG. 40 is a drawing for showing an image display example.

With this, as shown in FIG. 40, on all of the image display elements 631 of the TV box sections 705_1, 705_4, and 705_7, the current image is displayed which is related to the video signal SV obtained through imaging by the image pickup element 632 in the TV box sections 705_5.

Further, in a predetermined TV box section which records past video signals in the recording device 814, the control section 811 controls the recording device 814 based on this remote-control signal RM, to reproduce the past video signal (one frame or one field of the video signal) required to display the most recent image. Further, the control section 811 controls the signal processing section 813 to output to the output terminal 804 the past video signal reproduced by the recording device 814.

The switcher control section 702 in the base box section 690 controls the switcher 703 based on this remote-control signal RM, to output the video signal SV from the predetermined TV box section to the TV box sections 705_2, 705_5, and 705_8, respectively.

In each of the TV box sections 705_2, 705_5, and 705_8, the control section 811 controls the signal processing section 813 based on this remote-control signal RM, to perform the zoom conversion processing, the IP conversion processing, and the still-picture processing on the video signal SV input through the input terminal 803 and supply the processed video signal to the image display element 631. In this case, in the signal processing section 813 in each of the TV box sections 705_2, 705_5, and 705_8, the video signals are generated which respectively correspond to the divided regions b, e, and h positioned to the horizontal midsection among the divided regions a-i (see FIG. 39) obtained by dividing the original image due to the video signal SV by three horizontally and vertically.

With this, as shown in FIG. 40, on all of the image display elements 631 of the TV box sections 705_2, 705_5, and 705_8, the past image (past 1) is displayed which is related to the past video signal required to display the most recent past image reproduced from the recording device 814 in the predetermined TV box section.

Further, in the predetermined TV box section which records the past video signals in the recording device 814, the control section 811 controls the recording device 814 based on the remote-control signal RM to indicate that the past image (past 1) is displayed and confirmed, to reproduce the past video signal required to display the second most recent image. Further, the control section 811 controls the signal processing section 813 to output to the output terminal 804 the past video signal reproduced by the recording device 814.

The switcher control section 702 in the base box section 690 controls the switcher 703 based on this remote-control signal RM to indicate the display and confirmation, to output the video signal SV from the predetermined TV box section to the TV box sections 705_3, 705_6, and 705_9, respectively.

In each of the TV box sections 705_3, 705_6, and 705_9, the control section 811 controls the signal processing section 813 based on the remote-control signal RM to indicate this display and confirmation, to perform the zoom conversion processing, the IP conversion processing, and the still-picture processing on the video signal SV input through the input terminal 803 and supply the processed video signal to the image display element 631. In this case, in the signal processing section 813 in each of the TV box sections 705_3, 705_6, and 705_9, the video signals are generated which respectively correspond to the divided regions b, e, and h positioned to the horizontal midsection among the divided regions a-i (see FIG. 39) obtained by dividing the original image due to the video signal SV by three horizontally and vertically.

With this, as shown in FIG. 40, on all of the image display elements 631 of the TV box sections 705_3, 705_6, and 705_9, the past image (past 2) is displayed which is related to the past video signal required to display the second most recent past image reproduced from the recording device 814 in the predetermined TV box section.

It is thus possible to display the user's current image and past image side-by-side, so that the user can compare these images to each other to easily check, for example, his current physical condition, for example, whether he is tired.

(k) "When receiving the remote-control signal RM, which indicates that an image of user's face is displayed on each of the TV box sections 705_1, 705_2, and 705_3, images of jackets are displayed on the TV box sections 705_4, 705_5, and 705_6, and images of trousers (or skirts) are displayed on the TV box sections 705_7, 705_8, and 705_9."

In the TV box section 705_5, the control section 811 controls the image pickup element 632 based on this remote-control signal RM to image the face of the user. Further, this control section 811 controls the signal processing section 813 to output to the output terminal 804 the video signal SV obtained through imaging by the image pickup element 632.

The switcher control section 702 in the base box section 690 controls the switcher 703 based on this remote-control signal RM to output the video signal SV from the TV box section 705_5 to each of the TV box sections 705_1, 705_2, and 705_3.

In each of the TV box sections 705_1, 705_2, and 705_3, the control section 811 controls the signal processing section 813 based on this remote-control signal RM, to perform the IP conversion processing on the video signal SV input through the input terminal 803 and supply the processed video signal to the image display element 631.

Figure 41:
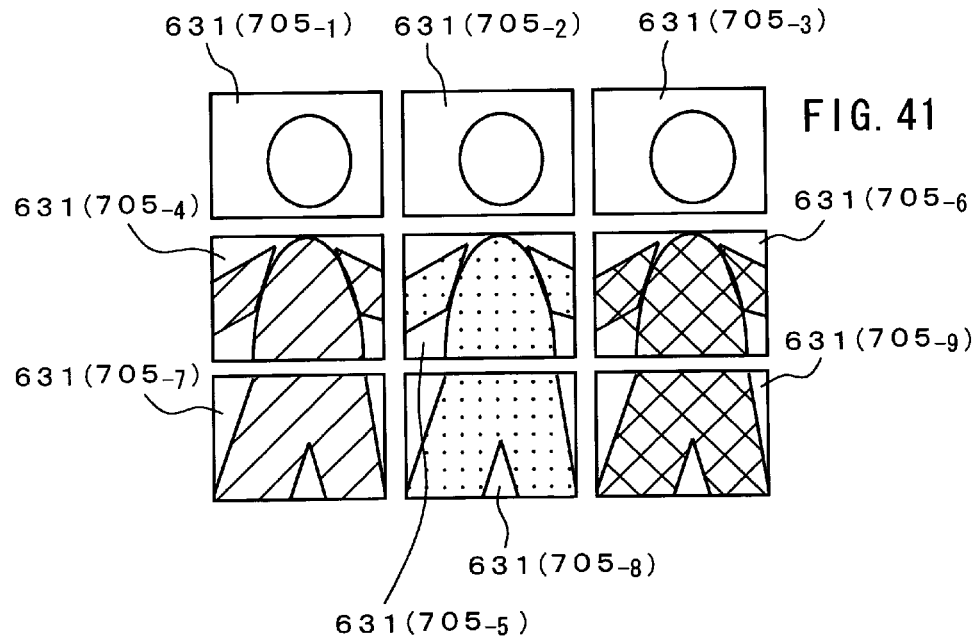
FIG. 41 is a drawing for showing an image display example.

With this, as shown in FIG. 41, on each of the image display elements 631 of the TV box sections 705_1, 705_2, and 705_3, user's face image is displayed which is related to the video signal SV obtained through imaging by the image pickup element 632 in the TV box sections 705_5.

Further, in a predetermined TV box section which records clothes display video signals in the recording device 814, the control section 811 controls the recording device 814 based on this remote-control signal RM, to reproduce the clothes display video signal (one frame or one field of the video signal) that displays a first jacket. Further, the control section 811 controls the signal processing section 813 to output to the output terminal 804 the clothes display video signal reproduced by the recording device 814.

The switcher control section 702 in the base box section 690 controls the switcher 703 based on this remote-control signal RM, to output the video signal SV from the predetermined TV box section to the TV box section 705$_{-4}$.

In the TV box section 705$_{-4}$, the control section 811 controls the signal processing section 813 based on this remote-control signal RM, to perform the IP conversion processing as well as the still-picture processing on the video signal SV input through the input terminal 803 and supply the processed video signal to the image display element 631. With this, as shown in FIG. 41, on the image display element 631 of the TV box section 705$_{-4}$, the first jacket is displayed which is related to the clothes display video signal reproduced from the recording device 814 in the predetermined TV box section.

Further, in the predetermined TV box section which records the clothes display video signals in the recording device 814, the control section 811 controls the recording device 814 based on the remote-control signal RM to indicate that the first jacket is displayed and confirmed, to reproduce the clothes display video signal that displays the first trousers (skirt). Further, the control section 811 controls the signal processing section 813 to output to the output terminal 804 the clothes display video signal reproduced by the recording device 814.

The switcher control section 702 in the base box section 690 controls the switcher 703 based on this display-and-confirm remote-control signal RM, to output the video signal SV from the predetermined TV box section to the TV box section 705$_{-7}$.

In the TV box section 705$_{-7}$, the control section 811 controls the signal processing section 813 based on this display-and-confirm remote-control signal RM, to perform the IP conversion processing as well as the still-picture processing on the video signal SV input through the input terminal 803 and supply the processed video signal to the image display element 631. With this, as shown in FIG. 41, on the image display element 631 of the TV box section 705$_{-7}$, the first trousers (skirt) are displayed which are related to the clothes display video signal reproduced from the recording device 814 in the predetermined TV box section.

Similarly, each time when the display-and-confirm remote-control signal RM is received, as shown in FIG. 41, the second jacket is displayed on the TV box section 705$_{-5}$, the second trousers (skirt) are displayed on the TV box section 705$_{-8}$, the third jacket is displayed on the TV box section 705$_{-6}$ and the third trousers (skirt) are displayed on the TV box section 705$_{-9}$.

(l) "When receiving the remote-control signal RM, which specifies TV box section and number of jacket or trousers (skirt) to be displayed thereon in display condition of (k)"

In this case, in a predetermined TV box section which records clothes display video signals in the recording device 814, a clothes display video signal that displays specified jacket or trousers (skirt) is reproduced. Further, the control section 811 controls the signal processing section 813 to output to the output terminal 804 the clothes display video signal reproduced by the recording device 814.

The switcher control section 702 in the base box section 690 controls the switcher 703 based on this remote-control signal RM to output the video signal SV from the predetermined TV box section to a specified TV box section.

In the specified TV box section, the control section 811 controls the signal processing section 813 based on this remote-control signal RM, to perform the IP conversion processing as well as the still-picture processing on the video signal SV input through the input terminal 803 and supply the processed video signal to the image display element 631. With this, on the image display element 631 in the specified TV box section, the specified jacket or trousers (skirt) are displayed. It is thus possible to display a combination of arbitrary jacket and trousers (skirt).

In such a manner, it is possible to display a combination of a current image of the user's face and images of arbitrary jacket and trousers (skirt), thereby permitting the user to easily coordinate a jacket and trousers (skirt) that match the user's current face, hairstyle, etc.

(m) "When receiving the remote-control signal RM, which displays an image due to video signal SV obtained through imaging by image pickup element 633 in a predetermined TV box section on this predetermined TV box section (see-through display)"

In the predetermined TV box section, the control section 811 controls the illumination section 634 based on this remote-control signal RM, to illuminate an interior of the storage section body. Also, the control section 811 controls the image pickup element 633 to image the interior of the storage section body. Furthermore, the control section 811 controls the signal processing section 813 to output to the output terminal 803 the video signal SV obtained through imaging by the image pickup element 633.

The switcher control section 702 in the base box section 690 controls the switcher 703 based on this remote-control signal RM to output the video signal SV from the predetermined TV box section to this predetermined TV box section.

In the predetermined TV box section, the control section 811 controls the signal processing section 813 based on this remote-control signal RM, to perform the IP conversion processing on the video signal SV input through the input terminal 803 and supply the processed video signal SV to the image display element 631. With this, on the image display element 631 in the predetermined TV box section, an image of the interior of the storage section body owing to the video signal obtained through imaging by the image pickup element 633 in this predetermined TV box section is displayed.

Figure 42A:
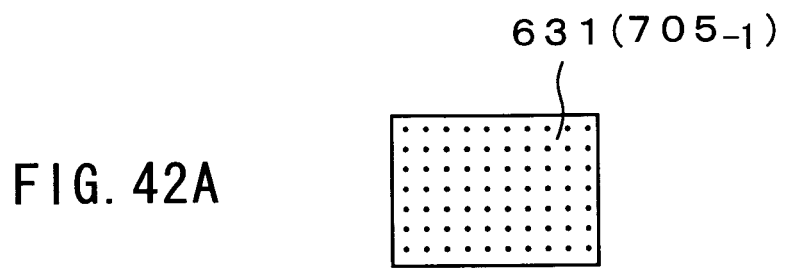
FIG. 42A is a drawing for showing pre-display condition by see-through display.
Figure 42B:
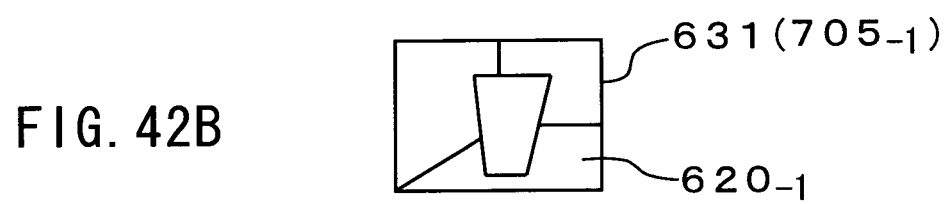
FIG. 42B is a drawing for showing display condition by see-through display.
Figure 42C:
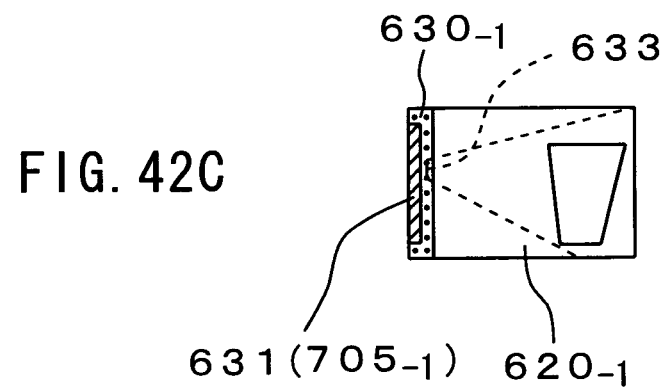
FIG. 42C is a drawing for showing internal-image condition by see-through display.

FIG. 42A shows a condition before the image of the interior of the storage section body 620$_{-1}$ is displayed on the image display element 631 in the TV box section 705$_{-1}$ and FIG. 42B shows a condition in which the image of the interior of the storage section body 620$_{-1}$ is displayed on this image display element 631. Further, FIG. 42C shows a condition where the image pickup element 633 mounted on the inner side surface of the flat plate section 630$_{-1}$ images the interior of the storage section body 620$_{-1}$. Although FIGS. 42A-42C have shown the components of the TV box section 705$_{-1}$, this holds true also with the components of the other TV box sections 705$_{-2}$ through 705$_{-9}$.

In such a manner, it is possible to display an image due to a video signal obtained through imaging of the interior of the storage section body by the image pickup element 633 on the image display element 631 in the predetermined TV box section, thereby permitting the user to observe the interior of the storage section body even in condition where the flat plate section covers the storage opening of the storage section body. That is, the user can watch the interior of the storage section body without opening the flat plate section each time he does so, thereby improving usability.

(n) "When receiving the remote-control signal RM, which sets so that a predetermined TV box section can be put in lock mode"

In the predetermined TV box section, the control section 811 controls the lock mechanism 645 based on this remote-control signal RM to rotate the claw section 646 so that it may be inserted into the claw insertion hole 625, thereby providing a locked condition (see FIG. 33).

(o) "When receiving the remote-control signal RM, which allows a predetermined TV box section to perform any authentication processing in locked condition of (n)"

In the predetermined TV box section, the control section 811 controls the recording device 814 based on this remote-control signal RM to reproduce an authentication video signal from this recording device 814. Further, the control section 811 controls the signal processing section 813 to output to the authentication processing section 815 the authentication video signal reproduced by the recording device 814. Further, the control section 811 controls the image pickup device 632 to image an image of the user's face.

Further, the control section 811 controls the authentication processing section 815 so that this authentication processing section 815 may perform any authentication processing based on the authentication video signal and the face video signal obtained through imaging. If authentication is successful, the authentication processing section 815 sends a signal to indicate that success to the lock mechanism 645. When having received from the authentication processing section 815 the signal to indicate that authentication has been successful, the control section 811 controls the lock mechanism 645 to rotate the claw section 646 so that this claw section 646 may be contained in the flat plate section, thereby releasing the locked condition.

Figure 43:
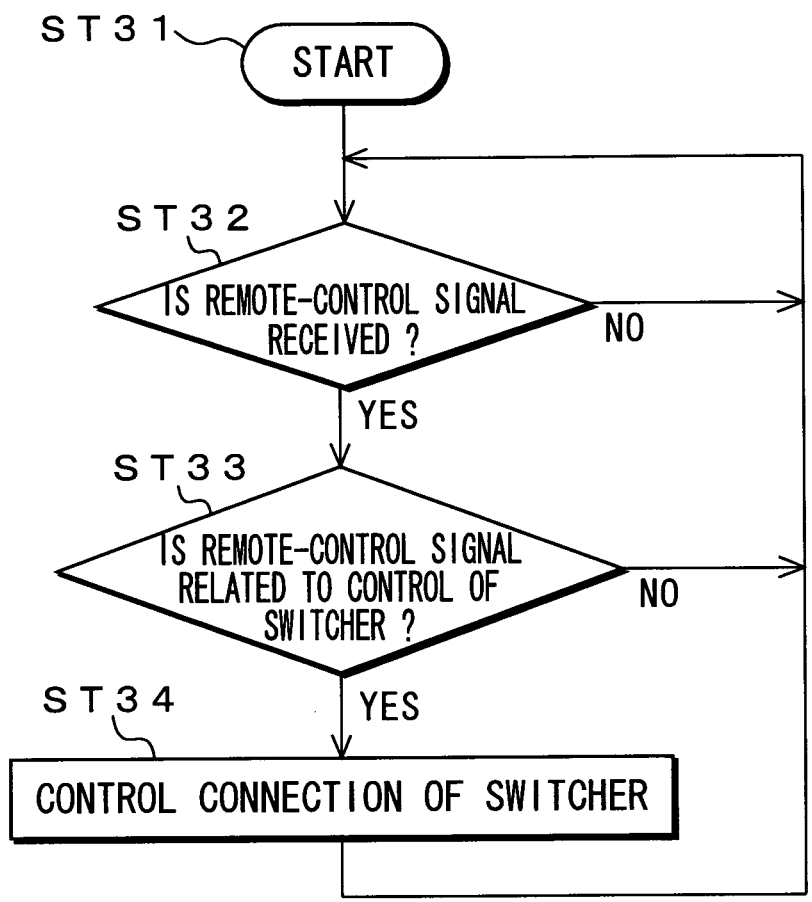
FIG. 43 is a flowchart for showing processing of a swithcer control section.

Operations of the switcher control section 702 will be described with reference to a flowchart of FIG. 43. First, at step ST31, the operation starts upon, for example, power application and, at step ST32, it is determined whether the remote-control signal is received. If the remote-control signal RM is received, the operation goes to step ST33.

At this step ST33, it is determined whether that remote-control signal RM is related to control of the switcher 703. If it is the remote-control signal RM relating to control of the switcher 703, the operation goes to step ST34.

At this step ST34, the connection of the switcher 703 is controlled based on the remote-control signal RM. After performing processing of this step ST34, the operation returns to the step ST32.

Figure 44:
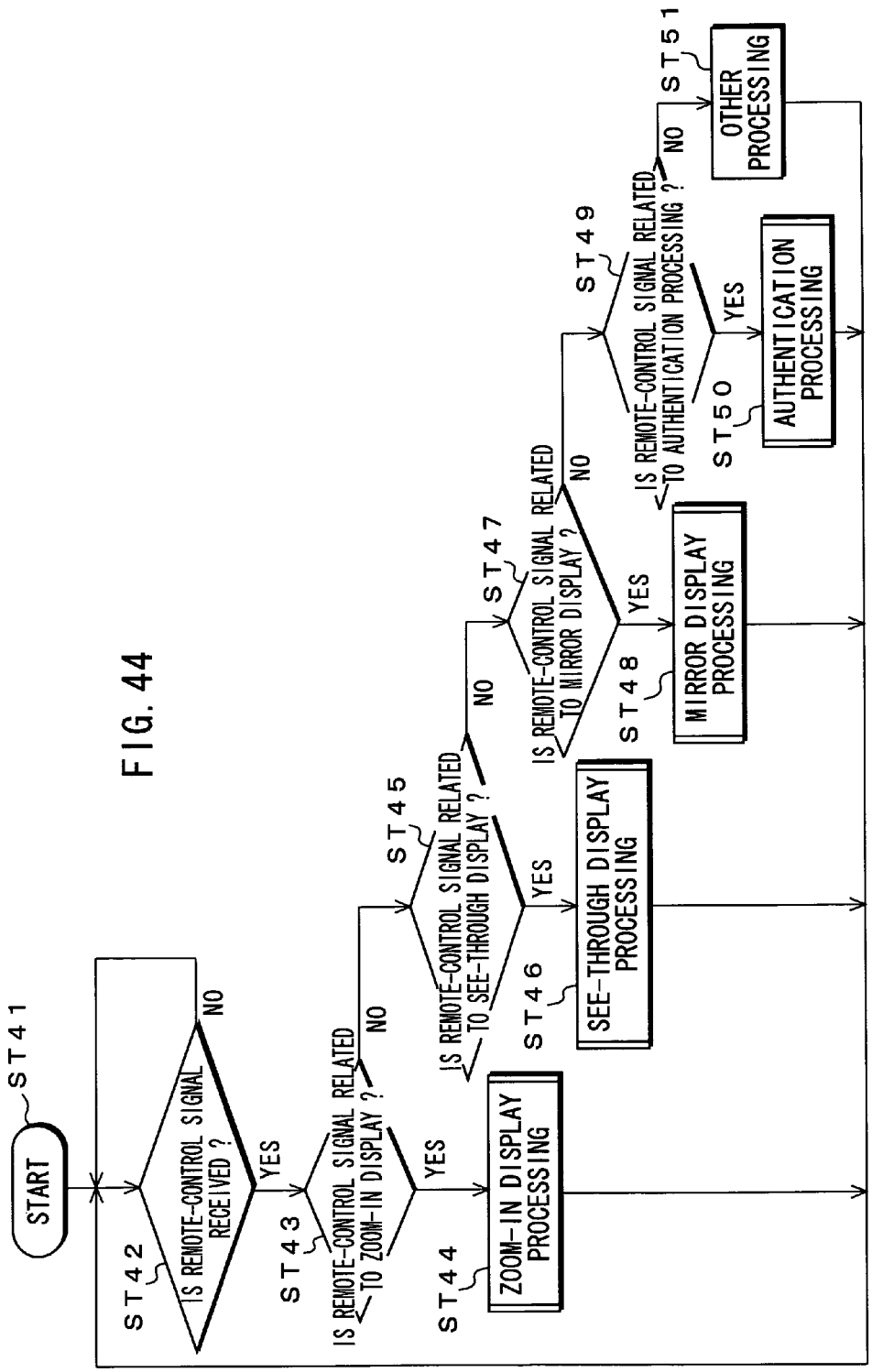
FIG. 44 is a flowchart for showing processing of the control section of the TV box section.

Next, operations of the control section 811 in the TV box section will be described with reference to a flowchart of FIG. 44. First, at step ST41, the operation starts upon, for example, power application and, at step ST42, it is determined whether the remote-control RM signal is received. If the remote-control signal RM is received, the operation goes to step ST43.

At this step ST43, it is determined whether the received remote-control signal RM is related to a zoom-in display (corresponding to the remote control signal RM in the above-described cases of (b), (d) and (h)) If this remote-control signal RM relates to the zoom-in display, zoom-in display processing is performed at step ST44 and then the operation returns to the step ST42.

Figure 45:
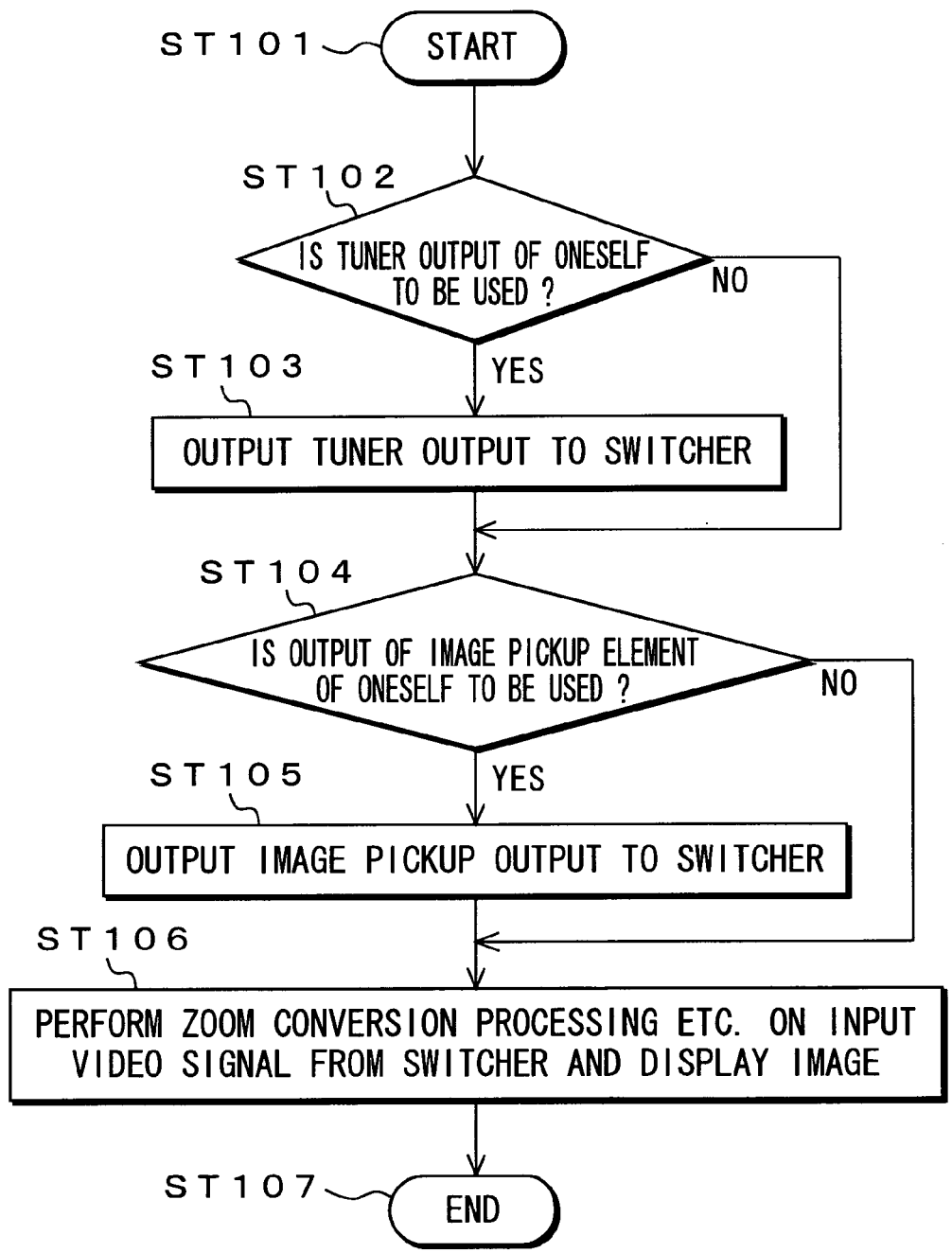
FIG. 45 is a flowchart for showing zoom-in display processing.

A flowchart of FIG. 45 shows the zoom-in display processing. First, the process starts at step ST101 and, at step ST102, it is determined whether an output of its own tuner 812 should be used. If its own tuner output is to be used, at step ST103, the tuner output is output to the switcher 703 and then, the process goes to step ST104. If its own tuner output is not used at step ST102, the process directly goes to step ST104.

At the step ST104, it is determined whether an output of its own image pickup element 632 should be used. If its own image pickup output is to be used, at step ST105, the image pickup output is output to the switcher 703 and then, the process goes to step ST106. If its own image pickup output is not used at step ST104, the process directly goes to step ST106.

At the step ST106, the zoom conversion processing etc. are performed on a divided region that corresponds to itself among an input video signal from the switcher 703 and, based on the processed video signal, an image is displayed on the image display element 631. Then, the process goes to step ST107 to end.

Referring back to FIG. 44, if the remote-control signal RM is not related to the zoom-in display at step ST43, at step ST45, it is determined whether the remote-control signal RM relates to the see-through display (corresponding to the remote-control signal RM in the above-described case of (m)). If the remote-control signal RM relates to the see-through display, at step ST46, the see-through display processing is performed and the operation returns to the step ST42.

Figure 46:
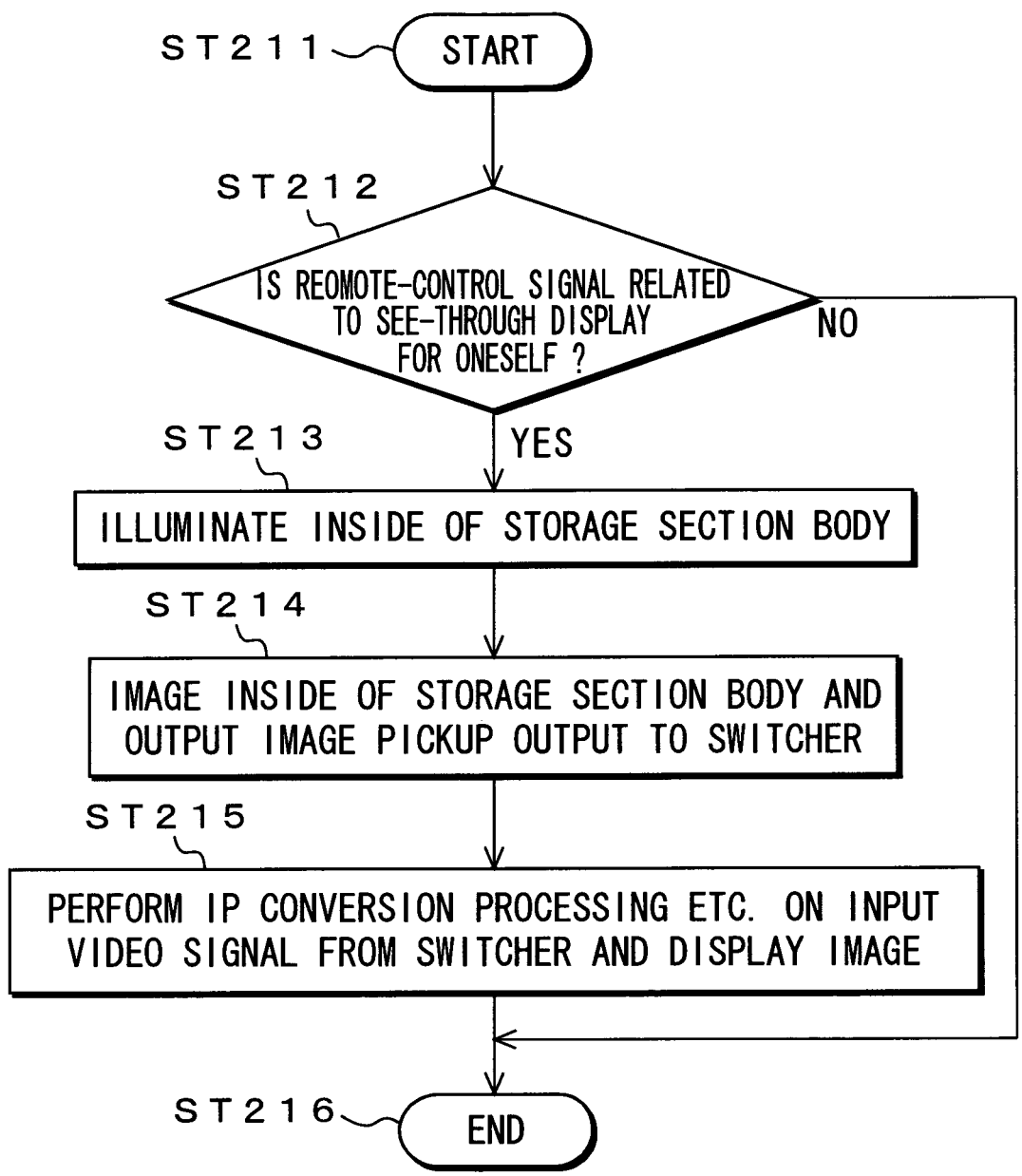
FIG. 46 is a flowchart for showing see-through display processing.

A flowchart of FIG. 46 shows the see-through display processing. First at step ST211, the process starts and, at step ST211, it is determined whether the relevant remote-control signal RM relates to see-through display for itself. If the remote-control signal RM relates to see-through display for itself, at step ST213, the illumination section 634 illuminates an interior of the storage section body. Further, at step ST214, the image pickup element 633 images the interior of the storage section body and an image pickup output is output to the switcher 703.

At step ST215, the IP conversion processing etc. are performed on the input video signal from the switcher 703 and, based on the processed video signal, an image is displayed on the image display element 631. Then, at step ST216, the process ends. It is to be noted that if this remote-control signal RM is not related to the see-through display for itself at step ST212, the process directly ends at step ST216.

Referring back to FIG. 44, if the remote-control signal RM is not related to the see-through display at step ST45, at step ST47, it is determined whether the remote-control signal RM relates to the mirror display (corresponding to the remote-control signal in the above-described cases of (e), (j), (k), and (l)). If this remote-control signal RM relates to the mirror display, at step ST48, the mirror display processing is performed and the operation then returns to the step ST42.

Figure 47:
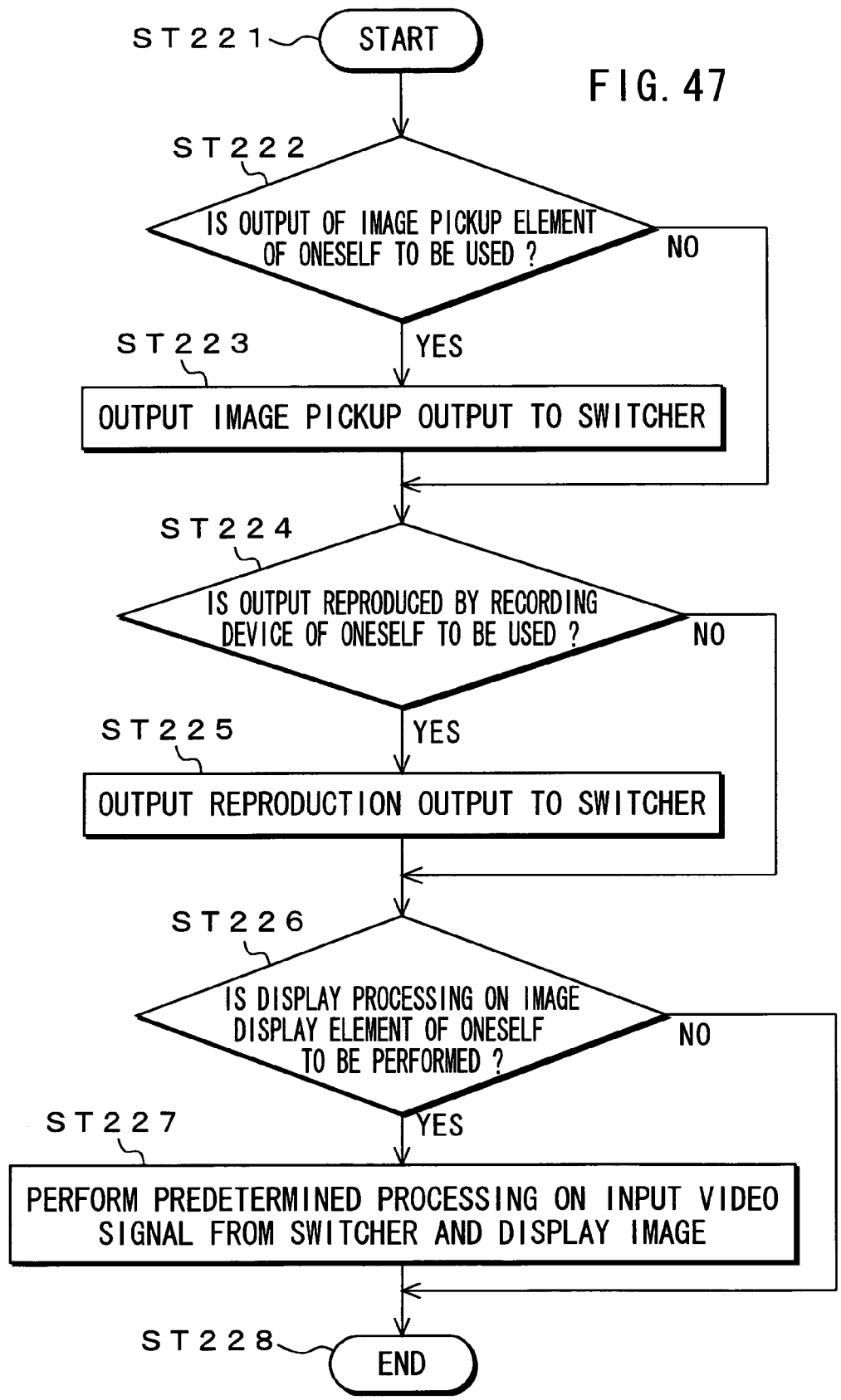
FIG. 47 is a flowchart for showing mirror display processing.

A flowchart of FIG. 47 shows the mirror display processing. First, the process starts at step ST221 and, at step ST222, it is determined whether an output of its own image pickup element 632 should be used. If its own image pickup output is to be used, at step ST223, the image pickup output is output to the switcher 703 and then, the process goes to step ST224. If its own image pickup output is not used at step ST222, the process directly goes to the step ST224.

At the step ST224, it is determined whether an output reproduced by its own recording device 814 (past video signal or clothes display video signal) should be used. If the output reproduced by its own recording device 814 is to be used, at step ST225, the reproduction output is output to the switcher 703 and then, the process goes to step ST226. If the reproduction output of its own recording device 814 is not used at step ST224, the process directly goes to the step ST226.

At the step ST226, it is determined whether display processing on its own image display element 631 should be performed. If an image is to be displayed, at step ST227, a predetermined processing (the zoom conversion processing and the IP conversion processing or only the IP conversion processing in the case of current image display; the zoom conversion processing, the IP conversion processing, and the still-picture processing in the case of past image display; and the IP conversion processing and the still-picture processing in the case of clothes display) is performed on the input video signal from the switcher 703, thereby displaying the image on the image pickup element 631. Then, the process ends at step ST228. It is to be noted if display processing on the image pickup element 631 of oneself is not performed at step ST226, the process directly ends at step ST228.

Referring back to FIG. 44, if the remote-control signal RM is not related to the mirror display at step ST47, at step ST49, it is determined whether the remote-control signal RM relates to the authentication processing (corresponding to the remote-control signal RM in the above-described case of (o)). If the remote-control signal RM relates to the authentication processing, at step ST50, the authentication processing is performed and then, the operation returns to the step ST42.

Figure 48:
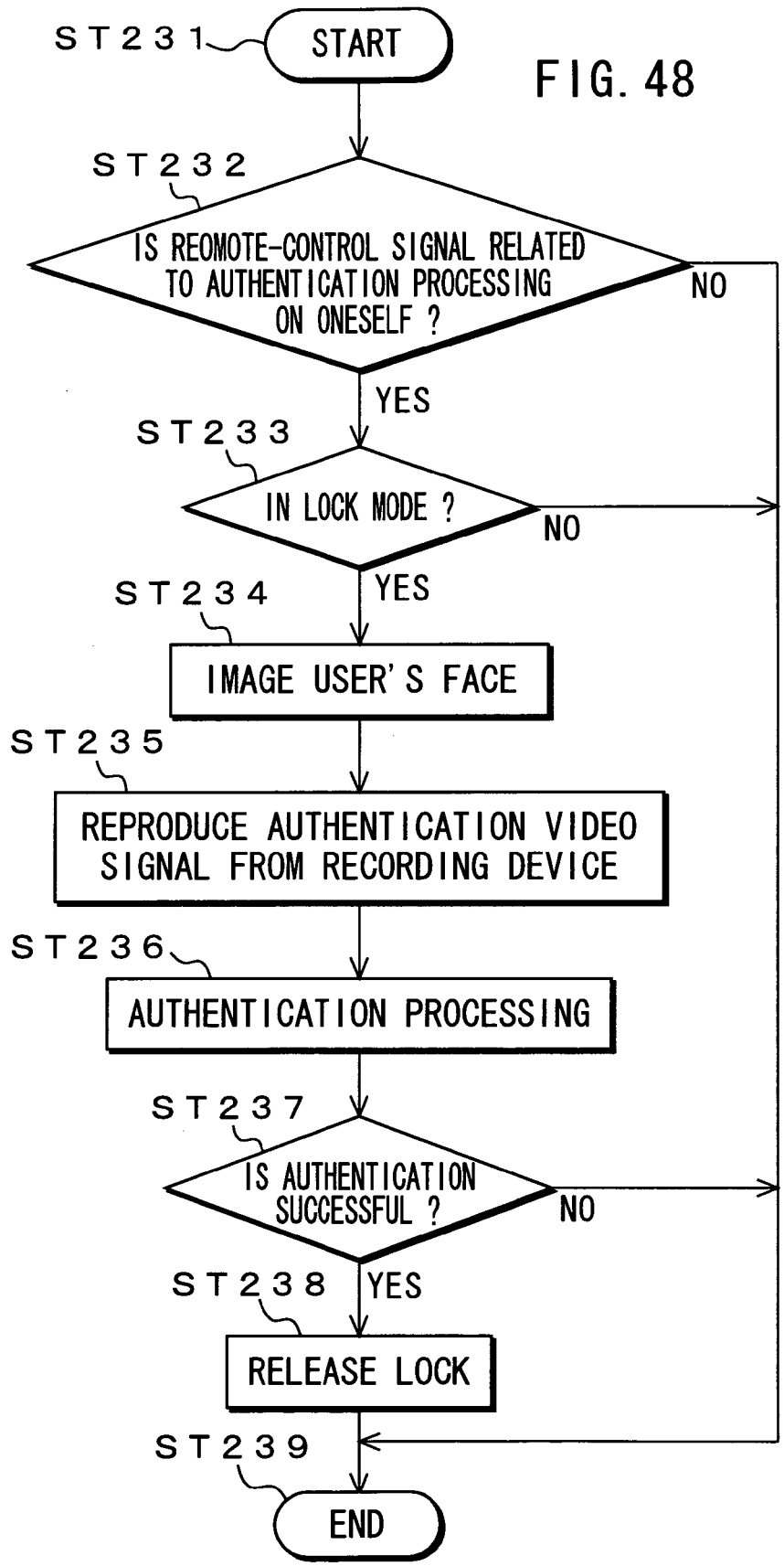
FIG. 48 is a flowchart for showing authentication processing.

A flowchart of FIG. 48 shows the authentication processing. First, at step ST231, the process starts and, at step ST232, it is determined whether the relevant remote-control signal RM relates to the authentication processing for oneself. If the remote-control signal RM relates to the authentication processing for oneself, at step ST233, it is determined whether the lock mode is set. If the lock mode is set, the face of the user is imaged by the image pickup element 632 at step ST234.

Next, at step ST235, the authentication video signal is reproduced from the recording device 814. Then, at step ST236, the authentication processing section 815 performs the authentication processing based on the video signal obtained through imaging by the image pickup element 632 and the authentication video signal. Then, at step ST237, it is determined whether authentication is successful. If the authentication is successful, the locked condition is released at step ST238 and then, the process ends at step ST239.

It is to be noted that if the remote-control signal RM does not relate to the authentication processing for oneself at the step ST232, if the lock mode is not set at step ST233, and if the authentication is not successful at step ST237, the process directly goes to the step ST239 to end.

Referring back to FIG. 44, if the remote-control signal RM is not related to the authentication processing but any other remote-control signal RM (corresponding to the remote-control signal RM in the above-described cases of (a), (c), (f), (g), (i), (n), etc. or the remote-control signal RM for channel selection, image quality adjustment, power-ON/OFF, etc. for each of the TV box sections 705$_{-1}$ through 705$_{-9}$) at step ST49, at step ST51, any processing that corresponds to that remote-control signal RM is performed and then, the operation goes back to the step ST42.

As described above, in the storage arrangement 600 shown in FIG. 28, the image display element 631 such as an LCD or a PDP is arranged on the outer side surface of each of the flat plate sections 630$_{-1}$ through 630$_{-9}$ for covering the storage openings 621$_{-1}$ through 621$_{-9}$ of the storage section body 620$_{-1}$ through 620$_{-9}$, so that a position of the image display element 631 can be watched by the user easily and the image display element 631 also displays an image using a video signal to enable a variety of images to be displayed, thereby greatly improving functions of the storage arrangement 600.

Although in the above embodiment, the storage arrangement 600 have been exemplified so as to have the nine storage section bodies 620$_{-1}$ through 620$_{-9}$ in the cabinet body section 610, the number of the storage section bodies that are included by the cabinet body section 610 is not limited to nine but may be any other number (including one).

Also, although in the above embodiment, the connection terminal 635 of the flat plate section 630$_{-1}$ and the connection terminal 624 of the storage opening 621$_{-1}$ have been connected to each other so that the TV box section 705$_{-1}$ in the flat plate section 630$_{-1}$ and the base box section 690 can be electrically connected to each other, a configuration to connect the TV box section 705$_{-1}$ in the flat plate section 630$_{-1}$ and the base box section 690 electrically to each other is not limited to it. For example, such a configuration may be thought that the TV box section 705$_{-1}$ in the flat plate section 630$_{-1}$ and the base box section 690 could be connected electrically to each other by arranging connection terminals to the rod-shaped members 635U and 635D and also arranging connection terminals to the bearing holes 623U and 623D into which these rod-shaped members 635U and 635D are inserted.

Figure 49A:
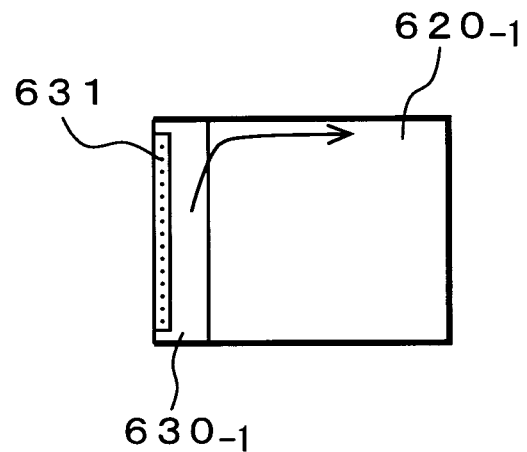
FIG. 49A is a drawing for showing an in-dash type configuration (condition where the cover is closed)
Figure 49B:
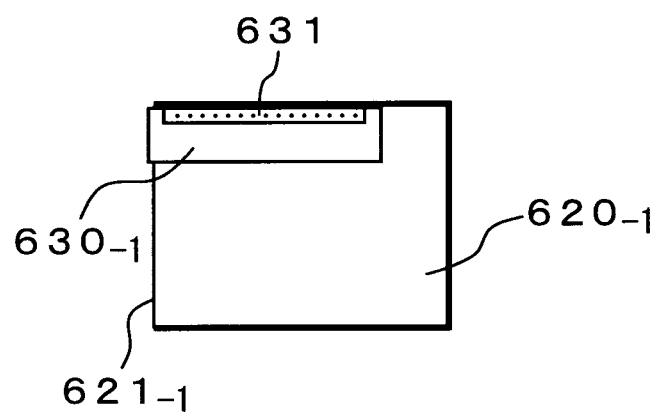
FIG. 49B is a drawing for showing an in-dash type configuration (condition where the cover is open)

Further, although in the above embodiment, the flat plate section 630$_{-1}$ for covering the storage opening 6211 of the storage section body 620$_{-1}$ has been configured so as to be closed and opened around axes of the rod-shaped members 636U and 636D (see FIGS. 33 and 34), a so-called in-dash type configuration may be employed as shown in FIGS. 49A and 49B. FIG. 49A shows the closed condition and FIG. 49B shows the open condition.

Figure 50:
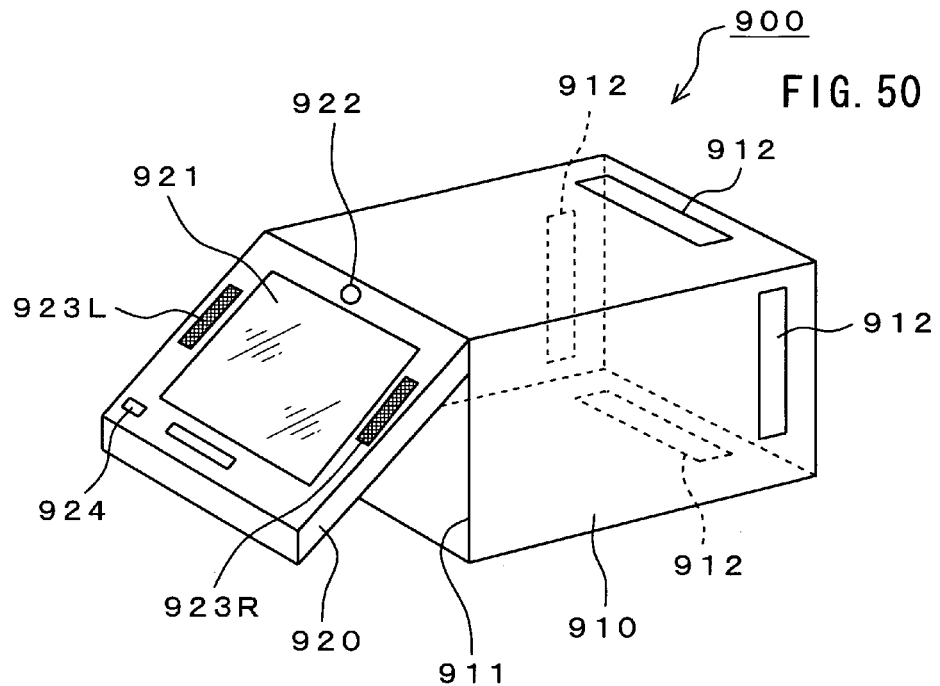
FIG. 50 is a perspective view for showing a configuration of a dress case according to further embodiment.

Further, although in the above embodiment, the storage arrangement 600 has been exemplified as to have the nine storage section bodies 620$_{-1}$ through 620$_{-9}$ in the cabinet body section 610 and to be used as a kitchen cabinet, a bookshelf, etc., as any other embodiment, for example, a dress case 900 shown in FIG. 50 may be thought. This dress case 900 is constituted of a storage section body 910 and a cover section 920. The cover section 920 constitutes a flat plate section for covering the storage opening 911.

This cover section 920 is provided with a TV box section (see FIG. 36), on an outer side surface of which an image display element 921 constituted of a flat panel display such as an LCD or a PDP that configures the TV box section is arranged together with an image pickup element 922. Also, on an outer side surface of this cover section 920, right-side and left-side speakers 923R and 923L and a remote-control photoreceptor section 924 are arranged. Further, although not shown, on an inner side surface of the cover section 920, the illumination section for illuminating the interior of the storage section body and the image pickup element for imaging the interior thereof are arranged.

Further, on the outer side surfaces of the storage section body 910, connection terminals 912 are provided. These connection terminals 912 are used to supply power, the video signal, the broadcast signal, etc. to the TV box sections provided on the cover sections 920.

Figure 51:
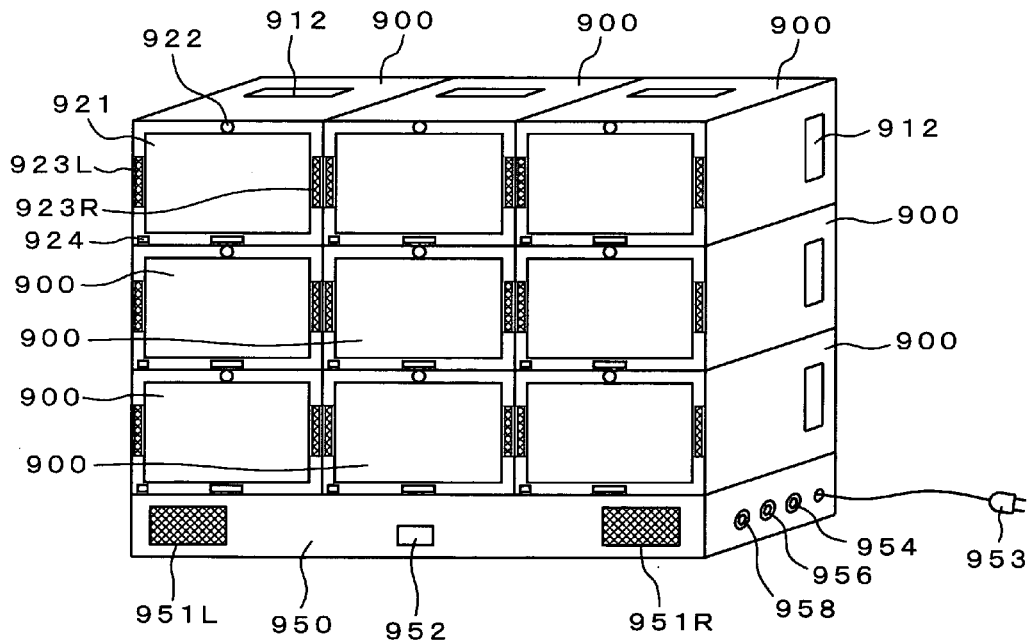
FIG. 51 is a drawing for showing a use condition in which the dress cases are stacked.

Further, the dress cases 900 shown in this FIG. 50 can be stacked as shown in, for example, FIG. 51 and used in the same way as the storage arrangement 600 shown in the above-described FIG. 28. In this case, a base box device 950 is arranged on the bottom. In this case, the connection terminals 912 provided on outer side surfaces of the storage section body 910 of the dress case 900 are used to be electrically connected to another dress case 900 or the base box section 950.

In a condition shown in FIG. 51, the base box device 950 and the TV box section of the cover section 920 of each of the dress cases 900 are electrically connected to each other similar to the electrically connected relation of the base box section 690 and the TV box section of each of the flat plate sections 630$_{-1}$ through 630$_{-9}$ in the storage arrangement

600 shown in FIG. 28, thereby enabling the same operations as those of the storage arrangement 600 shown in FIG. 28 to be implemented.

It is to be noted that as it can be seen from the above embodiments, the description of the present application further contains inventions (technological concepts) of the following cases 1-13.

"Case 1": A storage arrangement having a storage section body and a flat plate section for covering a storage opening of said storage section body, characterized in that on an outer side surface of this flat plate section, an image display element for displaying an image by using a video signal is arranged.

"Case 2": The storage arrangement according to the case 1, characterized in that a plurality of said storage section bodies is provided and said plurality of storage section bodies are arranged in a matrix shape.

"Case 3": The storage arrangement according to the case 2, characterized in that one image is displayed by using all of said image display elements arranged on said flat plate sections that correspond to said plurality of storage section bodies, respectively.

"Case 4": The storage arrangement according to the case 1, characterized in that said flat plate section is detachably attached to the storage opening of said storage section body.

"Case 5": The storage arrangement according to the case 1, characterized in that said flat plate section has a video signal processing section for processing a video signal and obtaining it which is supplied to said image display element.

"Case 6": The storage arrangement according to the case 1, characterized in that said flat plate section has a recording section for recording therein the video signal.

"Case 7": The storage arrangement according to the case 1, characterized in that an image pickup element is mounted on an inner side surface of said flat plate section.

"Case 8": The storage arrangement according to the case 7, characterized in that an illumination section for illuminating an interior of said storage section body is mounted to the inner side surface of said flat plate section.

"Case 9": The storage arrangement according to the case 7, characterized in that said flat plate section has:

a recording section for recording the video signal; and a recording control section for recording the video signal obtained through imaging by said image pickup element in said recording section.

"Case 10": The storage arrangement according to the case 1, characterized in that an image pickup element is mounted on the outer side surface of said flat plate section.

"Case 11": The storage arrangement according to the case 10, characterized in that said flat plate section has:

a recording section for recording the video signal; and a recording control section for recording the video signal obtained through imaging by said image pickup element in said recording section.

"Case 12": The storage arrangement according to the case 11, characterized in that said flat plate section has:

a lock mechanism for providing lock condition where this flat plate section covers the storage opening of said storage section body; and an authentication processing section for performing authentication processing to release a lock in said lock mechanism, wherein said authentication processing section performs authentication processing based on the video signal obtained through imaging by said image pickup element and an authentication video signal recorded in said recording device beforehand.

"Case 13": The storage arrangement according to the case 1, characterized in that a connection terminal for electrical connection to another storage section body is arranged on the outer side surface of said storage section body.

According to the present invention, the image display element for displaying an image by using a video signal is arranged on an outer side surface of the flat plate section for covering the storage opening of the storage section body, thereby enabling functions of the storage arrangement to be greatly improved.

Further, according to the present invention, the plurality of storage section bodies are arranged in a matrix shape, thereby enabling one image to be zoomed by using all of the image display elements arranged on the flat section bodies that correspond to these plurality of storage section bodies.

Further, according to the present invention, the flat plate section has the recording section for recording a video signal thereon and the image pickup element is equipped on its inner side surface of the flat plate section, and an illumination section for illuminating an interior of the storage section body is also equipped, so that, for example, each time a user stores an object in the storage section body or takes it out from this body, the video signal obtained by imaging an interior of this storage section body can be recorded in the recording section, thereby permitting the user to periodically confirm what is stored in this storage section body and easily manage the stored articles without directly looking into the storage section body.

Further, according to the present invention, the image pickup element is mounted on the outer side surface of the flat plate section and the flat plate section itself is equipped with the recording section, thereby obtaining mirror display effects by displaying an image due to the video signal obtained through imaging the user by the image pickup element on the image display element arranged on the flat plate section. Also, in this case, by recording the video signals in the recording section beforehand, it is possible to display not only a present image of the user but also his or her past image side-by-side, thereby easily judging his or her physical condition etc. Further, in such a case, by recording the video signal related to user's clothes (jackets, trousers, skirts, etc.) in the recording section beforehand, it is possible to display on the image display element an image in which user's current face and clothes are combined, thereby coordinating the clothes easily.

Further, according to the present invention, by providing the lock mechanism and the authentication processing section, it is possible to provide a locked condition in such a state that flat plate section covers the storage opening of the storage section body and also to release the lock condition by performing the authentication processing.

Further, according to the present invention, on the outer side surfaces of the storage section body, connection terminals are arranged for electrical connection with the body of any other storage section, so that it is possible to arrange the plurality of storage section bodies in, for example, a matrix shape, thereby electrically connecting them to each other to provide big-screen display etc. by use of all of the image display elements arranged on the flat plate sections respectively corresponding to the plurality of storage section bodies.

Industrial Applicability

In the present invention, an image display element is arranged on a division plate section, at a front surface side thereof, that divides a space and an image pickup element is mounted on this division plate section at a back surface thereof so as to enable an image due to a video signal obtained through imaging by the image pickup element to be displayed on the image display element so that a user can easily observe the other side of the division plate section and, therefore, this invention can be applied to, for example, a single-leaf screen, a divider, a wall, etc. Further, in the present invention, an image display element such as an LCD or a PDP is arranged on an outer side surface of a flat plate section that covers a storage opening of a storage section body so as to greatly improve functions of a storage arrangement and, therefore, this invention can be applied to, for example, a furniture piece such as a kitchen cabinet, a bookshelf, a dress case, etc.

The invention claimed is:

1. A space-dividing apparatus comprising:
a division plate section for dividing a space;
an image display element arranged on said division plate section at a front surface side;
an image pickup element mounted on said division plate section at a back surface side; and
a remote controller for controlling the image display element and the image pickup element wirelessly, and
a pedestal element having a step-wise configuration for accepting the image display element when the image display element is detached from the division plate section,
wherein the pedestal element includes an antenna element for receiving a broadcast signal, a speaker, and a remote-control photoreceptor section,
wherein a user of the space-dividing apparatus aligns an imaging direction of the image pickup element with a direction of a line of sight of the user by using a single button of the remote controller, and the direction of the line of sight of the user is substantially parallel with a straight line determined by a position of the user and a position of the image pickup element, and
wherein the division plate section includes a box-shaped member connected with a lock section by both a toggle lock member and a spring coil for securing the image display element with the division plate section,
wherein the toggle lock member includes a cylindrical section having a groove formed in an inner surface of the cylindrical section and a columnar section inserted into the cylindrical section,
wherein the columnar section has a protrusion formed on an outer surface of the columnar section, the protrusion being fit to the groove and allowing the columnar section to move vertically in the cylindrical section,
wherein the spring coil is arranged between the top plate of the box-shaped member and the lock section,
wherein the spring coil always urges the lock section downward, and
wherein at least an image due to a video signal obtained through imaging by said image pickup element can be displayed on said image display element.

2. The space-dividing apparatus according to claim 1, further comprising:
user position information reception means for receiving user position information; and
pickup-direction alteration means for altering a direction of said image pickup element based on the user position information received by said user position information reception means.

3. The space-dividing apparatus according to claim 1, wherein plural image display elements are arranged on said division plate section at the front surface side thereof and the plural image display elements are arranged in a matrix shape.

4. The space-dividing apparatus according to claim 3, wherein one image is displayed by using said plural image display elements.

5. The space-dividing apparatus according to claim 3, wherein said plural image pickup elements are arranged on said division plate section at the back surface side thereof and the plural image pickup elements are mounted to positions that correspond to said plural image display elements, respectively.

6. A space-dividing apparatus comprising:
a division plate section for dividing a space;
an image pickup element mounted on said division plate section at a back surface side;
an image display element arranged on said division plate section at a front surface side in an attachable/detachable manner; and
a remote controller for controlling the image display element and the image pickup element wirelessly, and
a pedestal element having a step-wise configuration for accepting the image display element when the image display element is detached from the division plate section,
wherein the pedestal element includes an antenna element for receiving a broadcast signal, a speaker, and a remote-control photoreceptor section,
wherein the division plate section includes a box-shaped member connected with a lock section by both a toggle lock member and a spring coil for securing the image display element with the division plate section,
wherein the toggle lock member includes a cylindrical section having a groove formed in an inner surface of the cylindrical section and a columnar section inserted into the cylindrical section,
wherein the columnar section has a protrusion formed on an outer surface of the columnar section, the protrusion being fit to the groove and allowing the columnar section to move vertically in the cylindrical section,
wherein the spring coil is arranged between the top plate of the box-shaped member and the lock section,
wherein the spring coil always urges the lock section downward, and
wherein a user of the space-dividing apparatus aligns an imaging direction of the image pickup element with a direction of a line of sight of the user by using a single button of the remote controller, and the direction of the line of sight of the user is substantially parallel with a straight line determined by a position of the user and a position of the image pickup element.

7. The space-dividing apparatus according to claim 6, further comprising a decorative sheet movement mechanism for moving a decorative sheet and arranging it to a position where, when said image display element is detached, said image display element has been arranged on said division plate section corresponding to the arranged position of the image display element on the division plate section.

* * * * *